United States Patent
Argoitia et al.

(10) Patent No.: US 6,841,238 B2
(45) Date of Patent: *Jan. 11, 2005

(54) CHROMATIC DIFFRACTIVE PIGMENTS AND FOILS

(75) Inventors: Alberto Argoitia, Santa Rosa, CA (US); Roger W. Phillips, Santa Rosa, CA (US); Michael R. Nofi, Santa Rosa, CA (US); Paul G. Coombs, Santa Rosa, CA (US); Charles T. Markantes, Santa Rosa, CA (US); Richard A. Bradley, Jr., Santa Rosa, CA (US)

(73) Assignee: Flex Products, Inc., Santa Rosa, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 10/117,307

(22) Filed: Apr. 5, 2002

(65) Prior Publication Data

US 2003/0190473 A1 Oct. 9, 2003

(51) Int. Cl.[7] .............................. B32B 5/16; G02B 5/18
(52) U.S. Cl. ....................... 428/323; 428/403; 428/404; 252/582; 252/586; 359/576
(58) Field of Search .......................... 359/576; 252/582, 252/586; 428/323, 403, 404, 457

(56) References Cited

U.S. PATENT DOCUMENTS

| | | | |
|---|---|---|---|
| 3,011,383 A | 12/1961 | Sylvester et al. ................. 88/1 |
| 4,066,280 A | 1/1978 | LaCapria ........................ 283/8 |
| 4,126,373 A | 11/1978 | Moraw ....................... 350/3.61 |
| 4,155,627 A | 5/1979 | Gale et al. ................... 350/162 |
| 4,168,983 A | 9/1979 | Vittands et al. .......... 106/14.12 |
| 4,434,010 A | 2/1984 | Ash ............................ 106/291 |
| 4,705,300 A | 11/1987 | Berning et al. ............... 283/91 |
| 4,705,356 A | 11/1987 | Berning et al. ............. 350/166 |
| 4,721,217 A | 1/1988 | Phillips et al. .............. 215/230 |
| 4,756,771 A | 7/1988 | Brodalla et al. ............. 148/6.1 |
| 4,779,898 A | 10/1988 | Berning et al. ............... 283/58 |
| 4,838,648 A | 6/1989 | Phillips et al. .............. 350/166 |
| 4,930,866 A | 6/1990 | Berning et al. ............. 350/320 |
| 5,002,312 A | 3/1991 | Phillips et al. ................ 283/72 |
| 5,009,486 A | 4/1991 | Dobrowolski et al. ...... 350/164 |
| 5,059,245 A | 10/1991 | Phillips et al. ................ 106/22 |
| 5,084,351 A | 1/1992 | Philips et al. ............ 428/411.1 |

(List continued on next page.)

FOREIGN PATENT DOCUMENTS

| | | |
|---|---|---|
| DE | 43 43 387 | 6/1995 |
| EP | 0 756 945 | 2/1997 |
| WO | WO 98/12583 | 3/1998 |
| WO | WO 00/08596 | 2/2000 |

OTHER PUBLICATIONS

McKiernan, et al., "Luminescence and Laser Action of Coumarin Dyes Doped in Silicate and Aluminosilicate Glasses Prepared by the Sol–Gel Technique," J. Inorg. Organomet. Polym., 1(1), pp. 87–103 (1991).

(List continued on next page.)

Primary Examiner—Monique R. Jackson
(74) Attorney, Agent, or Firm—Allen, Dyer, Doppelt, Milbrath & Gilchrist, P.A.

(57) ABSTRACT

Multilayer chromatic diffractive pigment flakes and foils are provided having diffractive structures thereon. The diffractive pigment flakes can have a symmetrical stacked coating structure on opposing sides of a reflective core layer, an asymmetrical stacked coating structure on one side of a reflective layer, or can be formed with one or more encapsulating coatings around the reflective core layer. The diffractive pigment flakes can be interspersed into liquid media such as paints or inks to produce diffractive compositions for subsequent application to a variety of objects. The foils can be laminated to various objects or can be formed on a carrier substrate. The diffractive pigment flakes and foils can be formed with a variety of diffractive structures thereon to produce selected optical effects.

105 Claims, 28 Drawing Sheets

U.S. PATENT DOCUMENTS

| | | | |
|---|---|---|---|
| 5,106,125 A | 4/1992 | Antes | 283/91 |
| 5,135,812 A | 8/1992 | Phillips et al. | 428/403 |
| 5,171,363 A | 12/1992 | Phillips et al. | |
| 5,214,530 A | 5/1993 | Coombs et al. | |
| 5,214,580 A | 5/1993 | Aparo | 364/413.01 |
| 5,254,390 A | 10/1993 | Lu | 428/156 |
| 5,278,590 A | 1/1994 | Phillips et al. | 359/589 |
| 5,279,657 A | 1/1994 | Phillips et al. | 106/22 |
| 5,339,737 A | 8/1994 | Lewis et al. | 101/454 |
| 5,364,467 A | 11/1994 | Schmid et al. | 106/404 |
| 5,464,710 A | 11/1995 | Yang | 430/1 |
| 5,549,774 A | 8/1996 | Miekka et al. | 156/209 |
| 5,549,953 A | 8/1996 | Li | 428/64.1 |
| 5,571,624 A | 11/1996 | Phillips et al. | 428/403 |
| 5,591,527 A | 1/1997 | Lu | |
| 5,624,076 A | 4/1997 | Miekka et al. | 241/3 |
| RE35,512 E | 5/1997 | Nowak et al. | 101/454 |
| 5,629,068 A | 5/1997 | Miekka et al. | 428/148 |
| 5,648,165 A | 7/1997 | Phillips et al. | 428/346 |
| 5,650,248 A | 7/1997 | Miekka et al. | 430/1 |
| 5,672,410 A | 9/1997 | Miekka et al. | 428/148 |
| 5,700,550 A | 12/1997 | Uyama et al. | 428/212 |
| 5,763,086 A | 6/1998 | Schmid et al. | 428/404 |
| 5,856,048 A | 1/1999 | Tahara et al. | 430/1 |
| 5,858,078 A | 1/1999 | Andes et al. | 106/437 |
| 5,912,767 A | 6/1999 | Lee | 359/567 |
| 5,989,626 A | 11/1999 | Coombs et al. | 427/162 |
| 6,013,370 A | 1/2000 | Coulter et al. | 428/403 |
| 6,031,457 A | 2/2000 | Bonkowski et al. | 340/572.1 |
| 6,045,230 A | 4/2000 | Dreyer et al. | |
| 6,068,691 A | 5/2000 | Miekka et al. | 106/403 |
| 6,112,388 A | 9/2000 | Kimoto et al. | 29/17.3 |
| 6,150,022 A | 11/2000 | Coulter et al. | 428/403 |
| 6,157,489 A | 12/2000 | Bradley, Jr. et al. | 359/584 |
| 6,168,100 B1 | 1/2001 | Kato et al. | 241/1 |
| 6,241,858 B1 | 6/2001 | Phillips et al. | 204/192.15 |
| 6,242,510 B1 | 6/2001 | Killey | 523/204 |
| 6,243,204 B1 | 6/2001 | Bradley, Jr. et al. | 359/585 |
| 6,572,784 B1 * | 6/2003 | Coombs et al. | 252/301.16 |
| 2003/0031870 A1 * | 2/2003 | Argoitia et al. | 428/403 |
| 2003/0104206 A1 * | 6/2003 | Argoitia et al. | 428/404 |
| 2003/0129404 A1 * | 7/2003 | Argoitia et al. | 428/403 |

OTHER PUBLICATIONS

J.A. Dobrowolski; K.M. Baird; P.D. Carman; and, A. Waldorf, "*Optical Interference Coatings for Inhibiting of Counterfeiting,*" Optica Acta, 1973, vol. 20, No. 12, 925–937.

Frans Defilet, LGZ Landis & Gyr Zug Corporation, "Kinegrams 'Optical Variable Devices' (OVD's) For Banknotes, Security Documents and Plastic Cards," San Diego, Apr. 1–3, 1987.

S.P. McGrew, "*Hologram Counterfeiting: Problems and Solutions,* " SPIE, vol. 1210 Optical Security and Anticounterfeiting Systems, 1990, pp. 66–76.

Rudolf L. van Renesse, "*Security Design of Valuable Documents and Products,*" SPIE, vol. 2659, Jun. 1996, pp. 10–20.

Steve McGrew, "*Countermeasures Against Hologram Counterfeiting,*" Internet site www.iea.com/–nli/publications/countermeasures.htm, Jan. 6, 2000.

Roger W. Phillips, "*Optically Variable Films, Pigments and Inks,*" SPIE vol. 1323, Optical Thin Films III: New Developments, 1990, pp. 98–109.

Roger W. Phillips and Anton F. Bleikolm, "*Optical Coatings for Document Security,*" Applied Optics, vol. 35, No. 28, Oct. 1, 1996, pp. 5529–5534.

J.A. Dobrowolski; F.C. Ho; and, A. Waldorf, "*Research on Thin Film Anticounterfeiting Coatings at the National Research Council of Canada,*" Applied Optics, vol. 28, No. 15, Jul. 15, 1989, pp. 2702–2717.

J. Rolfe, "*Optically Variable Devices for Use on Bank Notes,*" SPIE, vol. 1210 Optical Security and Anticounterfeiting Systems, pp. 14–19, 1990.

OVD Kinegram Cor, "*OVD Kinegram Management of Light to Provide Security,*" Internet site www.kiknegram.com/xhome/home.html, Dec. 17, 1999.

I.M. Boswarva, et al., "*Roll Coater System for the Production of Optically Variable Devices (OVD's) for Security Applications,*" Proceedings, 33rd Annual Technical Conference, Society of Vacuum Coaters, pp. 103–109 (1990).

Don W. Tomkins, Kurz Hastings, "*Transparent Overlays for Security Printing and Plastic ID Cards,*" Caribe Royale, Orlando, Florida, Nov. 19–21, 1997, pp. 1–8.

Zink, et al., "*Optical Probes and Properties of Aluminosilicate Glasses Prepared by the Sol–Gel Method,*" Polym. Mater. Sci. Eng., 61, pp. 204–208 (1989).

* cited by examiner

CHROMATIC DIFFRACTIVE PIGMENTS AND FOILS

BACKGROUND OF THE INVENTION

1. Field of the Invention

The present invention relates generally to optical effect pigments and foils. In particular, the present invention is related to chromatic diffractive pigment flakes and foils which can have a variety of diffractive structures on their surfaces to produce selected optical effects.

2. Background Technology

Various pigments, colorants, and foils have been developed for a wide variety of applications. For example, diffractive pigments have been developed for use in applications such as creating patterned surfaces, and security devices. Diffractive patterns and embossments have wide-ranging practical applications due to their aesthetic and utilitarian visual effects.

One very desirable decorative effect is the iridescent visual effect created by a diffraction grating. This striking visual effect occurs when light is diffracted into its color components by reflection from the diffraction grating. In general, diffractive gratings are essentially repetitive structures made of lines or grooves in a material to form a peak and trough structure. Desired optical effects within the visible spectrum occur when diffraction gratings have regularly spaced grooves at specified depths on a reflective surface.

The color changing properties of diffraction gratings and like structures are well known, particularly when used to form holographic images on continuous foils. One feature of diffractive surfaces as described above is that they perform better with directional illumination in order to be visualized. The continuous and rapid variation in color with viewing angle or illumination angle under a predominant and well collimated light source is due to the angular dispersion of light according to wavelength in each of the orders of the diffracted beams. In contrast, diffuse light sources, such as ordinary room lights or light from an overcast sky, when used to illuminate the diffractive colorant or image, do not reveal much of the visual information contained in the diffractive colorant or image, and what is typically seen is only a colored or non-colored reflection from the embossed surface.

There have been attempts to exploit the optical effects created by such devices by dispersing small fragments of diffractive particles in a transparent vehicle onto irregular printed surfaces. These efforts include a wide variety of diffractive structures that provide dispersion of visible light such that the viewer perceives a different color depending on the viewer orientation with respect to the diffractive surface or the illumination geometry. However, each structure heretofore created has its limitations, such as a glittery appearance that is aesthetically undesirable for many purposes.

For example, Spectratek Technologies Inc. of Los Angeles, Calif. produces a relatively large diffractive flake that produces particles that create varying colors depending on orientation of illumination or view. However, the large size of the flakes also contributes to a distinct sparkle, or "glittery" appearance. Thick flakes also tend to pile up on one another at high angles causing loss of chroma and color variations that act as glitter. Such flakes are described in U.S. Pat. No. 6,242,510, stating that: "[t]he unique ability of the prismatic platelets 18 to reflect light at many angles presents a constantly changing image as the line of site for the viewer is changed. The overall effect is best described as a myriad of small, bright reflections, similar to the radiant sparkle of crystals, crushed glass or even the twinkle of starlight." (Column 5, lines 56–62).

These particles are described in Spectratek's literature as having a minimum size of 50 by 50 microns. It is because of this relatively large size that they tend to be visible as individual particles. Additionally, because the flake thickness is about 12 microns, a 50 micron particle has an aspect ratio of only about 4:1, and even a relatively large 100 micron particle has an aspect ratio of only about 8:1, thus precluding cooperative orientation with respect to each other and to a substrate. Despite the well recognized need for particulates smaller than 50 microns in many painting and printing methods, neither a reduction in particle size or increase in aspect ratio, i.e., greater than about 8:1, is commercially available. Analysis of these commercial flakes reveals they comprise a metallic foil protected by thick layers of plastic film. The metal layer forms the diffractive structure, which contains linear undulations at a spacing corresponding to about 1,700 to 1,800 lines per mm (ln/mm) with an undulation depth of about 140 nm.

In certain applications the continuous changes in color that can be achieved in a continuous foil form of diffraction grating are more preferred than has been heretofore achieved by flake based pigments. Conventional structures and methods of producing particles with diffractive gratings thereon have rendered such particles unsuitable for achieving the optical features achievable by foil structures. Heretofore, modifications of one structural parameter, while potentially beneficial to optical performance, inevitably have had an adverse impact on another critical characteristic. When the particles are large, disorientation results in a glittery effect. When the particles are small and not well oriented, the multiple colors are no longer distinct but tend to blend in appearance. Thus, even under highly collimated illumination the viewer perceives a washed out color range, rather than bright distinct colors characteristic of a continuous foil.

One attempt to provide more uniform colors, such as is required in color shifting security ink, is described in U.S. Pat. No. 5,912,767 to Lee (hereinafter "Lee"). Lee discloses that particles having a circular arrangement of the diffractive features, with grooves having a frequency of between 1,600 to 2,000 ln/mm (a groove width of 0.4 to 0.6 microns), are necessary to obtain a uniform appearance. In one preferred embodiment Lee discloses that one method of improving the uniformity of the color appearance is modulating the groove spacing with respect to the distance from the center of each particle. However, the circular grating structure is likely to suffer from very low brightness, due to the limited number of effective lines, which represent just a sub-region of very small 20 micron particles, as compared to particles of the same size having a simple linear grating type structure. Further, Lee has no teaching as to particle thickness or groove depth and no quantification of the performance that might provide a motivation to develop an efficient or economic method to produce such complex particles.

U.S. Pat. No. 6,112,388 to Kimoto et al. (hereinafter "Kimoto") teaches the use of inorganic dielectric layers to protect and stiffen a metallic foil. Kimoto requires a rather thick dielectric layer of 1 micron such that the final particle thickness is between about 2.5 and 3 microns. Since the desirable particle size is 25 to 45 microns, this results in an aspect ratio of between about 10:1 to 22:1. At the lower end of such an aspect ratio there is a greater preponderance for disorientation of the particles with respect to the surface of the coated or painted article, which coupled with the relatively large thickness results in a rougher outer surface. The rougher surface detracts from the appearance and is particularly problematic in many applications, such as automotive paint. Although a thicker top gloss coating may partially mask the roughness, it increases the cost and manufacturing cycle time. Increasing the particle size to improve the aspect ratio would make such particles too large for paint spray applications as well as increase the observable glitter effect. While such particles might be amenable to other painting or printing methods, the particles are highly fragile and friable because the thickness of the metal layer is insufficient to increase the fracture toughness of the inorganic material. Thus, the benefits of a higher aspect ratio may not be achievable in the resultant product.

Embossing metal flakes is one conventional approach to producing diffractive particles. However, the necessity of plastically deforming such flakes in order to obtain a permanent modulation height results in particles that do not have the necessary optical characteristics to produce bright distinct colors. For example, U.S. Pat. No. 6,168,100 to Kato et al. (hereinafter "Kato") discloses methods of embossing metal flakes with a diffractive relief pattern. FIG. 7 of Kato depicts an actual micrograph of flakes having a groove frequency measured to have about 1,300 ln/mm with a depth of about 800 nm. The flake appears corrugated in that the actual thickness of the metal layer, which is suggested to be within the range of 0.4 to 1 micron, is less than the groove depth. Since the optical performance requires a stable surface microstructure, the embossing process must plastically deform the metal foil, resulting in a significant groove depth in relationship to the foil thickness. While the resulting corrugated structure might be expected to remain flat transverse to the groove direction due to the stiffening effect of the grooves, the flake also appears to have a distinct curvature in the direction of the grooves.

Similarly, U.S. Pat. Nos. 5,549,774 and 5,629,068 to Miekka et al. disclose methods of enhancing the optical effects of colorants by the application of inks, such as metallic flake inks, metallic effect inks, or inks with pigments formed of optical stacks, upon embossed metallic leafing. These patents suggest that such embossed metallic leafing pigments should have a particle size between 10 to 50 microns for compatibility with painting or printing techniques. The frequency of the diffractive features in the case of linear grooves having a sinusoidal shape are disclosed as greater than about 600 ln/mm with a depth that should be less than about 500 nm.

U.S. Pat. Nos. 5,672,410, 5,624,076, 6,068,691, and 5,650,248 to Miekka et al. disclose a process for forming embossed thin bright metal particles with a metallic thickness of 10 to 50 nm. This is accomplished by metallizing an embossed release surface with aluminum. These patents suggest that the frequency of the diffractive features should be between 500 to 1,100 ln/mm and that the same process could be used to make multi-layer thin film optical stacks having the structure corresponding to an embossed carrier film or substrate. Embossment techniques are limited, however, with thin flakes because they can lead to undesirable flake deformation (curvature or departure from flatness) and/or fracture, thereby diminishing the angular resolution of the particulates as well as the overall brightness.

In summary, the conventional technology teaches various ways of making particulates having a diffraction grating type structure that collectively create some color dispersion when reconstituted and applied to the surface of an object. While the conventional diffractive microstructures produce a characteristic angular dispersion of visible light according to wavelength, other aspects of the particle microstructure and micromechanics favor an assembly of such particles having a less desirable glittery or sparkle appearance. This is shown in the final appearance of articles printed or painted with conventional particulates. Such printed or painted articles have an appearance which is apparently limited by the size, thickness and fragility of the particulates.

SUMMARY OF THE INVENTION

The present invention brings together diffractive effects in combination with thin film interference effects technology to create new color effects hitherto not seen before. In addition, laminar flakes useful in inks, paints, coatings, and cosmetic formulations, as well as in extruded plastics, have been prepared from these combined technologies. The color effects are unique because in diffuse light conditions the color travels from high to low wavelengths as the viewing angle increases. However, in highly directional illumination conditions (e.g., sunlight) the color travels in the opposite direction from low to high wavelengths as the viewing angle increases. In some situations with combined lighting conditions, the color travels in unusual ways because both physical color-shifting phenomena (i.e., diffraction and thin film interference effects) can be seen simultaneously.

In particular, the present invention relates to chromatic (i.e., colored) multilayer diffractive pigment flakes and foils, as well as diffractive compositions which incorporate the pigment flakes. The diffractive pigment flakes and foils have diffractive structures thereon, such as a diffraction grating pattern or a holographic image pattern, which are replicated from an underlying substrate with a diffractive structure on which the flakes or foils are formed. The diffractive pigment flakes and foils can be formed with a variety of diffractive structures thereon to produce selected optical effects.

In particular, the diffractive pigment flakes and foils can be fabricated to have specific diffractive surface microstructures along with physical and micro-mechanical attributes that provide enhanced optical effects. Depending on the desired optical effects, suitable grated microstructures are selected for the production of flakes and foils with the optimal diffractive effects. Such optical effects are created by the right combination of diffractive and reflective optics to produce, for example, strong, eye-catching optical effects that change and flash as the viewer changes position.

In diffuse light, the color observed for the flakes and foils of the invention is dominated by the inherent color by absorption, or color from optically variable effects from optical thin film interference. In the presence of a point source of light (e.g., the sun), the color observed is a combination of the optical effects under diffuse illumination (the background color) and the diffracted light.

In various embodiments, optical diffractive effects are visually perceived over one or more background colors when the diffractive compositions or foils are applied to an object. For example, a color shifting background can be exhibited by the diffractive compositions or foils. Such color shifting produces a first background color at a first angle of viewing and a second background color different from the first background color at a second angle of viewing. The diffractive compositions or foils also produce an optical diffractive effect over the first and second background colors.

The diffractive pigment flakes can be formed to have a symmetrical stacked coating structure on opposing sides of a reflective core layer, an asymmetrical stacked coating structure on one side of a reflective layer, or can be formed with one or more encapsulating coatings around a reflective core layer. The diffractive pigment flakes can be interspersed into liquid media such as paints or inks to produce diffractive compositions for subsequent application to a variety of objects. The foils can be laminated to various objects or can be formed on a carrier substrate. The diffractive compositions and foils can be applied to a variety of objects to add unique decorative features as well as both visually perceptible and non-visually perceptible security features.

These and other features of the present invention will become more fully apparent from the following description and appended claims, or may be learned by the practice of the invention.

BRIEF DESCRIPTION OF THE DRAWINGS

In order to illustrate the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
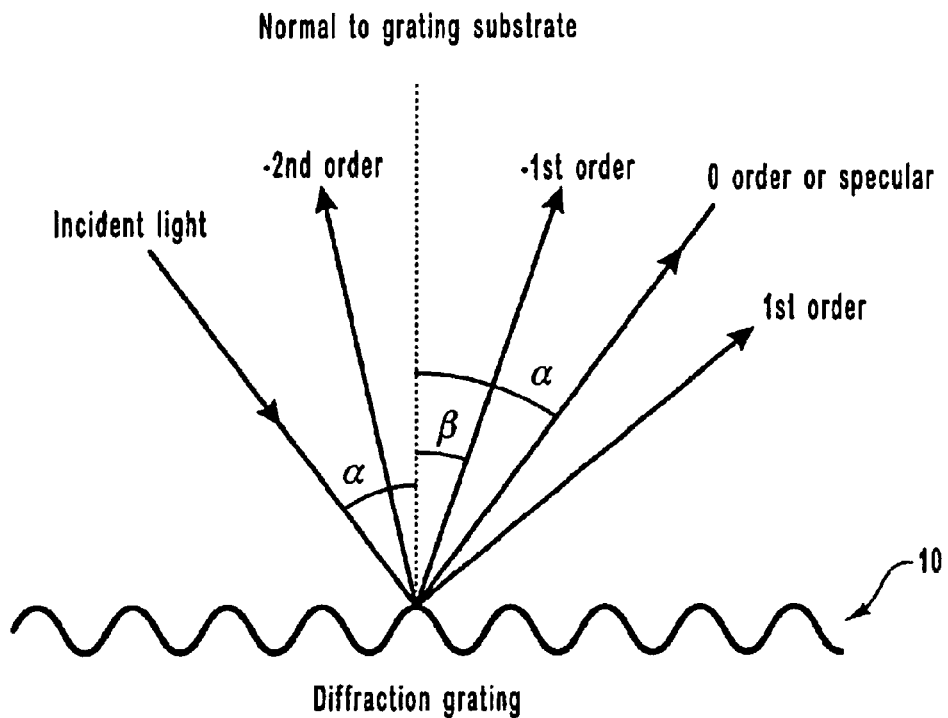
FIG. 1 is an illustration depicting the separation of polychromatic light into its component wavelengths by a diffraction grating.

The present invention is directed to chromatic diffractive pigment flakes and foils, as well as diffractive compositions which incorporate the pigment flakes. The term "chromatic" as used herein refers to the strength of the color or chroma produced by the pigment flakes or foils. The background color of the flakes and foils of the invention can be color shifting, or can be a non-shifting single color.

As used herein, the term "non-shifting" denotes pigments and foils that possess an intrinsically fixed background color independent of the viewer's position. Such pigments and foils can be multilayer interference pigments, where the background color is created by interference effects, or can be non-interference pigments and foils which have an intrinsic color.

The diffractive pigment flakes and foils of the invention can be used to add unique decorative features to products, as well as both visually perceptible and non-visually perceptible security features to a variety of objects. The diffractive pigment flakes and foils have diffractive structures thereon, such as a diffraction grating pattern or a holographic image pattern, which are replicated from an underlying substrate with a diffractive structure on which the flakes or foils are formed. The diffractive pigment flakes and foils can be formed with a variety of diffractive structures thereon to produce selected optical effects.

In selecting a design to achieve a desired background color or colors, it is important to consider that the color shifting obtained by interference reflective optics travels from higher wavelengths to shorter wavelengths when the viewing angle is increased. In contrast, the color changes obtained by diffractive optics travels from shorter wavelengths to higher wavelengths when the viewing angle is increased. When these optical phenomena are combined they produce some unusual conditions of mixed colored light beams as the viewing angle is changed. These conditions can be tailored to create new optical effects. Thus, when diffraction optics are incorporated into pigment flakes or foils, a unique color dimension is created from the large choice of background color effects provided by interference coatings, combined with the many different diffractive effects available from diffractive structures. Additionally, combining diffractive structures with interference coatings creates optical effects that maintain high chroma even at high angles of view.

In some embodiments, color shifting diffractive pigments are obtained when interference pigments that produce a color shift as the viewing angle changes are combined with diffractive surfaces, which create an iridescent color shifting effect that has strong viewability from all angles of view. Such structures have an additional feature in that the color shifting and diffractive effects are only visually perceptible in focal light, such as direct sunlight. In diffuse light the various orders of diffraction from diverse angles cancel each other and result in a single visually perceptible color.

The non-shifting or color shifting background colors of the flakes and foils of the invention can be obtained by any combination of organic or inorganic layers with selective or non-selective, single or combined optical properties such as absorption, emission, reflection, scattering, fluorescence, and the like. The structural differences between interference non-shifting and color shifting multilayer structures vary depending on the selected materials and desired colors, but are typically characterized by differences in the thickness and refractive index of dielectric materials within the multilayer structures. For example, a dielectric material with an index of refraction greater than about 1.65 having an optical thickness at a selected design wavelength typically results in a non-shifting or slight color shifting structure, as discussed in U.S. Pat. No. 6,243,204 B1 of Bradley, Jr. et al., which is incorporated by reference herein. A dielectric material with an index of refraction of about 2 or greater having an optical thickness with a low number of quarter waves (i.e., about 1–2 QW), typically results in a low color shift or no color shift at all. A dielectric material with an index of refraction of about 1.65 or less having an optical thickness at a selected design wavelength typically results in a color shifting structure exhibiting a discrete shift between two different background colors as the angle of incident light or viewing angle changes.

Depending on the desired optical effects, suitable grated microstructures are selected for the production of the diffractive flakes and foils with the desired optimal diffractive effects. For example, the pigment flakes or foils can include a higher frequency diffractive grating microstructure, such as a diffraction grating pattern having greater than about 1100 grating lines per mm (ln/mm), to create a wide range of optical effects. Such a diffraction grating pattern can have a grating depth of at least about 100 nm.

In some embodiments of the invention, the diffractive flakes and foils provide strong eye-catching optical effects, the optical effects created by the right combination of diffractive and reflective optics that change and flash as the viewer changes position. Such eye-catching optical effects include iridescent effects and optionally color shifting effects, and can be used to create both decorative features as well as visually perceptible security features.

In other embodiments of the invention, covert security features can be provided in the diffractive pigment flakes or foils. In such embodiments, the diffractive effects are only perceptible outside the visible wavelength range, such as in the ultraviolet (UV) or infrared (IR) wavelength ranges. This covert feature is produced by using gratings which only preferentially create diffractive effects in the UV or IR wavelength range. For example, at normal incidence, flakes with a grating frequency below about 500 ln/mm produce diffractive effects that are not perceptible in the visible spectrum to human eyes, but do show diffractive effects in the wavelength range of about 800 nm to about 1600 nm, which is readable by an analytical instrument. Thus, a conventional IR detection apparatus can be configured to quickly and accurately detect the presence of such diffractive flakes, while the unaided human eye is unable to detect the presence of the diffractive structures.

The flakes of the invention can be formed to have a physical thickness of about 500 nm to about 6 microns (6,000 nm), preferably about 800 nm to about 1400 nm (1.4 microns). Although the flakes of the present invention are not of a uniform shape, the flakes can have an average particle size or "width" across the major surfaces thereof of about 50 microns or less, and preferably about 25 microns or less. The aspect ratio of flake width to flake thickness for the flakes of the invention is at least about 10:1, and preferably at least about 25:1.

The diffractive foils of the invention can be formed to have a physical thickness of about 12.5 microns to about 200 microns, and preferably about 12.5 microns to about 50 microns.

The line frequency of the diffractive structure on the flakes and foils is preferably greater than about 1,200 ln/mm, such that light corresponding to the range of visible wavelengths in the first or higher order diffracted beams is substantially angularly separated from the same range of wavelengths in higher order diffracted beams when illuminated at normal incidence up to at least about 60 degrees from normal incidence. Additionally, the diffractive structure amplitude, which in a grating is the depth of the grooves, is such that the zero order diffracted beam is substantially suppressed in intensity so that the intensity of the higher order beams are enhanced over the desired range of wavelengths and/or angles of incidence.

Accordingly, in one embodiment of the invention, the diffractive structure is a linear blazed (i.e., sawtooth shape) grating having a frequency of at least about 1,400 ln/mm and a groove depth greater than about 140 nm. In another embodiment of the invention, the diffractive structure is a linear sinusoidal grating having a frequency of at least about 2,000 ln/mm and a groove depth greater than about 140 nm.

Under such conditions, high reflectivity and stiffness at the optimum aspect ratio and particle size for the flakes is preferably obtained by depositing multiple thin film layers on a substrate with a structured surface having a releasable intermediate coating layer such that appropriately sized flakes defoliate from the substrate surface replicating its shape. The diffractive flakes and foils of the invention can be formed using conventional thin film deposition techniques, which are well known in the art of forming thin coating structures. Nonlimiting examples of such thin film deposition techniques include physical vapor deposition (PVD), chemical vapor deposition (CVD), plasma enhanced (PE) variations thereof such as PECVD or downstream PECVD, sputtering, electrolysis deposition, and other like deposition methods that lead to the formation of discrete and uniform thin film layers. The physical and chemical vapor deposition methods provide for adequate replication of a smooth, relief varying substrate without the introduction of undesirable surface roughness.

In some embodiments, the diffractive pigment flakes are fabricated to have specific diffractive surface microstructures along with physical and micro-mechanical attributes that provide enhanced optical effects and which overcome the deficiencies in prior conventional diffractive pigments. In conventional diffractive particulate pigments, the reflected color is so highly sensitive to the viewing and illumination conditions that the diffractive particulate must possess previously mutually exclusive characteristics of: 1) a small particle size, stiffness and high aspect ratio to favor cooperative orientation of all the particulates substantially parallel to a coated article's surface, or other preferred orientation; 2) limitations in the angular range and/or intensity of characteristic color; and 3) enhancement of the brightness of the reflected color to overcome the inherent decrease arising from the small particle size. When other characteristics are optimized, simple linear grating structures on the flakes of the invention provide a greater brightness than more complicated variations in grating structure that have been suggested in the prior art, such as concentric or spatially modulated gratings.

Accordingly, the diffractive particulate preferably comprise rigid platelet or flake-like particles having at least one highly reflective layer containing a diffractive structure, such as a spatial modulation in height (with respect to a reference plane defined by the major axis of the platelet or flake). The flakes are substantially rigid due to either the mechanical properties of the reflective layer, a rigid transparent overcoating or a rigid central layer.

Although the majority of the discussion herein is directed to diffractive gratings, it will be understood by those skilled in the art that holographic image patterns can be substituted for the gratings in many of the embodiments.

Diffractive Grating Design Technique

In one aspect of the invention, a design technique is provided which utilizes diffraction grating theory to select suitable microstructures for the fabrication of flakes or foils with desired diffractive properties. In this technique, various grating shapes can be modeled with conventional optical software to suppress and/or control the specular reflection intensity and spatial location of the diffractive orders to obtain an optimum grating design. Various grating shapes can be selected for modeling, such as triangular symmetrical, triangular blazed, square-wave with different top plateau sizes, and sinusoidal gratings with different groove frequencies and depth profiles. The modeling results can then be used to select grating substrates for the deposition of coating layers to form pigments and foils as described hereafter. Specific modeling results are set forth in the Examples section hereafter.

Diffraction grating theory indicates that the efficiency of the zero and successive orders can be optimized, thereby allowing for the production of grated flakes or foils having desired optical properties. These flakes or foils have diffractive optical properties that can be tailored depending on the final desired optical effect. Because the color of traditional pigments fades strongly at high view angles, diffractive effects can be introduced in addition to the combined refractive, reflective, absorbing, and the like optical properties of traditional pigments. As a result, diffractive pigments will create strong beams of diffracted light, even at high viewing angles.

Figure 2:
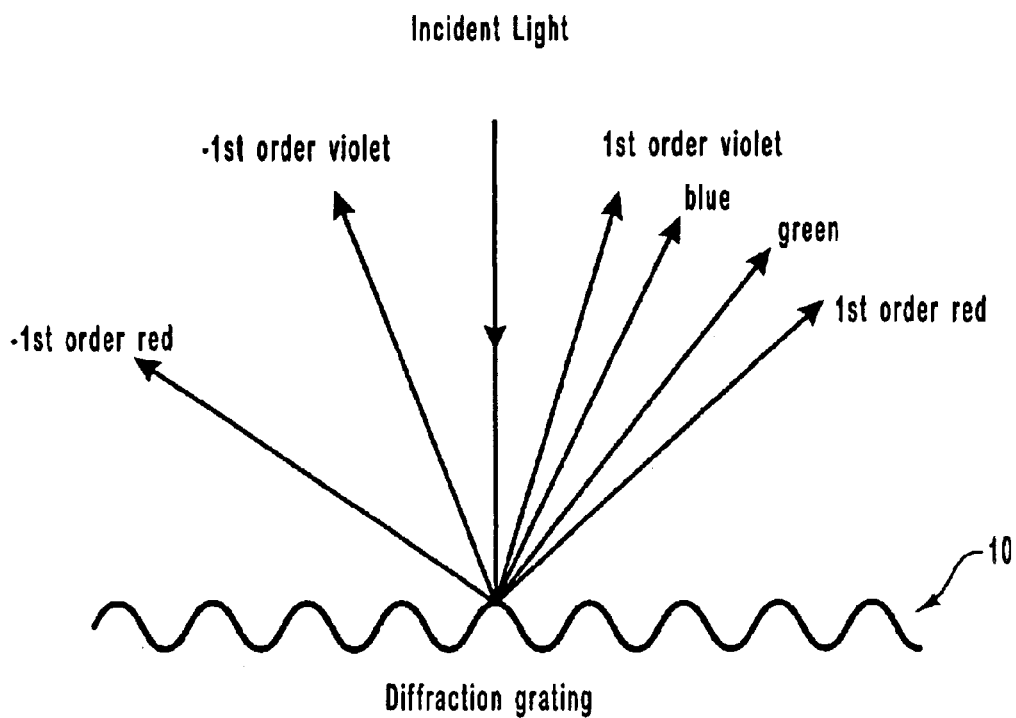
FIG. 2 is another illustration depicting the separation of polychromatic light into its component wavelengths by a diffraction grating.

FIGS. 1 and 2 are schematic depictions of the operation of a conventional diffraction grating 10 showing the separation (diffraction) of polychromatic light (white light) into its component wavelengths (rainbow). As illustrated in FIG. 1, light incident on a grating surface at an angle that is not normal to the surface creates a zero order or specular reflection that is a mirror effect color. The diffractive grating 10 creates a first order diffraction ($-1^{st}$ order and $1^{st}$ order) surrounding the zero order reflection. Similarly, a second order diffraction is created at higher angles than the first order diffraction.

FIG. 2 further illustrates the color effects that result from light incident on a diffractive surface. In this case the incident light is normal to the grating. First order colors corresponding to a rainbow of colors are produced at different angles surrounding the specular reflection.

For a unique set of discrete angles and for a given spacing "d" between grating peaks, the diffracted light from each facet of the grating is in phase with the light diffracted from any other facet, so they combine constructively, as described by Equation 1:

$$Gm\lambda = \sin \alpha + \sin \beta \qquad \text{(equation 1)}$$

where $G=1/d$ is the groove density or pitch, $\alpha$ is the angle between the incident light and the normal to the grating, $\beta$ is the angle between the diffracted beam and the normal to the grating, and m is an integer called the diffraction order. For m=0, $\beta=-\alpha$ for all wavelengths ($\lambda$), and the grating acts as a mirror, with the wavelengths not being separated from each other. This is called specular reflection or zero order.

The angular dispersion is a measure of the angular spread $\partial \beta$ of a spectrum of order m between the wavelengths $\lambda$ and $\lambda+\partial\lambda$. It is defined as $\partial\beta/\partial\lambda = m/d\cos\beta$ and indicates that the closer the space between grooves (higher frequency), the stronger the angular dispersion. In other words, the angular separation between wavelengths increases for a given order m with higher groove frequencies.

For a given grating frequency, each successive order is wider (stronger angular dispersion), however, overlapping of the spectra will occur for lower frequency gratings. This also leads to target angular dispersion between orders. The closer the space between grooves, the farther apart will be the diffractive orders. In other words, the space between grooves of a grating determines the order separation.

A grating on a larger sized particle will improve the definition of the various orders, resulting in a better resolving power, since multiple grating lines are present on the particle. The resolving power R is a measure of the ability of a grating to separate adjacent spectral lines. For a planar diffraction grating, the resolving power is given by R=mN, where m is the diffraction order and N is the total number of grooves illuminated on the surface of the grating. Replacing Gm from Equation 1 with Nd, a more meaningful expression can be obtained:

$$R = Nd(\sin \alpha + \sin \beta)/\lambda \quad \text{(equation 2)}$$

where the quantity Nd is simply the grating width (W). As expressed by Equation 2, R is not dependent explicitly on the order or the number of grooves; these parameters are contained within the grating width and the angles of incidence and diffraction. The maximum attainable resolving power is then $R_{max} = 2W/\lambda$. The degree to which the theoretical resolving power is attained depends also on the optical quality of the grating surface. In general, it is considered that any departure greater than $\lambda/10$ from flatness for a plane grating will result in a loss of resolving power.

P-polarization or TE polarized light is defined when the light is polarized parallel to the grating grooves, while S-Polarization or TM polarized light is polarized perpendicular to the grating grooves.

Equation 1 is applicable in the case that the incident and diffracted rays are perpendicular to the grooves (as normally positioned in spectroscopic instrumentation and termed in-plane diffraction). If the incident light is not perpendicular to the grooves, equation 1 has to be modified as:

$$Gm\lambda = \cos \epsilon (\sin \alpha + \sin \beta) \quad \text{(equation 3)}$$

where $\epsilon$ is the angle between the incident light path and the plane perpendicular to the grooves at the grating center. For geometries where $\epsilon$ is different than zero (azimuthal rotation of the grating), the diffracted spectra lie on a cone rather than in a plane, so such cases are termed conical diffraction. In addition, for a given grating frequency, the depth of the grooves determines the relative intensity of the various orders.

The previous points related to diffraction grating theory can be used in modeling and designing appropriate diffraction grating structures for fabricating the flakes and foils of the invention. For example, the definition of the resolving power indicates that in the case of diffractive flakes, smaller flake particles may require a higher groove frequency. In addition, reduction of zero order effects and increasing the intensity of the first orders may accomplish enhancement of diffractive effects, while overlapping of the spectrum of successive orders may cause loss of visual diffractive effects (loss of chroma) in the diffracted light.

Further, if a grating is azimuthally rotated about an axis perpendicular to the plane of the substrate, cones of the diffracted orders surrounding the specular reflection (zero order) will appear. In most flake-based pigment applications, the paint or ink medium includes an ensemble of small azimuthal pigment flakes that are randomly oriented. In the case of flakes with diffractive grating microstructures, the flake size and the random orientation are strong factors in the optical performance of the ensemble. Accordingly, diffractive pigment flakes in a random azimuthal orientation within a pigment medium such as a paint or ink create rings of diffracted light that are non-existent in non-diffractive flakes.

In addition, gratings work as well in reflection as in transmission. Thus, complex light paths will occur in an optically variable or color shifting stack when diffractive structures are superimposed thereon. The optical effects produced thereby are the combination of thin film interference and diffractive interference effects.

As mentioned before, the amount of energy relative to the incident energy (efficiency) of gratings varies as a function of the groove frequency, shape, and depth. As a result, the grating can be optimized for specific wavelengths through modeling. Thus, suitable diffraction grating structures for use in forming the flakes and foils of the invention can be selected that have specified line frequencies, groove shapes, and groove depths, so that the grating is optimized for specific color characteristics. The grating frequency and depth is determined for a particular grating based upon the equations and considerations outlined hereinabove.

In some embodiments of the invention, a grating structure is utilized having a diffraction grating pattern with a frequency of from about 1000 to about 4000 grating ln/mm, preferably from about 1400 to about 3500 grating ln/mm, and more preferably from about 1400 to about 2000 grating ln/mm. Further, the gratings can have a groove depth of about 20 nm to about 300 nm, and preferably from about 100 nm to about 250 nm.

Various shaped gratings can be selected for the grating structures used in the present invention such as triangular symmetrical gratings, triangular blazed gratings, square-wave gratings, sinusoidal gratings, and the like. Alternatively, the grating can be a cross grating having perpendicular or non-perpendicular intersecting grooves, which create multiple diffractive patterns at various angles in different planes simultaneously.

Additional details related to the selection of appropriate grating structures are disclosed in copending U.S. patent application Ser. No. 09/919,346, filed on Jul. 31, 2001, the disclosure of which is incorporated by reference herein.

Figure 3:
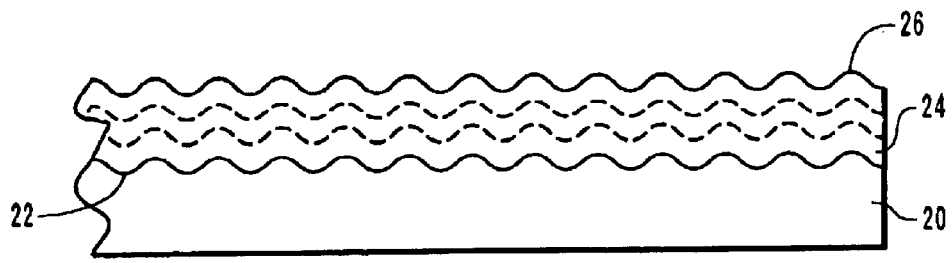
FIG. 3 is a schematic depiction of a web or foil grating which can be used to form the diffractive pigment flakes and foils of the invention.

Referring now to the drawings, wherein like structures are provided with like reference designations, the drawings only show the structures necessary to understand the present invention. FIG. 3 is a schematic depiction of web or foil diffractive grating 20 having a diffractive structure 22 on an upper surface thereof which can be used to form the diffractive pigment flakes or foils according to the invention. The grating line frequency and depth can be determined for a particular grating utilized based upon the equations and considerations set forth previously. For example, a diffraction grating can be employed so that a formed flake or foil will have a diffractive structure thereon with a pitch and amplitude selected to decrease the intensity of a zero order diffracted light beam in order to increase the intensity and color contrast of at least one higher order diffracted light beam. In one embodiment, the diffractive structure has a pitch of at least about 1,400 ln/mm and an amplitude modulation provided by a change in surface depth of at least about 100 nm. In a further embodiment, the diffractive structure can be about 3,000 ln/mm or less, and the change in surface depth can be about 220 nm or less.

A multiple layer coating 24 is formed on the upper surface of grating 20, such as by conventional deposition techniques, so that diffractive structure 22 is replicated in coating 24 which forms a thin film structure. As illustrated, coating 24 replicates the topography of grating 20 so that the grating peaks and channels are present on opposing surface 26 of coating 24. When the thin film structure of coating 24 is used to form flakes, coating 24 is subsequently fractured and removed from grating 20, such as by either dissolution in a solvent or by way of a release layer, to form a plurality of diffractive pigment flakes. The diffractive structure is formed on at least a portion of one or both of the major surfaces of the pigment flakes. When the thin film structure of coating 24 is used to form a foil, the thin film structure can be applied to a non-release, diffractive grating substrate.

Coating 24 generally includes a reflector layer and one or more layers of a different material that has a substantially higher modulus of elasticity than the reflective material of the reflector layer, which increases the stiffness of a diffractive pigment flake. For example, a dielectric layer can be formed on one or both major surfaces of the reflector layer.

The dielectric layer can be composed of a substantially transparent dielectric material. Additional layers such as an absorber layer can be formed on the dielectric layer.

The diffractive structure on the flake or foil is capable of producing an angular separation of first and second order diffracted light beams when incident light is normal to the flake or foil such that there is no angular superposition of wavelengths from about 400 nm to about 800 nm within the first and second order diffracted light beams. The diffractive structure can also be characterized at normal incidence by a ratio of zero order intensity to first order intensity of at least about 0.25 and an angular separation between zero order and first order diffracted or reflected light beams of at least about 30 degrees.

The diffractive structure on the flakes or foils can be a diffraction grating pattern with at least about 1,400 ln/mm and a grating depth of at least about 100 nm. Preferably, the diffraction grating pattern can have from about 1400 to about 3500 ln/mm, with a grating depth from about 100 nm to about 300 nm. More preferably, the diffraction grating pattern can have from about 1400 to about 2000 ln/mm, and a grating depth from about 140 nm to about 220 nm.

The web or foil gratings utilized can be obtained from various commercial sources. In addition, the web or foil gratings can be produced from a thermoplastic film that has been embossed by heat softening the surface of the film and then passing the film through embossing rollers which impart a diffraction grating or holographic image onto the softened surface. In this way, sheets of effectively unlimited length can be formed with the diffraction grating or holographic image thereon. Alternatively, the diffractive structure on the web or foil can be made by passing a roll of plastic film coated with a UV curable polymer, such as polymethylmethacrylate (PMMA), through a set of UV transparent rollers whereby the rollers set a diffractive surface into the UV curable polymer and the polymer is cured by a UV light that passes through the UV transparent rollers. Other methods of forming an embossed surface on a substrate are disclosed in U.S. Pat. No. 5,549,774 to Miekka et al., which is incorporated by reference herein.

Diffractive Pigment Flakes

Figure 4:
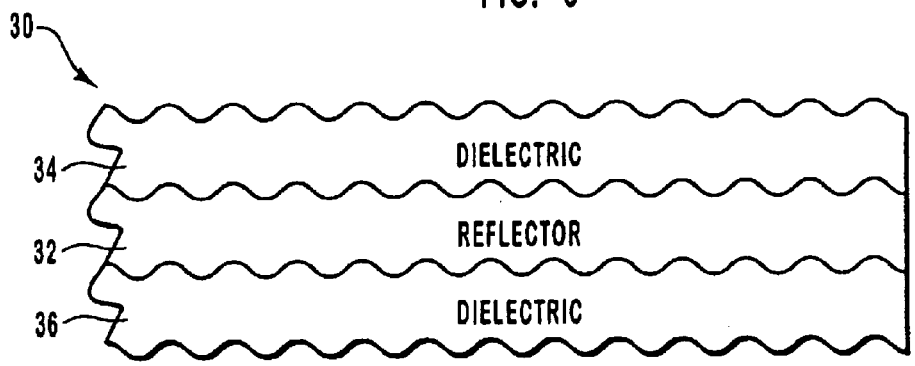
FIG. 4 is a schematic representation of the coating structure of a diffractive pigment flake according to one embodiment of the invention.

FIG. 4 depicts the coating structure of a non-shifting diffractive flake 30, which has been produced from a multiple layer coating that only has inherent color by absorption or by interference. The flake 30 can have a three layer design with a generally symmetrical thin film structure, including a central reflector layer 32 and opposing dielectric layers 34 and 36 on opposing major surfaces of reflector layer 32 but not on at least one side surface of the reflector layer. Alternatively, flake 30 can be formed with a two layer design, including reflector layer 32 and one of dielectric layers 34 or 36. The dielectric layers provide increased rigidity and durability to flake 30. In this embodiment, a non-shifting background color of the flakes is provided by interference effects, and the flakes will display a diffractive effect because of the diffractive structure on the surfaces thereof. The grating frequency and depth of the diffractive structure of flake 30 can be determined and formed as described hereinabove.

The reflector layer 32 is preferably composed of reflective materials such as various metals or metal alloys because of their high reflectivity and ease of use, although non-metallic reflective materials can also be used. Nonlimiting examples of suitable metallic materials include aluminum, silver, copper, gold, platinum, tin, titanium, palladium, nickel, cobalt, rhodium, niobium, chromium, and compounds, combinations or alloys thereof. Examples of suitable reflective alloys and compounds include bronze, brass, titanium nitride, and the like, as well as alloys of the metals listed above such as silver-palladium. The reflector layer 32 preferably comprises a reflective material with inherent color such as copper, gold, silver copper alloys, brass, bronze, titanium nitride, and compounds, combinations or alloys thereof.

The dielectric layers 34 and 36 can comprise various dielectric materials, such as those having a refractive index of greater than about 1.3. For example, the dielectric layers 34 and 36 can be composed of dielectric materials having a "high" refractive index of greater than about 1.65, and preferably greater than about 2. Nonlimiting examples of suitable high index dielectric materials include zinc sulfide (ZnS), zinc oxide (ZnO), zirconium oxide ($ZrO_2$), titanium dioxide ($TiO_2$), diamond-like carbon, indium oxide ($In_2O_3$), indium-tin-oxide (ITO), tantalum pentoxide (Ta205), cerium oxide ($CeO_2$), yttrium oxide ($Y_2O_3$), europium oxide ($Eu_2O_3$), iron oxides such as (II)diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon, silicon monoxide (SiO), selenium trioxide ($Se_2O_3$), tin oxide ($SnO_2$), tungsten trioxide ($WO_3$), combinations thereof, and the like. Other suitable high index dielectric materials include mixed oxides such as those described in U.S. Pat. No. 5,989,626 to Coombs et al., the disclosure of which is incorporated by reference herein. When the materials of U.S. Pat. No. 5,989,626 are used as dielectric layers, they are most commonly oxidized to their stoichiometric state such as $ZrTiO_4$. Non-limiting examples of such mixed oxides include zirconium titanium oxide, niobium titanium oxide, combinations thereof, and the like.

Additionally, dielectric materials having a "low" index of refraction can be used, such as those with a refractive index of about 1.65 or less. Nonlimiting examples of suitable low refractive index dielectric materials include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

It should be appreciated that several of the above-listed dielectric materials are typically present in non-stoichiometric forms, often depending upon the specific method used to deposit the dielectric material as a coating layer, and that the above-listed compound names indicate the approximate stoichiometry. For example, silicon monoxide and silicon dioxide have nominal 1:1 and 1:2 silicon::oxygen ratios, respectively, but the actual silicon:oxygen ratio of a particular dielectric coating layer varies somewhat from these nominal values. Such non-stoichiometric dielectric materials are also within the scope of the present invention.

The reflector layer 32 can have a physical thickness of from about 10 nm to about 200 nm. If opacity is desired, the reflector layer 32 can have a physical thickness of from about 40 nm to about 200 nm, and preferably from about 80 nm to about 160 nm. However, it should be appreciated that if desired, a semi-opaque reflector layer can be provided. Typically, a reflective metal layer becomes opaque at approximately 35–40 nm. Thus, where semi-opaqueness is desired, the reflector layer can have a physical thickness of less than about 50 nm, and preferably less than about 40 nm. For example, a 10 nm thickness can be utilized effectively to provide a semi-opaque reflector layer.

The dielectric layers 34 and 36 can each have a physical thickness of about 10 microns or less, preferably about 5 microns or less, and more preferably about 3 microns or less, such as from about 200 nm to about 600 nm, and preferably from about 250 nm to about 450 nm. The total thickness of flake 30 is less than about 1500 nm, preferably less than about 1,400 nm, and more preferably from about 500 nm to about 900 nm.

In a method for fabricating a plurality of diffractive flakes corresponding to flake 30, the dielectric layers and reflector layer are deposited on a web or foil grating in a sequential manner according to the desired two layer or three layer flake design to form a multiple layer coating having a thin film structure. This thin film structure is subsequently fractured and removed from the grating to form a plurality of diffractive pigment flakes.

Figure 5:
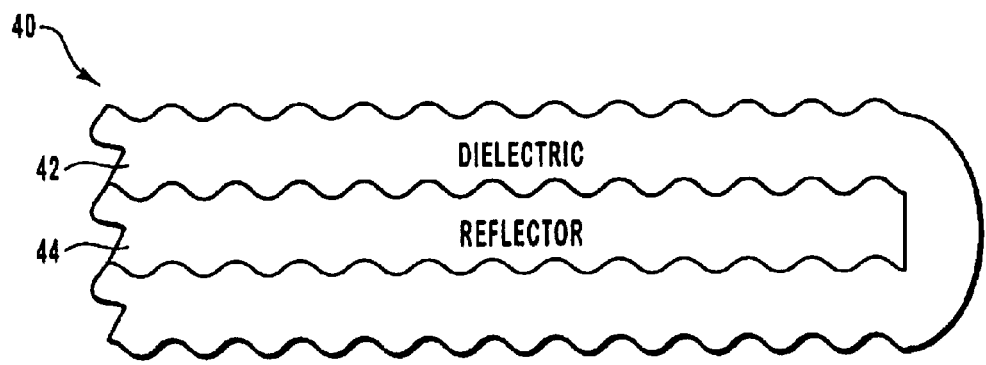
FIG. 5 is a schematic representation of the coating structure of a diffractive pigment flake according to another embodiment of the invention.

FIG. 5 depicts the coating structure of a diffractive flake 40 according to an alternative embodiment of the invention. The flake 40 has a two layer design with a contiguous dielectric layer 42 substantially surrounding and encapsulating a central reflector layer 44. The dielectric layer and reflector layer of flake 40 can be composed of the same materials and can have the same thicknesses as described previously for the corresponding layers in flake 30. The grating frequency and depth of the diffractive structure of flake 40 can be determined and formed as described hereinabove.

In a method for fabricating a plurality of diffractive flakes corresponding to flake 40, one or more thin film layers including at least a reflective layer is deposited on a web or foil grating to form a diffractive thin film structure, which is subsequently fractured and removed from the grating to form a plurality of diffractive pigment preflakes corresponding to reflector layer 44. The preflakes can be fragmented further by grinding if desired. The preflakes are then coated with dielectric layer 42 in an encapsulation process to form a plurality of diffractive pigment flakes. When an encapsulation process is used, it will be appreciated that the encapsulating layer is a continuous layer composed of one material and having substantially the same thickness around the flake structure.

Figure 6A:
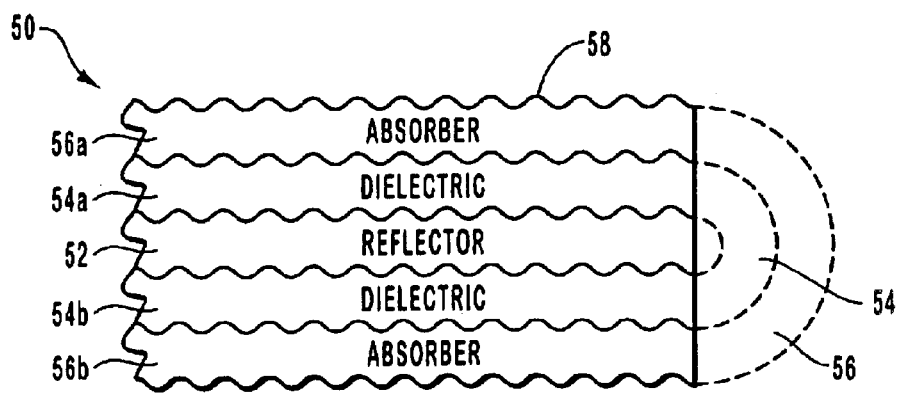
FIGS. 6A and 6B are schematic representations of the coating structure of diffractive pigment flakes according to further embodiments of the invention.

Referring now to FIG. 6A, depicted is a color shifting diffractive pigment flake 50 according to another embodiment of the invention. The flake 50 has a generally symmetrical multilayer thin film structure having coating layers on opposing sides of a reflector layer 52. As illustrated, first and second dielectric layers 54a, 54b overlie opposing sides of reflector layer 52, and first and second absorber layers 56a, 56b overlie first and second dielectric layers 54a, 54b, respectively. A diffractive grating structure 58 is replicated in all of the layers of flake 50. The grating frequency and depth of diffractive grating structure 58 can be determined and formed as described hereinabove.

The coating design of pigment flake 50 in combination with the diffractive grating structure produces a color shifting background color over which a diffractive optical effect is observable. For example, the dielectric layers of flake 50 can be formed with an optical thickness at a selected design wavelength such that a pigment composition, including a plurality of flakes corresponding to flake 50, exhibits an iridescent diffractive effect over a color shifting background when applied to an object.

The reflector layer 52 of flake 50 can be composed of various reflective materials, such as those discussed previously with respect to reflector layer 32 of flake 30. The reflector layer 52 can be formed to have a suitable physical thickness of from about 40 nm to about 200 nm, and preferably from about 40 nm to about 160 nm. Alternatively, the reflector layer may be partially transparent (i.e., semi-opaque) so that its physical thickness is in the range from about 10 nm to about 40 nm.

The dielectric layers 54a, 54b act as spacers in the thin film stack structure of flake 50. These layers are formed to have an effective optical thickness for imparting interference color and desired color shifting properties. The dielectric layers may be optionally clear, or may be selectively absorbing so as to contribute to the color effect of the pigment. The optical thickness is a well known optical parameter defined as the product $\eta d$, where $\eta$ is the refractive index of the layer and d is the physical thickness of the layer. Typically, the optical thickness of a layer is expressed in terms of a quarter wave optical thickness that is equal to $4\eta d/\lambda$, where $\lambda$ is the wavelength at which a QWOT condition occurs. The optical thickness of the dielectric layers can range from about 2 QWOT to about 9 QWOT at a selected design wavelength, and preferably from about 2 QWOT to about 6 QWOT, depending upon the color shift desired. The dielectric layers typically have a physical thickness of from about 60 nm to about 1000 nm, and preferably from about 200 nm to about 700 nm, depending on the color characteristics desired.

The dielectric layers 54a and 54b in flake 50 can be composed of various dielectric materials, such as the high index or low index dielectric materials set forth previously with respect to dielectric layers 34 and 36 of flake 30. Each of the dielectric layers can be formed of a single material or with a variety of material combinations and configurations. For example, the dielectric layers can be formed of only a low index material or only a high index material, a mixture or multiple sublayers of two or more low index materials, a mixture or multiple sublayers of two or more high index materials, or a mixture or multiple sublayers of low index and high index materials.

The dielectric layers can each be composed of the same material or a different material, and can have the same or different optical or physical thickness for each layer. It will be appreciated that when the dielectric layers are composed of different materials or have different thicknesses, the flakes exhibit different colors on each side thereof and the resulting mix of flakes in a pigment or paint mixture would show a new color which is the combination of the two colors. The resulting color would be based on additive color theory of the two colors coming from the two sides of the flakes. In a multiplicity of flakes, the resulting color would be the additive sum of the two colors resulting from the random distribution of flakes having different sides oriented toward the observer.

The absorber layers 56a and 56b of flake 50 can be composed of any absorber material having the desired absorption properties, i.e., a material having an absorption coefficient in the visible constant (n almost equal to k) or a material in which the absorption coefficient varies across the electromagnetic range (n different that k and variable). Thus, selective absorbing materials or nonselective absorbing materials can be used. For example, the absorber layers can be formed of nonselective absorbing metallic materials deposited to a thickness at which the absorber layer is at least partially absorbing, or semi-opaque.

Nonlimiting examples of suitable absorber materials for absorber layers 56a and 56b include metallic absorbers such as chromium, nickel, aluminum, silver, copper, palladium, platinum, titanium, vanadium, cobalt, iron, tin, tungsten, molybdenum, rhodium, and niobium, as well as corresponding metal oxides, metal sulfides, metal carbides, metal nitrides, and metal phosphides. Other suitable absorber materials include carbon, graphite, silicon, germanium, cermets, metals mixed in a dielectric matrix, and other substances that are capable of acting as a uniform or selective absorber in the visible spectrum. Various combinations, mixtures, compounds, or alloys of the above absorber materials may be used to form the absorber layers of flake 50.

Examples of suitable alloys of the above absorber materials include Inconel (Ni—Cr—Fe), stainless steels, Hastalloys (e.g., Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. As mentioned above, the absorber layers can also be composed of an absorbing metal oxide, metal sulfide, metal carbide, metal nitride, metal phosphide, or combinations thereof. For example, one preferred absorbing sulfide material is silver sulfide. Other examples of suitable compounds for the absorber layers include titanium-based compounds such as titanium nitride (TiN), titanium oxynitride ($TiN_xO_y$), titanium carbide (TiC), titanium nitride carbide ($TiN_xC_z$), titanium oxynitride carbide ($TiN_xO_yC_z$), titanium silicide ($TiSi_2$), titanium boride ($TiB_2$), and combinations thereof. In the case of $TiN_xO_y$ and $TiN_xO_yC_z$, preferably x=0 to 1, y=0 to 1, and z=0 to 1, where x+y=1 in $TiN_xO_y$ and x+y+z=1 in $TiN_xO_yC_z$. For $TiN_xC_z$, preferably x=0 to 1 and z=0 to 1, where x+z=1. Alternatively, the absorber layers can be composed of a titanium-based alloy disposed in a matrix of Ti, or can be composed of Ti disposed in a matrix of a titanium-based alloy.

The absorber layers can be formed to have a physical thickness of from about 3 nm to about 50 nm, and preferably from about 5 nm to about 20 nm. The absorber layers can each be composed of the same material or a different material, and can have the same or different physical thickness for each layer.

A plurality of diffractive flakes corresponding to pigment flake 50 can be formed by a web coating process in which the various layers are sequentially deposited on a web material having a diffractive surface structure to form a thin film structure. This thin film structure is subsequently fractured and removed from the web to form a plurality of diffractive flakes.

FIG. 6A further shows an alternative coating structure (with phantom lines) for diffractive pigment flake 50, in which one or more of the absorber layers and dielectric layers are coated around reflector layer 52 in an encapsulation process. For example, when an encapsulation process is used to form the outer absorber layer, absorber layers 56a and 56b are formed as part of a contiguous absorbing coating layer 56 substantially surrounding the flake structure thereunder. Likewise, an encapsulation process can also be used in forming the underlying dielectric layer, such that dielectric layers 54a and 54b are formed as part of a contiguous dielectric coating layer 54 substantially surrounding reflector layer 52.

Thus, diffractive pigment flake 50 may be embodied either as a multilayer thin film stack flake or a multilayer thin film encapsulated particle with one or more encapsulating layers therearound.

Various coating processes can be utilized in forming the dielectric and absorber coating layers by encapsulation. For example, suitable preferred methods for forming the dielectric layer include vacuum vapor deposition, sol-gel hydrolysis, CVD in a fluidized bed, downstream plasma onto vibrating trays filled with particles, and electrochemical deposition. A suitable $SiO_2$ sol-gel process is described in U.S. Pat. No. 5,858,078 to Andes et al., the disclosure of which is incorporated by reference herein. Other examples of suitable sol-gel coating techniques useful in the present invention are disclosed in U.S. Pat. No. 4,756,771 to Brodalla; Zink et al., *Optical Probes and Properties of Aluminosilicate Glasses Prepared by the Sol-Gel Method*, Polym. Mater. Sci. Eng., 61, pp. 204–208 (1989); and McKiernan et al., *Luminescence and Laser Action of Coumarin Dyes Doped in Silicate and Aluminosilicate Glasses Prepared by the Sol-Gel Technique*, J. Inorg. Organomet. Polym., 1(1), pp. 87–103 (1991); with the disclosures of each of these incorporated by reference herein.

Suitable preferred methods for forming the absorber layer include vacuum vapor deposition, and sputtering onto a mechanically vibrating bed of particles, as disclosed in U.S. Pat. No. 6,241,858 B1 of Phillips et al., which is incorporated by reference herein. Alternatively, the absorber layer may be deposited by decomposition through pyrolysis of metal-organo compounds or related CVD processes which may be carried out in a fluidized bed as described in U.S. Pat. Nos. 5,364,467 and 5,763,086 to Schmid et al., the disclosures of which are incorporated by reference herein. If no further grinding is carried out, these methods result in an encapsulated core flake section with dielectric and absorber materials therearound. Various combinations of the above coating processes may be utilized during manufacture of pigment flakes with multiple encapsulating coatings. Suitable absorber materials can be applied as either a single material or as an outer capping layer over an underlying different absorber material if desired.

In an alternative embodiment of the invention, asymmetrical color shifting diffractive flakes can be provided which include a thin film stack structure with the same layers as on one side of reflector layer 52 of flake 50 as shown in FIG. 6A. Such a thin film stack structure is similar to the structure of the foils discussed hereafter. Accordingly, the asymmetrical flakes include, for example, a reflector layer, a dielectric layer overlying the reflector layer, and an absorber layer overlying the dielectric layer. Each of these layers can be composed of the same materials and can have the same thicknesses as described above for the corresponding layers of flake 50. Asymmetrical color shifting diffractive flakes may also be provided in the form of a thin film stack structure such as shown for flake 50 in FIG. 6A, where the dielectric layers on either side of the reflector layer have different thicknesses or are composed of different materials. The asymmetrical flakes can be formed by a web coating process in which the various layers are sequentially deposited on a web material with a diffractive surface to form a thin film structure, which is subsequently fractured and removed from the web to form a plurality of diffractive flakes.

The asymmetrical diffractive flakes with a foil-like structure dispersed in a pigment medium produce a diffractive composition that is brighter than a diffractive composition containing only symmetrical diffractive flakes. This results from some of the asymmetrical flakes being disposed in the diffractive composition with their reflector layer facing the outside. In addition, both symmetrical and asymmetrical diffractive flakes can be dispersed in a pigment medium together in varying amounts to produce a diffractive composition having varying levels of brightness and color combinations.

Figure 6B:
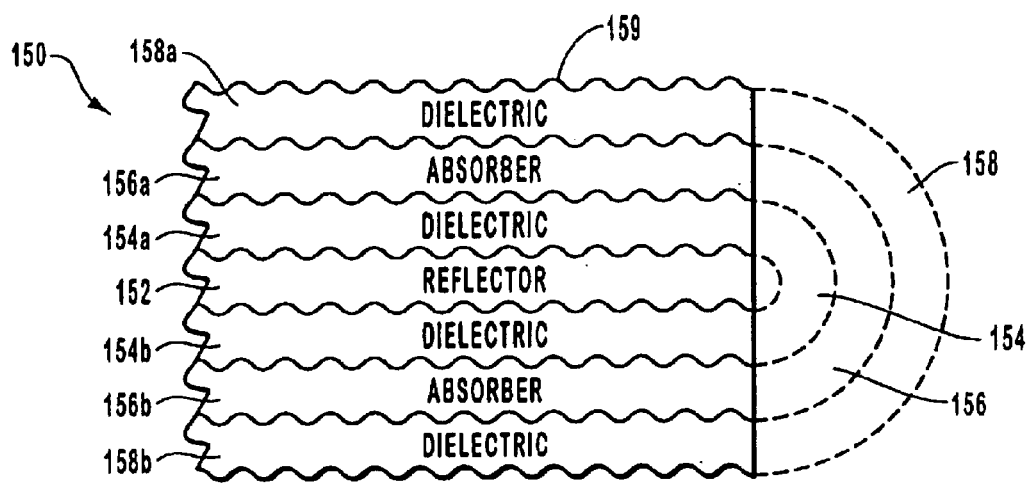

Referring now to FIG. 6B, depicted is a color shifting diffractive pigment flake 150 according to another embodiment of the invention. The flake 150 has a generally symmetrical multilayer thin film structure having coating layers on opposing sides of a reflector layer 152. As illustrated, first and second dielectric layers 154a, 154b overlie opposing sides of reflector layer 152, and first and second absorber layers 156a, 156b overlie first and second dielectric layers 154a, 154b, respectively. Further, third and fourth dielectric layers 158a, 158b overlie first and second absorber layers 156a, 156b, respectively. A diffractive grating structure 159 is replicated in all of the layers of flake 150. The grating frequency and depth of diffractive grating structure 159 can be determined and formed as described hereinabove.

The coating design of pigment flake 150 in combination with the diffractive grating structure produces a color shifting background color over which a diffractive optical effect is observable. For example, the dielectric layers of flake 150 are formed with an optical thickness at a selected design wavelength such that a pigment composition, including a plurality of flakes corresponding to flake 150, exhibits an iridescent diffractive effect over a color shifting background when applied to an object.

A plurality of diffractive flakes corresponding to pigment flake 150 can be formed by a web coating process as described previously in which the various layers are sequentially deposited on a web material having a diffractive surface structure to form a thin film structure. This thin film structure is subsequently fractured and removed from the web to form the diffractive flakes. Each of the layers of pigment flake 150 can be composed of the same materials and can have the same thicknesses as described above for the corresponding layers of flake 50.

FIG. 6B further shows an alternative coating structure (with phantom lines) for diffractive pigment flake 150, in which one or more of the absorber layers and dielectric layers are coated around reflector layer 152 in an encapsulation process. For example, when an encapsulation process is used to form the outer dielectric layer, dielectric layers 158a and 158b are formed as part of a contiguous dielectric coating layer 158 substantially surrounding the flake structure thereunder. Likewise, an encapsulation process can also be used in forming one or more of the underlying absorber and dielectric layers in flake 150. For example, absorber layers 156a and 156b can be formed as part of a contiguous absorbing coating layer 156 substantially surrounding the flake structure thereunder. An encapsulation process can also be used in forming the underlying dielectric layer, such that dielectric layers 154a and 154b are formed as part of a contiguous dielectric coating layer 154 substantially surrounding reflector layer 152.

Thus, diffractive pigment flake 150 may be embodied either as a multilayer thin film stack flake or a multilayer thin film encapsulated particle with one or more encapsulating layers therearound.

In an alternative embodiment of flake 150, asymmetrical color shifting diffractive flakes can be provided which include a thin film stack structure with the same layers as on one side of reflector layer 152 of flake 150 as shown in FIG. 6B. Asymmetrical color shifting diffractive flakes may also be provided in the form of a thin film stack structure such as shown for flake 150 in FIG. 6B, in which the dielectric layers on either side of the reflector layer and over the absorber layers have different thicknesses or are composed of different materials.

Figure 7:
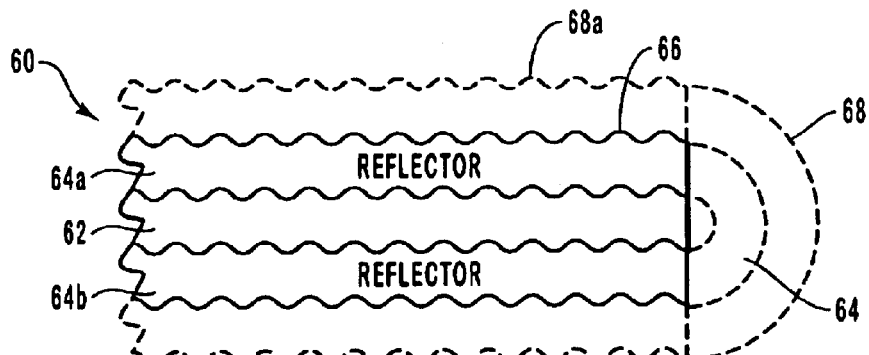
FIG. 7 is a schematic representation of the coating structure of a diffractive pigment flake according to additional embodiments of the invention.

Referring now to FIG. 7, a diffractive pigment flake 60 is depicted according to another embodiment of the invention. The flake 60 includes a central support layer 62 with first and second reflector layers 64a and 64b on opposing major surfaces thereof. By inserting the support layer between the reflector layers, the flake 60 is significantly stabilized and strengthened, having increased rigidity.

The reflector layers 64a and 64b can be formed of any of the reflector materials described previously and at the same thickness ranges described previously such as for reflector layer 32 of flake 30. The flake 60 has a diffractive structure 66 formed on at least one surface thereof. The grating frequency and depth of diffractive structure 66 can be determined and formed as described hereinabove.

A plurality of diffractive flakes corresponding to pigment flake 60 can be formed by a web coating process in which the various layers are sequentially deposited on a web material to form a thin film structure. This thin film structure is subsequently fractured and removed from the web to form a plurality of flakes.

The flake 60 can be used as a pigment flake by itself or can be used as a reflector core section with one or more additional layers 68a, 68b applied thereover. For example, additional dielectric layers may optionally be added to overlie reflector layers 54a and 54b. These additional dielectric layers can add durability, rigidity, and environmental resistance to flake 60.

The additional layers 68a, 68b can also include dielectric layers such as those described for flake 50, and absorber layers thereover such as those described for flake 50. As described previously, such a coating structure produces a color shifting background over which a diffractive optical effect is visually perceptible.

The additional layers 68a, 68b can be formed as part of the web coating process in which the various layers are sequentially deposited on a web material and released to form a thin film stack flake structure. Alternatively, one or more of the additional layers 68a, 68b, such as a dielectric layer and an absorber layer, can be formed as part of a contiguous coating layer 68 substantially surrounding the flake structure thereunder in an encapsulation process.

A dielectric material is preferably used for support layer 62. The dielectric material is preferably inorganic, since inorganic dielectric materials have been found to have good characteristics of brittleness and rigidity, as indicated in U.S. Pat. No. 6,013,370 of Coulter et al. and in U.S. Pat. No. 6,150,022 of Coulter et al., the disclosures of which are incorporated by reference herein. Various dielectric materials that can be utilized include metal fluorides, metal oxides, metal sulfides, metal nitrides, metal carbides, combinations thereof, and the like. The dielectric materials may be in either a crystalline, amorphous, or semicrystalline state. These materials are readily available and easily applied by physical or chemical vapor deposition processes, or other wet chemical processes such as sol-gel coating.

Non-limiting examples of suitable dielectric materials for support layer 62 include magnesium fluoride, silicon monoxide, silicon dioxide, aluminum oxide, titanium dioxide, tungsten oxide, aluminum nitride, boron nitride, boron carbide, tungsten carbide, titanium carbide, titanium nitride, silicon nitride, zinc sulfide, glass flakes (e.g., glass flakes made in a roll coater with a release layer) such as synthetic platelets, diamond-like carbon, combinations thereof, and the like. Alternatively, support layer 62 may be composed of a preformed dielectric or ceramic preflake material having a high aspect ratio such as synthetic platelets formed from glass, alumina, silicon dioxide, carbon, micaeous iron oxide, coated mica, boron nitride, boron carbide, graphite, bismuth oxychloride, various combinations thereof, and the like.

In an alternative embodiment, instead of a dielectric support layer, various semiconductive and conductive materials having a sufficient ratio of tensile to compressive strength can function as a support layer. Examples of such materials include silicon, metal silicides, semiconductive compounds formed from any of the group III, IV, or V elements, metals having a body centered cubic crystal structure, cermet compositions or compounds, semiconductive glasses, various combinations thereof, and the like. It will be appreciated from the teachings herein, however, that any support material providing the functionality described herein and capable of acting as a rigid layer with glass-like qualities would be an acceptable substitute for one of these materials.

The thickness of support layer 62 can be in a range from about 10 nm to about 1,000 nm, and preferably from about 50 nm to about 200 nm, although these ranges should not be taken as limiting.

Alternatively, flake 60 can be formed as an encapsulated particle, as illustrated by the phantom lines in FIG. 7. The particle can be a two layer design with a reflector layer 64 substantially surrounding and encapsulating support layer 62. The encapsulated particle can be used as a pigment particle by itself or can be used as a diffractive core section with one or more additional coating layers 68 applied thereover. For example, an outer dielectric layer may be added to overlie and encapsulate reflector layer 64. This outer dielectric layer adds durability, rigidity, and environmental resistance to the encapsulated particle. The additional layers 68 can also include dielectric layers such as those described for flake 50, and absorber layers thereover. As discussed previously, such as coating structure produces a color shifting background color over which a diffractive optical effect is visually perceptible.

Figure 8:
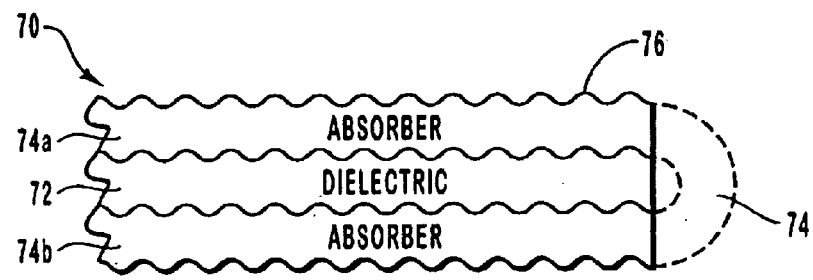
FIG. 8 is a schematic representation of the coating structure of a diffractive pigment flake according to another embodiment of the invention.

Referring now to FIG. 8, depicted is a color shifting pigment flake 70 according to another embodiment of the invention. The flake 70 is a three-layer design having a generally symmetrical multilayer thin film structure on opposing sides of a dielectric core layer 72. Thus, first and second absorber layers 74a and 74b are formed on opposing major surfaces of dielectric core layer 72. The flake 70 has a diffractive structure 76 formed on at least one surface thereof. The grating frequency and depth of diffractive structure 76 can be determined and formed as described hereinabove. The layers of flake 70 can be formed by a web coating and flake removal process as described previously.

FIG. 8 further depicts an alternative coating structure (with phantom lines) for flake 70, in which the absorber layer is coated around core layer 72 in an encapsulation process. Accordingly, absorber layers 74a and 74b are formed as part of a contiguous coating layer 74 substantially surrounding core layer 72.

Thus, pigment flake 70 may be embodied either as a multilayer thin film stack flake or a multilayer thin film encapsulated particle. Suitable materials and thicknesses for the dielectric and absorber layers of flake 70 can be the same as taught hereinabove for flake 50.

Various modifications and combinations of the foregoing embodiments are also considered within the scope of the invention. For example, additional dielectric, absorber, and/or other optical coatings can be formed around each of the above flake embodiments, or on a composite reflective film prior to flake formation, to yield further desired optical characteristics. Such additional coatings can provide enhanced optical effects to the pigments. New colors for the pigments can be obtained using peak suppression design, as discussed in U.S. Pat. No. 5,214,530 of Coombs et al., the disclosure of which is incorporated by reference herein.

Preferably, the flakes of the invention have a thickness of less than about 3 µm, more preferably less than about 2 µm. As to length and width, each flake will have a different dimension due to the fracturing process used to form the flakes. However, the median flake size, both width and length, is preferably from about 5 µm to about 200 µm, more preferably from about 5 µm to about 100 µm, and most preferably from about 18 µm to about 22 µm.

The background color of the flakes is produced by distinct causes, such as fluorescence, phosphorescence, inherent absorption, and thin film interference. The degree of visible diffractive effects varies with the grating frequency. For example, paints with flakes having a 500 ln/mm frequency lose the visual diffractive effects while diffractive effects are enhanced for flakes with higher frequencies such as 1400 or 2000 ln/mm. In fact, grating microstructure frequencies of up to about 3000 ln/mm can be achieved on flakes obtained from multi-layer optical stacks. The optical effects produced by the flakes can be tailored depending on the geometrical microstructure of the flakes.

Diffractive Compositions

The diffractive pigment flakes of the present invention can be interspersed within a pigment medium to produce a diffractive composition such as an ink, paint, or the like, which can be applied to a wide variety of objects or papers. The pigment flakes can also be dispersed within a pigment medium such as a plastic material which can be molded or extruded to form an object which has diffractive effects. The pigment flakes can also be dispersed within a pigment medium such as a cosmetic formulation or automotive paints.

The diffractive pigment flakes added to a pigment medium produces a predetermined optical response through radiation incident on a surface of the solidified medium. Preferably, the pigment medium contains a resin or mixture of resins which can be dried or hardened by thermal processes such as thermal cross-linking, thermal setting, or thermal solvent evaporation or by photochemical cross-linking. Useful pigment media include various polymeric compositions or organic binders such as alkyd resins, polyester resins, acrylic resins, polyurethane resins, vinyl resins, epoxies, styrenes, and the like. Suitable examples of these resins include melamine, acrylates such as methyl methacrylate, acrylonitrile butadiene stryrene (ABS) resins, ink and paint formulations based on alkyd resins, and various mixtures thereof. The flakes combined with the pigment media produce a diffractive composition that can be used directly as a paint, ink, or moldable plastic material. The diffractive composition can also be utilized as an additive for conventional paint, ink, or plastic materials.

The pigment medium also preferably contains a solvent for the resin. For the solvent, generally, either an organic solvent or water can be used. A volatile solvent can also be used in the medium. As for the volatile solvent, it is preferable to use a solvent which is both volatile as well as dilutable, such as a thinner. In particular, faster drying of the pigment medium can be achieved by increasing the amount of the solvent with a low boiling point composition such as methyl ethyl ketone (MEK).

In addition, the diffractive flakes of the invention can be optionally blended with various additive materials such as conventional non-diffractive pigment flakes, particles, or dyes of different hues, chroma and brightness to achieve the color characteristics desired. For example, the flakes can be mixed with other conventional pigments, either of the interference type or noninterference type, to produce a range of other colors. This preblended composition can then be dispersed into a polymeric medium such as a paint, ink, plastic or other polymeric pigment vehicle for use in a conventional manner.

Examples of suitable additives that can be mixed with the diffractive flakes of the invention include lamellar pigments such as multi-layer color shifting flakes, aluminum flakes, graphite flakes, glass flakes, iron oxide, boron nitride, mica flakes, interference based $TiO_2$ coated mica flakes, interference pigments based on multiple coated plate-like silicatic substrates, metal-dielectric or all-dielectric interference pigments, and the like; and non-lamellar pigments such as aluminum powder, carbon black, ultramarine blue, cobalt based pigments, organic pigments or dyes, rutile or spinel based inorganic pigments, naturally occurring pigments, inorganic pigments such as titanium dioxide, talc, china clay, and the like; as well as various mixtures thereof. For example, pigments such as aluminum powder or carbon black can be added to control lightness and other color properties.

The chromatic diffractive pigment flakes of the present invention can also be blended with other diffractive flakes, such as the high reflectivity achromatic diffractive flakes disclosed in copending U.S. application Ser. No. 09/919,346, filed on Jul. 31, 2001, the disclosure of which was previously incorporated by reference herein. The chromatic pigment flakes of the invention can also be blended with various dark achromatic diffractive flakes such as disclosed in copending U.S. application Ser. No. 10/029,405, filed on Dec. 20, 2001, the disclosure of which is incorporated by reference herein. These additional diffractive flakes that can be blended with the flakes of the invention may have a symmetrical or asymmetrical flake layer structure.

The pigment flakes of the invention can be easily and economically utilized in paints and inks which can be applied to various objects or papers, such as motorized vehicles, currency and security documents, household appliances, architectural structures, flooring, fabrics, sporting goods, electronic packaging/housing, product packaging, beverage containers, and the like. The flakes can also be utilized in forming colored plastic materials, coating compositions, extruded parts, electrostatic coatings, glass, and ceramic materials.

The diffractive pigment flakes can have a preselected size and loading in the pigment medium to produce an ink suitable for use in a printing process such as intaglio, lithography, silk screen, gravure, doctor blade, and wet coating. The diffractive pigment flakes are also suitable for dispersion in conventional paint vehicles or resins such as those compatible with conventional painting methods, particularly for painting motorized vehicles or other structures requiring a base, middle, top coat, and the like. The diffractive pigments are also suitable for decorative application in cosmetic formulations, laminating films, and the like.

A coated article according to the invention includes an object having a surface, and a diffractive coating layer overlying at least a portion of the surface. The coating layer comprises a diffractive composition including a pigment medium as described previously, and a plurality of diffractive pigment flakes dispersed in the pigment medium. The coated article can further include a base coating layer, which can include a precoat, a prime coat, and/or a sealer coat, applied to an object prior to applying the diffractive coating layer. A transparent top coating layer such as a clear coat can be applied over the diffractive coating layer. Such a coating layer structure would typically be produced in painting a motor vehicle such as an automobile. Further details of such a coating layer structure are set forth in U.S. Pat. No. 5,571,624 to Phillips et al., which is incorporated by reference herein.

Figure 9:
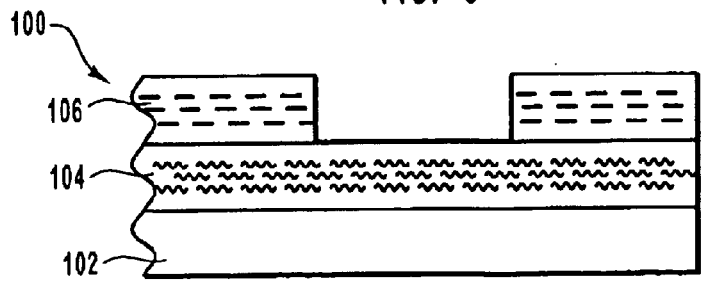
FIGS. 9 and 10 are schematic representations of multi-coated articles wherein one of the coating layers incorporates diffractive pigment flakes and the other coating layer has non-diffractive flakes.
Figure 10:
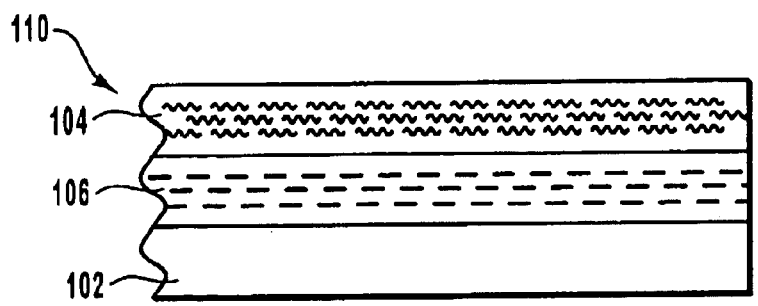

Alternatively, the coated article can further include a non-diffractive coating layer under the diffractive coating layer, or a non-diffractive coating layer partially overlying the diffractive coating layer, thereby forming a diffractive pattern on the object. Such coating structures are illustrated in FIGS. 9 and 10, which show a multi-coating application where one of the coating layers incorporates diffractive flakes according to the invention and the other coating layer has non-diffractive flakes. For example, FIG. 9 shows a coated article 100 including a surface section 102 having a diffractive coating layer 104 thereon. A non-diffractive coating layer 106 partially overlies diffractive coating layer 104, thereby producing a diffractive pattern which follows the exposed surface of diffractive coating layer 104. FIG. 10 depicts a coated article 110 with an opposite coating configuration, in which a diffractive coating layer 104 overlies a non-diffractive coating layer 106.

Figure 11:
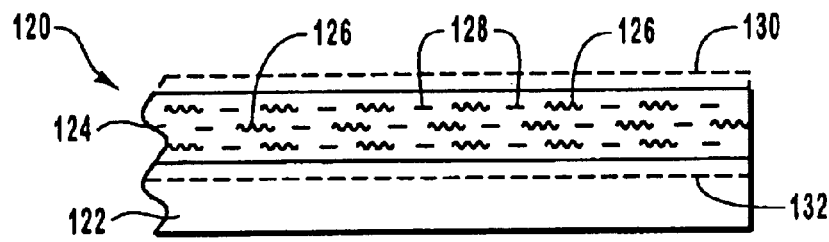
FIG. 11 is a schematic representation of a coated article having at least one coating layer which includes diffractive flakes and optionally non-diffractive flakes.

In yet a further embodiment, the coated article can comprise a single coating layer with diffractive flakes dispersed therein. Optionally, non-diffractive flakes can also be dispersed in the coating layer with the diffractive flakes. For example, FIG. 11 depicts a coated article 120 including a surface section 122 having a coating layer 124 thereon. The coating layer 124 includes a plurality of diffractive flakes 126 and optional non-diffractive flakes 128 interspersed in a pigment medium. Optionally, if desired for a specific application, a transparent top coating layer 130 can be applied over coating layer 124. In addition, a base coating layer 132 can be optionally applied to surface section 122 prior to applying coating layer 124.

A printed or irregularly shaped object having a diffractive pigment coating or coloration has the appearance of having a continuous holographic or diffraction grating foil on the object such that the dominant coloration of a region of the object is a function of the juxtaposition of the illumination source and the viewer. The diffractive compositions of the invention applied to an object also produce a substantially continuous tone iridescent diffractive effect. The compositions also produce a substantially uniform and continuous color range observable under a mixture of diffuse and specular or directional illumination when applied to a curved object.

The diffractive pigment flakes are suitable for providing additional forgery and photocopy proof features on security documents as well as authentication features on high value and/or critical parts and supplies. For example, the pigment flakes can be used to form an optical security device comprising a first region, a second region, and an assembly of the pigment flakes in at least one of the first or second regions. The pigment flakes have a diffractive structure comprising a sequence of substantially equally spaced linear features that provides for a decrease in a zero order diffracted light beam and a sufficient increase in a first or higher order diffracted light beam such that the appearance of the security device is dominated by the dispersion of light by first or higher order reflections.

Diffractive Foils

Figure 12:
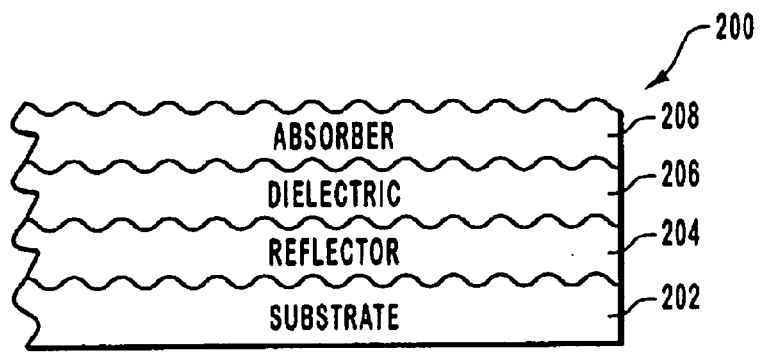
FIG. 12 is a schematic representation of the coating structure of a diffractive foil according to one embodiment of the invention.

Referring now to FIG. 12, the coating structure of a color shifting diffractive foil 200 is depicted. The diffractive foil 200 is formed on a substrate 202, which can be any suitable material, such as a flexible PET web, carrier substrate, or other plastic material, on which a diffractive structure is formed such as a diffraction grating pattern or a holographic image pattern. A suitable thickness for substrate 202 is, for example, about 0.5 mils to about 7 mils.

The diffractive foil 200 includes a reflector layer 204 overlying substrate 202, a dielectric layer 206 overlying reflector layer 204, and an optional absorber layer 208 overlying dielectric layer 206. Each of the reflector, dielectric, and absorber layers of diffractive foil 200 have the diffractive structure of substrate 202 replicated therein. The reflector, dielectric, and absorber layers of diffractive foil 200 can be composed of the same materials and can have the same thicknesses as described above for the corresponding layers in flakes 30 and 50.

The diffractive foil 200 can be formed without absorber layer 208 when the reflector layer material has its own color absorption. Thus, the foil in such an embodiment includes reflector layer 204 overlying substrate 202, and dielectric layer 206 overlying reflector layer 204. Such a foil exhibits a background color and an optical diffractive effect over the background color. Each of the reflector and dielectric layers of the foil have the diffractive structure of the substrate replicated therein. In one preferred embodiment of such a foil, the dielectric layer comprises magnesium fluoride, and the reflector layer comprises copper.

The diffractive foil 200 can be formed by a web coating process, with the various layers as described above sequentially deposited on a web having a diffractive structure thereon. The various layers can be deposited by conventional CVD or PVD deposition techniques over the diffractive structure on the web to form a thin film foil that has the diffractive structure replicated in the layers of the foil. The diffractive foil 200 can be formed on a carrier substrate, which can be a web without a release layer. Alternatively, foil 200 can be formed on a release layer of a web so that the foil can be subsequently removed and attached to a surface of an object.

Figure 13:
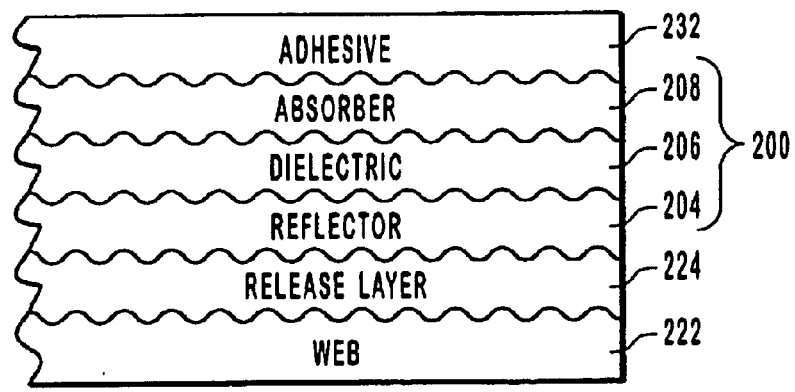
FIGS. 13 and 14 are alternative schematic configurations of diffractive foils according to the invention formed on a web.

For example, FIG. 13 depicts diffractive foil 200 formed on a web 222 having a diffractive structure with an optional release layer 224 thereon. The reflector layer 204 is deposited over the optional release layer 224, followed by the deposition of dielectric layer 206 and absorber layer 208. The foil 200 may be utilized attached to web 222 as a carrier when a release layer is not employed. Alternatively, foil 200 may be laminated to a transparent substrate (not shown) via an optional adhesive layer 232, such as a transparent adhesive or ultraviolet (UV) curable adhesive, when the release layer is used. The adhesive layer 232 can be applied over absorber layer 208 and/or the transparent substrate prior to lamination.

Figure 14:
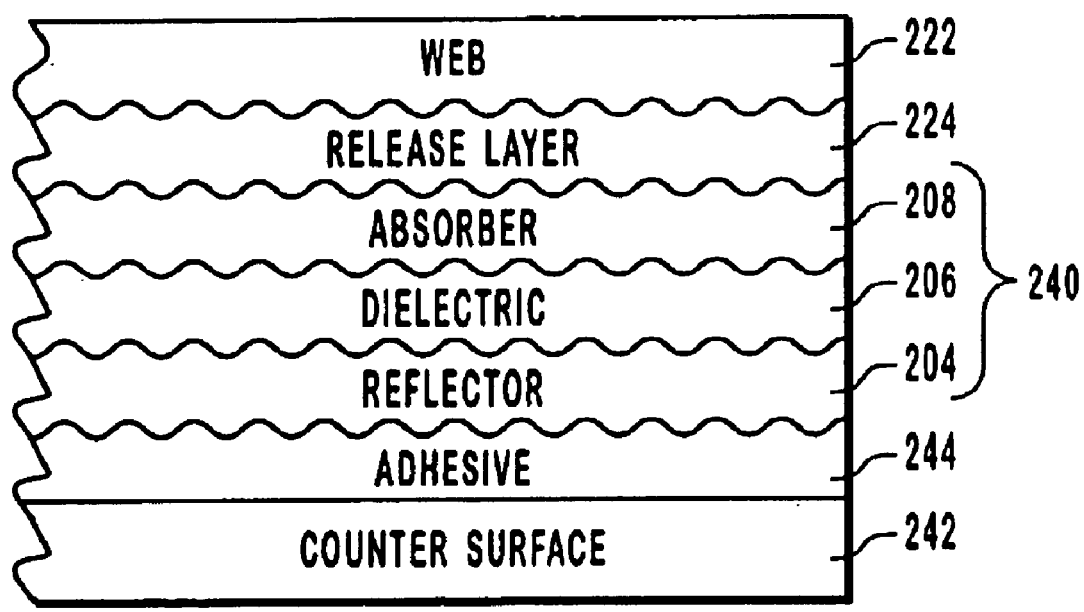

Referring now to FIG. 14, depicted is an alternative embodiment in which a color shifting diffractive foil 240, having the same thin film layers as foil 200, is formed on a web 222 having a diffractive structure and an optional release layer 224 thereon. The foil 240 is formed such that an absorber layer 208 is deposited on web 222, followed by the deposition of a dielectric layer 206 and a reflector layer 204. The foil 240 may be utilized attached to web 222 as a carrier, which is preferably transparent, when a release layer is not employed. The foil 240 may also be attached to a substrate such as a countersurface 242 when the release layer is used, via an adhesive layer 244 such as a hot stampable adhesive, a pressure sensitive adhesive, a permanent adhesive, and the like. The adhesive layer 244 can be applied over reflector layer 204 and/or countersurface 242.

When a hot stamp application is employed, the optical stack of the foil is arranged so that the optically exterior surface is adjacent the release layer. Thus, for example, when foil 240 in FIG. 14 is released from web 222, absorber layer 208 is optically present on the exterior of countersurface 242. In one preferred embodiment, release layer 224 is a transparent hardcoat that stays on absorber layer 208 to protect the underlying layers after transfer from web 222. Further details of making and using optical stacks as hot stamping foils can be found in U.S. Pat. Nos. 5,648,165, 5,002,312, 4,930,866, 4,838,648, 4,779,898, and 4,705,300, the disclosures of which are incorporated by reference herein.

The pigment flakes and foils of the present invention provide many benefits and advantages. The pigment flakes and foils have both diffractive and thin film interference effects. Even pigment particles too small to be resolved by the human eye show both diffractive and thin film interference effects that change with viewing angle when such particles are dispersed in a coating composition and applied to an object.

In addition, non-interference thin film layers such as a thin film copper layer or compounds with characteristic colors (e.g., TiN) can be used in conjunction with the diffractive component in fabricating the flakes and foils of the invention. The pigment flakes composed of optical stacks with replicated diffractive gratings can be applied like any ink, paint, or coating using airless sprayers, printing presses, coating devices and the like.

The pigment flakes of the invention produce unexpected diffractive colors even is with the random groove orientation of the flakes in coatings containing the flakes. In addition, new color trajectories not seen in the prior art are produced by both the diffractive foils and coatings containing the flakes of the invention. The color trajectories of thin film interference coatings in the foils and flakes are modified by the presence of superimposed diffractive structures within the optical stack. Large color changes are seen in the diffractive foils and in coatings containing the diffractive pigments as the illumination changes from diffuse to highly directional conditions. There appears to be a burst of color in the foils or coatings containing such pigments from a background color to a bright color when moving from diffuse light (e.g., inside of a building lighted with fluorescent lights) to specular light (e.g., sunlight or spotlights). Further, bright colors are produced at very high viewing angles under specular light by the foils and coatings of the invention.

The following examples are given to illustrate the present invention, and are not intended to limit the scope of the invention.

EXAMPLES

In order to quantify the color characteristics of a particular object, it is useful to invoke the L*a*b* color coordinate system developed by the Commission Internationale de l'Eclairage (CIE 1976), which is now used as a standard in the industry in order to precisely describe color values. In this system, L* indicates lightness and a* and b* are the chromaticity coordinates. The L*a*b*color system was used to generate various a*b* diagrams described in some of the following examples which plot the color trajectory and chromaticity of a selected diffractive pigment.

The L*a*b*color system allows for a comparison of the color differences between two measurements through the parameter ΔE*ab, which indicates the change in color as measured in the L*a*b* color space, such as the color difference of two different pigment designs. The numerical value for ΔE*ab is calculated through the following equation using the measured L*a*b* values:

$$\Delta E^*_{ab} = [(\Delta L^*)^2 + (\Delta a^*)^2 + (\Delta b^*)^2]^{1/2}$$

where the symbol Δ denotes the difference in measurements being compared.

The Laneta drawdowns described in some of the following examples were analyzed using a Murakami goniospectrophotometer. A "drawdown" is a paint or ink sample spread on paper to evaluate the color. Typically, a drawdown is formed with the edge of a putty knife or spatula by "drawing down" a small glob of paint or ink to get a thin film of the paint or ink. Alternatively, the drawdown is made using a Mayer rod pulled across a Laneta card and through a small glob of paint. The Murakami device, in the selected configuration, provides information for a fixed illumination position (45°) and variable viewer angle (−80° to 80°) related to the sample lightness (L*) and the a*,b* chromaticity coordinates in the L*a*b* color space for the measured sample.

Examples 1–7

The amount of energy relative to the incident energy (efficiency) of diffractive gratings varies as a function of the type of grating and its groove depth. As a result gratings can be optimized for specific wavelengths. The light spectrum distribution in the various diffracted orders for any wavelength will be given by equation 1 set forth previously.

Various diffractive gratings (Examples 1–7) with 500 ln/mm to 3000 ln/mm were modeled using conventional optical software to determine optimal grating configurations. FIGS. 15–20 are graphs of the modeling results, showing diffraction angles as a function of various wavelengths for the various diffractive gratings of Examples 1–7. In particular, FIGS. 15–20 show the diffraction angles for various visible wavelengths (400 nm violet to 700 nm red) at normal and 45° incidence. Table 1 below sets forth the specific Example number with the corresponding Figure number and grating structure that was modeled.

TABLE 1

| Example | Figure | Grating Structure |
|---------|--------|-------------------|
| 1 | 15 | 500 ln/mm grating |
| 2 | 16 | 1000 ln/mm grating |
| 3 | 17 | 1400 ln/mm grating |
| 4 | 18 | 2000 ln/mm grating |
| 5 | 19 | 2400 ln/mm grating |
| 6 | 20 | 2500 ln/mm grating |
| 7 | 20 | 3000 ln/mm grating |

Figure 15:
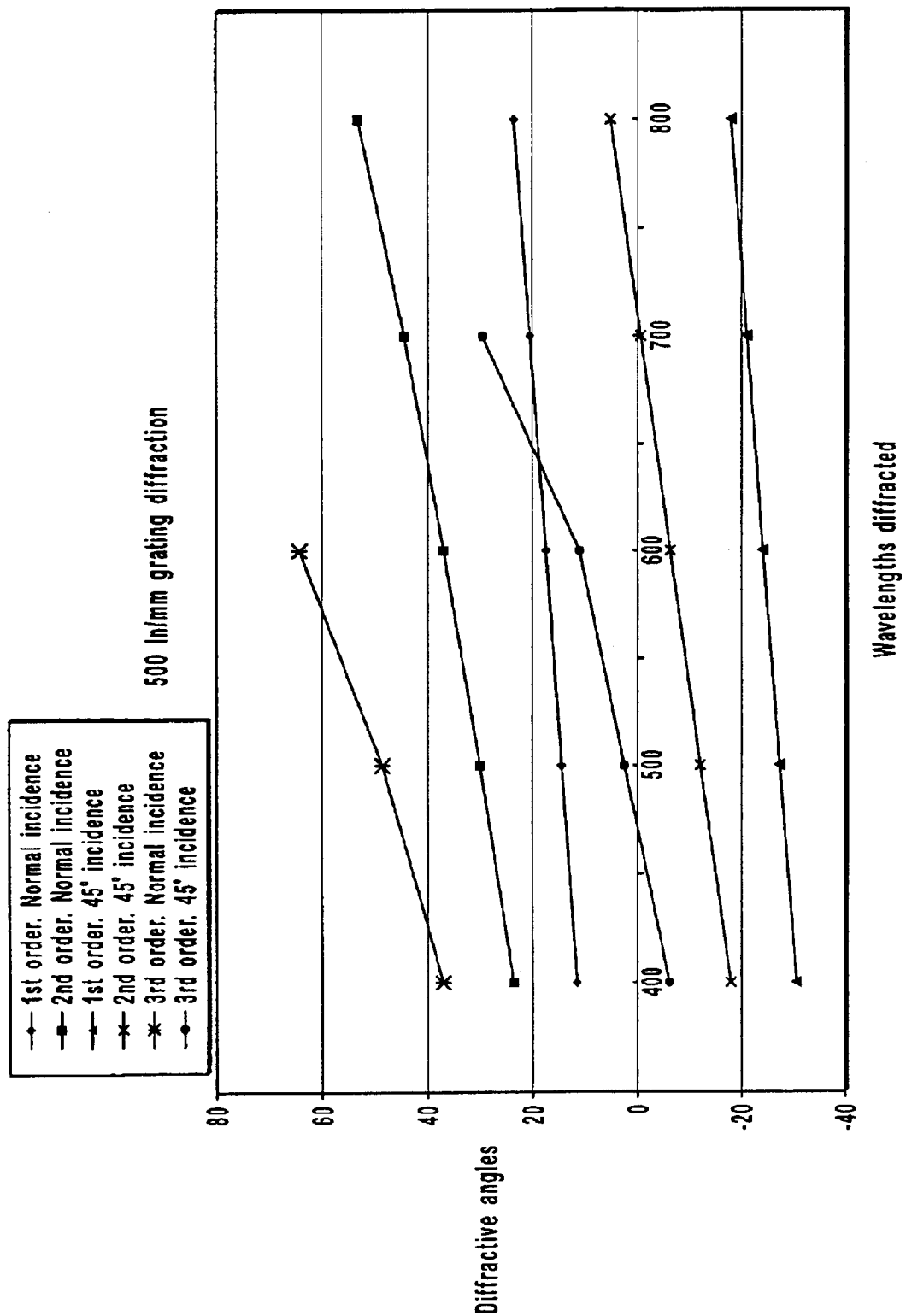
FIG. 15 is a graph illustrating the diffraction angle for various wavelengths at normal and 45° incidence for a diffractive grating having 500 ln/mm.
Figure 16:
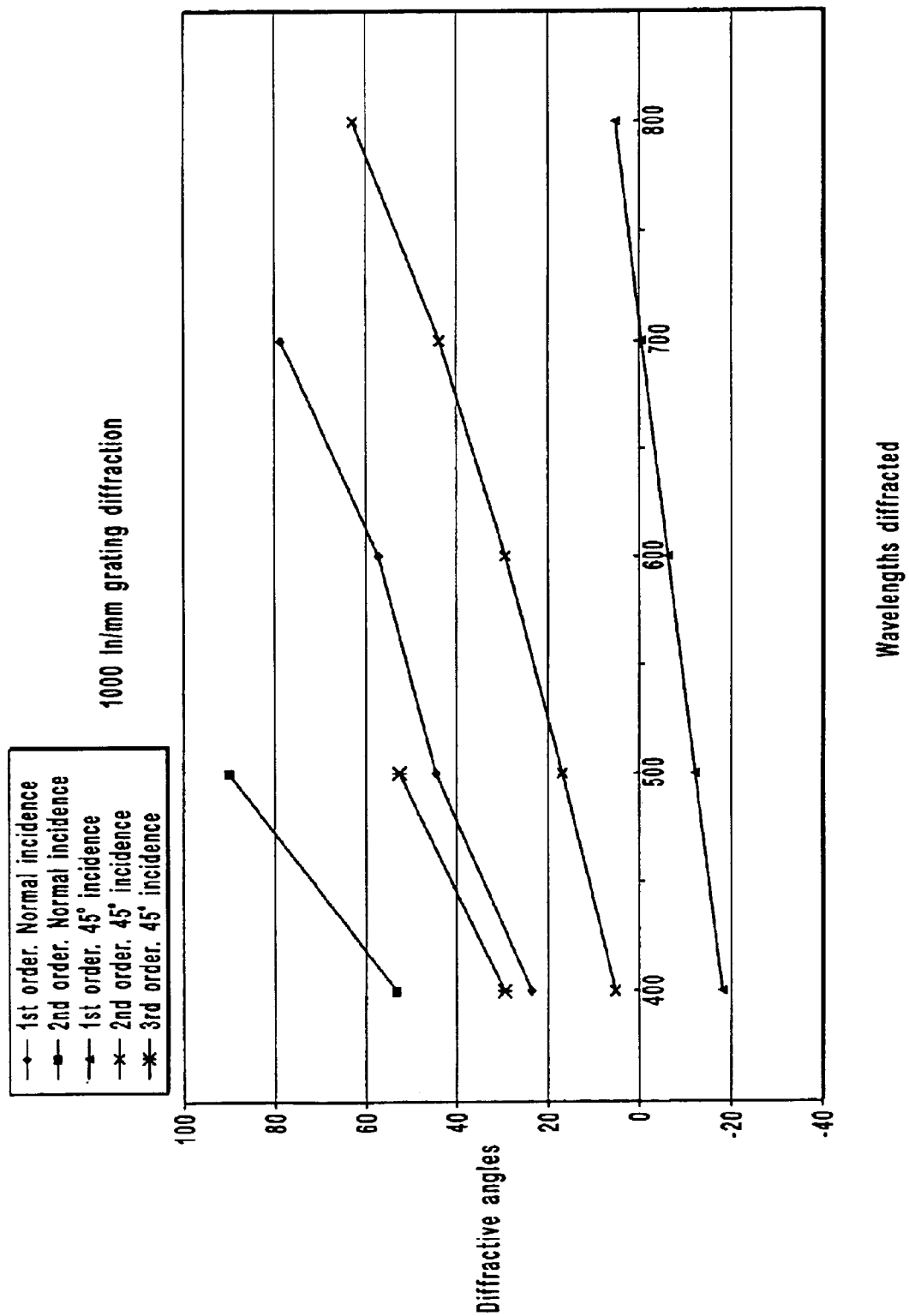
FIG. 16 is a graph illustrating the diffraction angle for various wavelengths at normal and 45° incidence for a diffractive grating having 1000 ln/mm.
Figure 17:
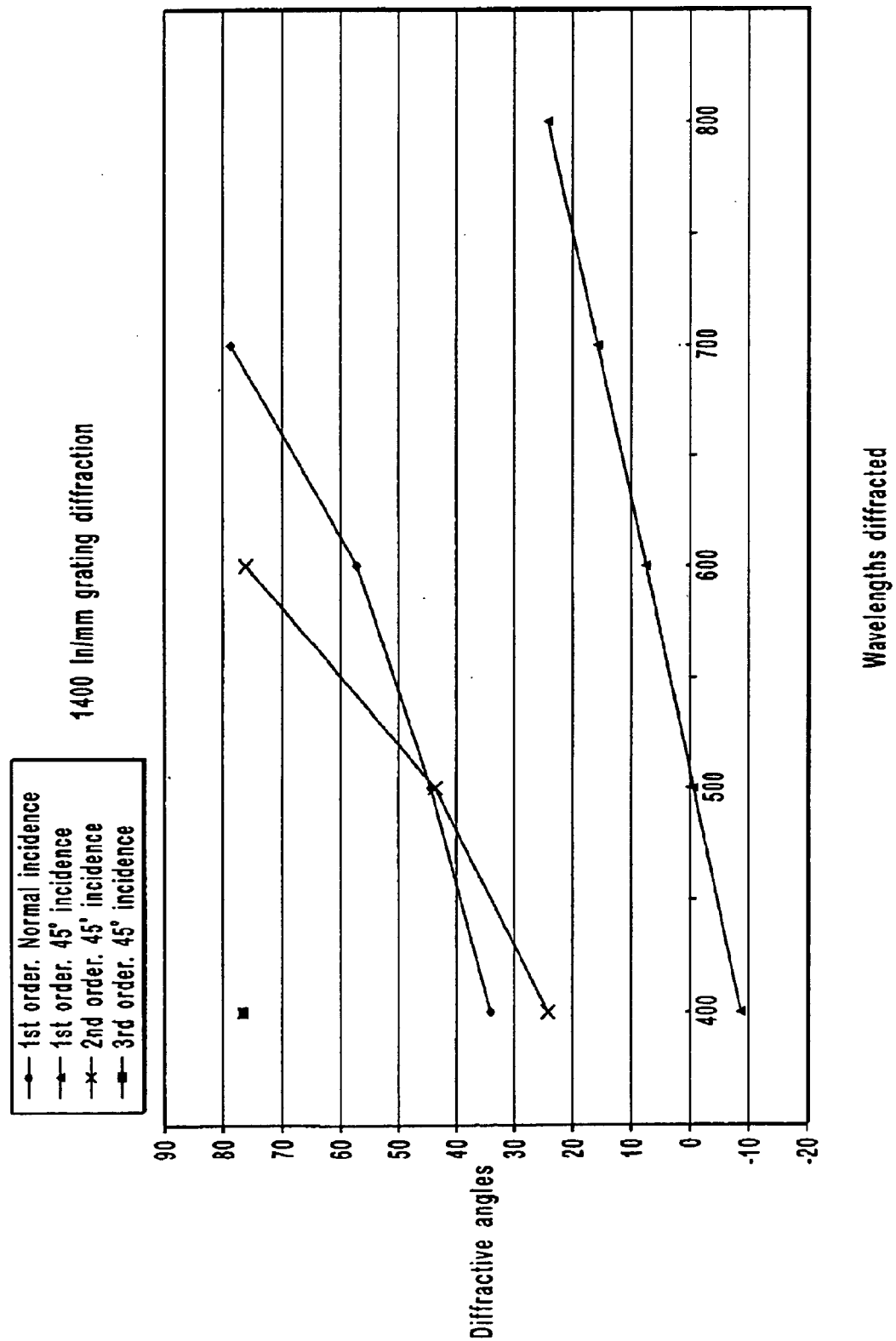
FIG. 17 is a graph illustrating the diffraction angle for various wavelengths at normal and 45° incidence for a diffractive grating having 1400 ln/mm.
Figure 18:
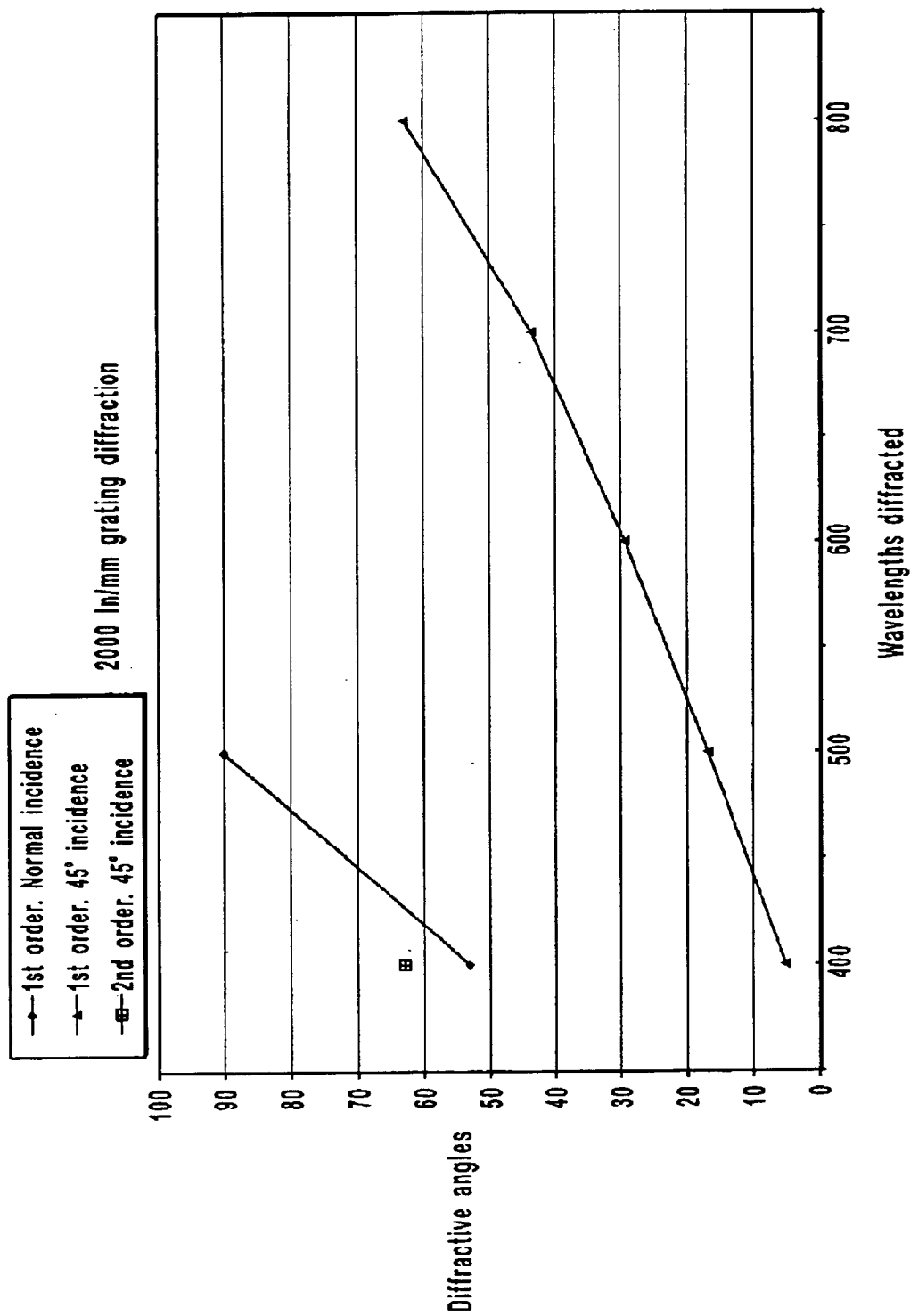
FIG. 18 is a graph illustrating the diffraction angle for various wavelengths at normal and 45° incidence for a diffractive grating having 2000 ln/mm.
Figure 19:
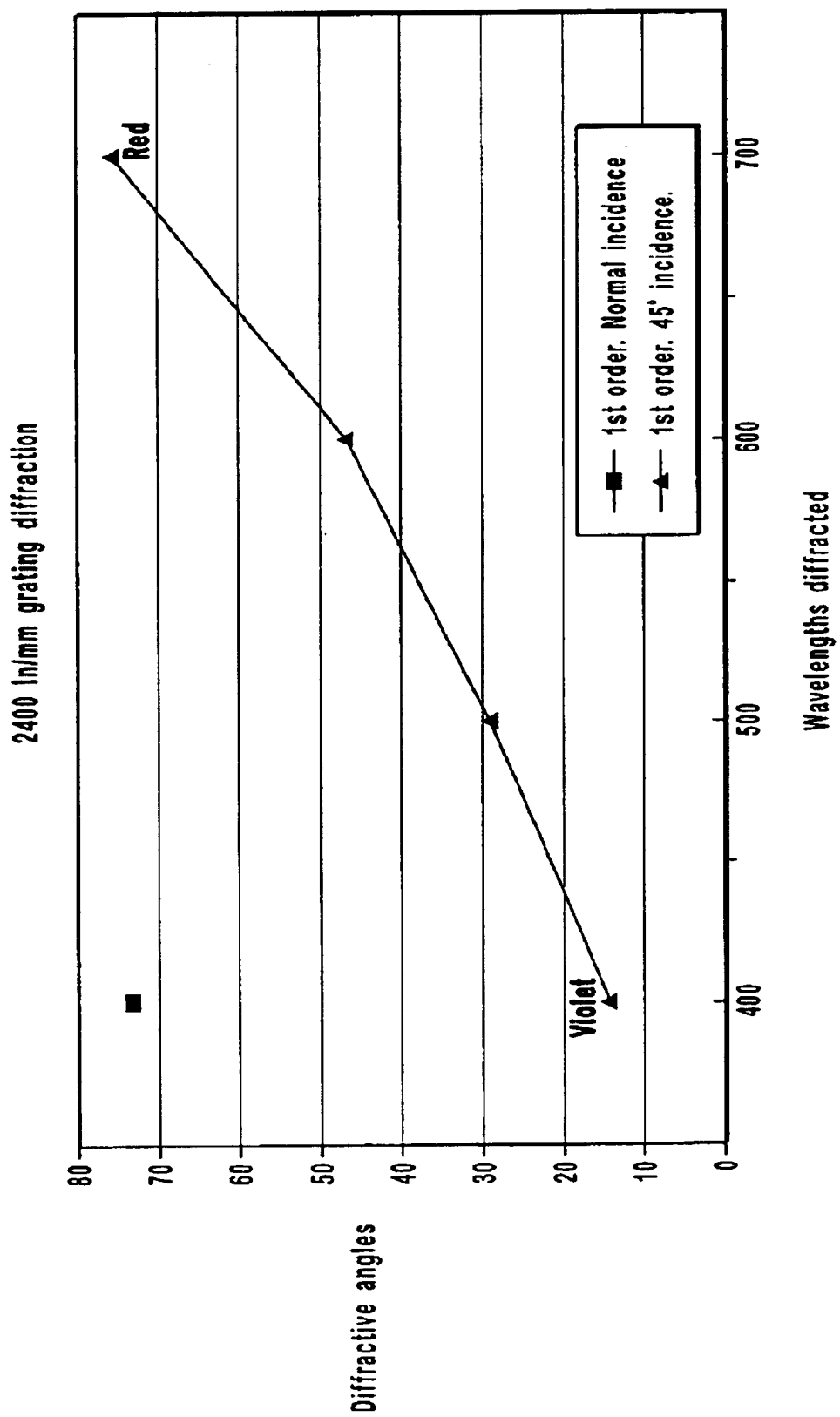
FIG. 19 is a graph illustrating the diffraction angle for various wavelengths at normal and 45° incidence for a diffractive grating having 2400 ln/mm.
Figure 20:
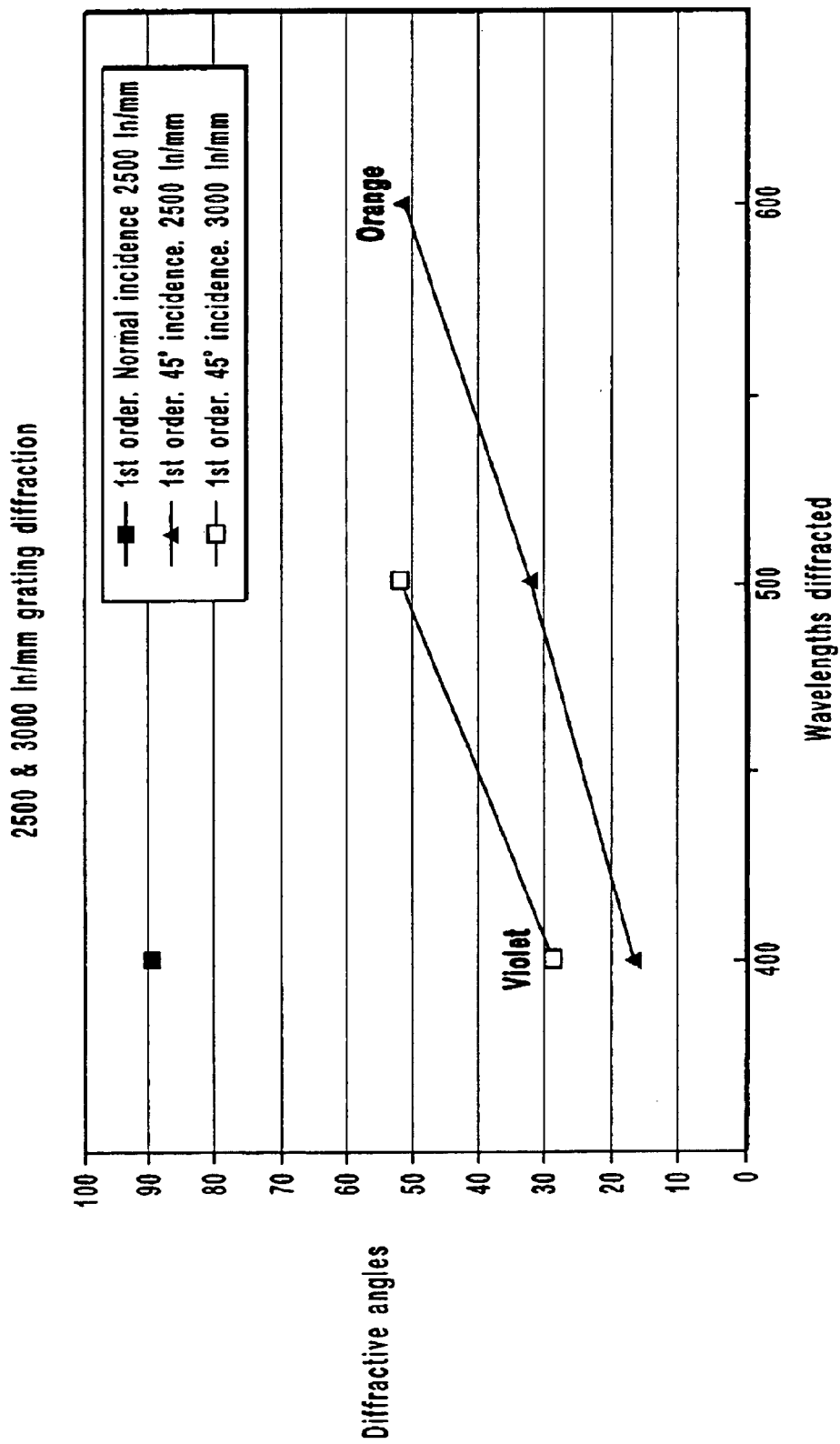
FIG. 20 is a graph illustrating the diffraction angle for various wavelengths at normal and 45° incidence for a diffractive grating having 2500 ln/mm and a diffractive grating having 3000 ln/mm.

For the 500 ln/mm grating (Example 1) as shown in FIG. 15, at a given diffractive angle, as for example 40 degrees (at normal incidence), the $3^{rd}$ order normal incidence curve has an overlap color with the $2^{nd}$ order normal incidence curve. The same effect occurs for 45 degrees incidence. In the case of the 1000 ln/mm grating (Example 2), overlapping color occurs for the $1^{st}$ and $2^{nd}$ orders at normal and 45° incidence, as shown in FIG. 16. No overlapping is observed at a frequency equal to or higher than 1400 ln/mm (Examples 3–7), as shown in FIGS. 17–20.

Example 8

An aluminized sinusoidal diffractive grating having 1400 ln/mm was modeled using conventional optical software.

Figure 21:
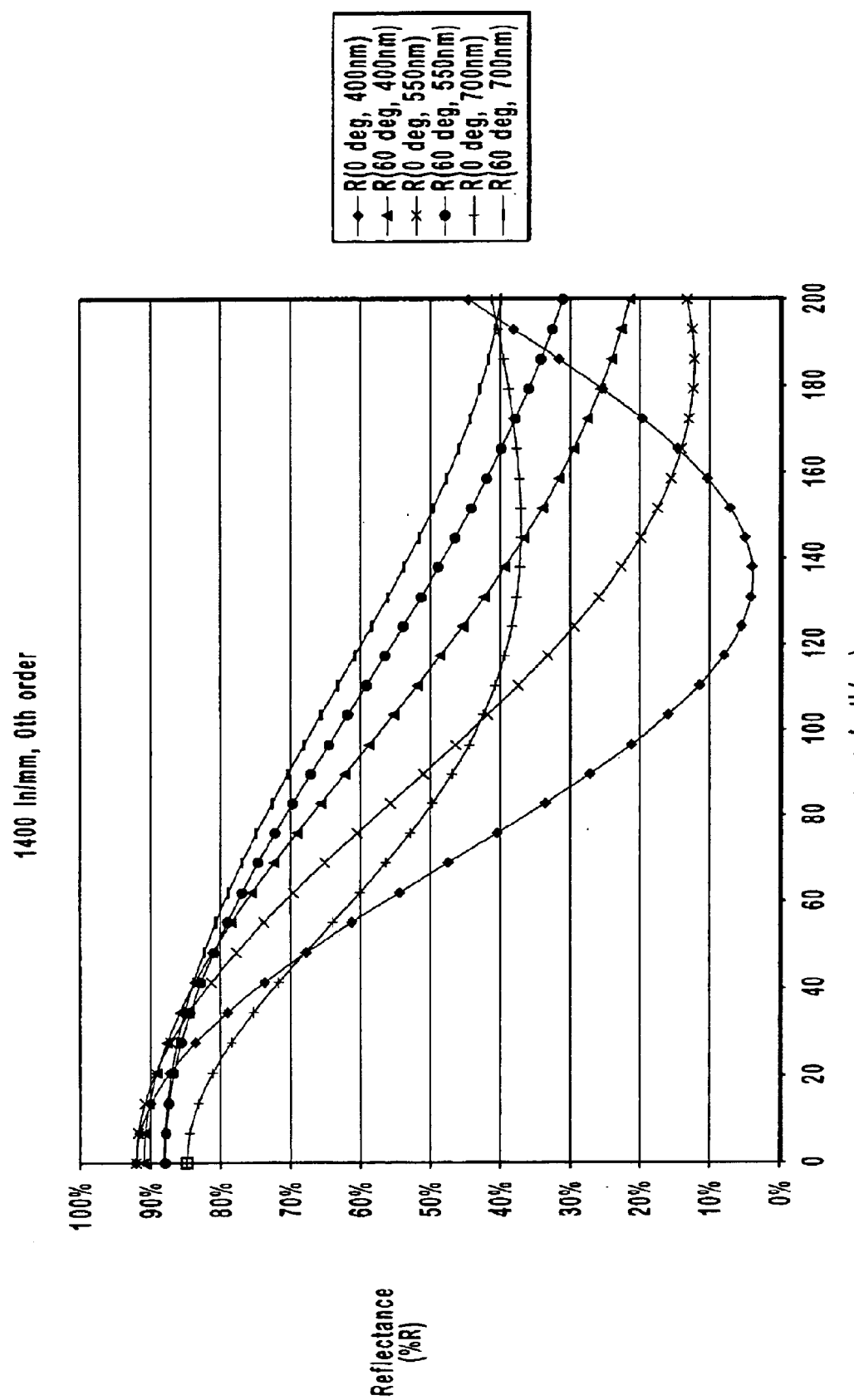
FIGS. 21 and 22 are graphs showing the theoretical efficiency of 1400 ln/mm aluminized sinusoidal gratings at various groove depths at normal and 60° incidence for various wavelengths of light.
Figure 22:
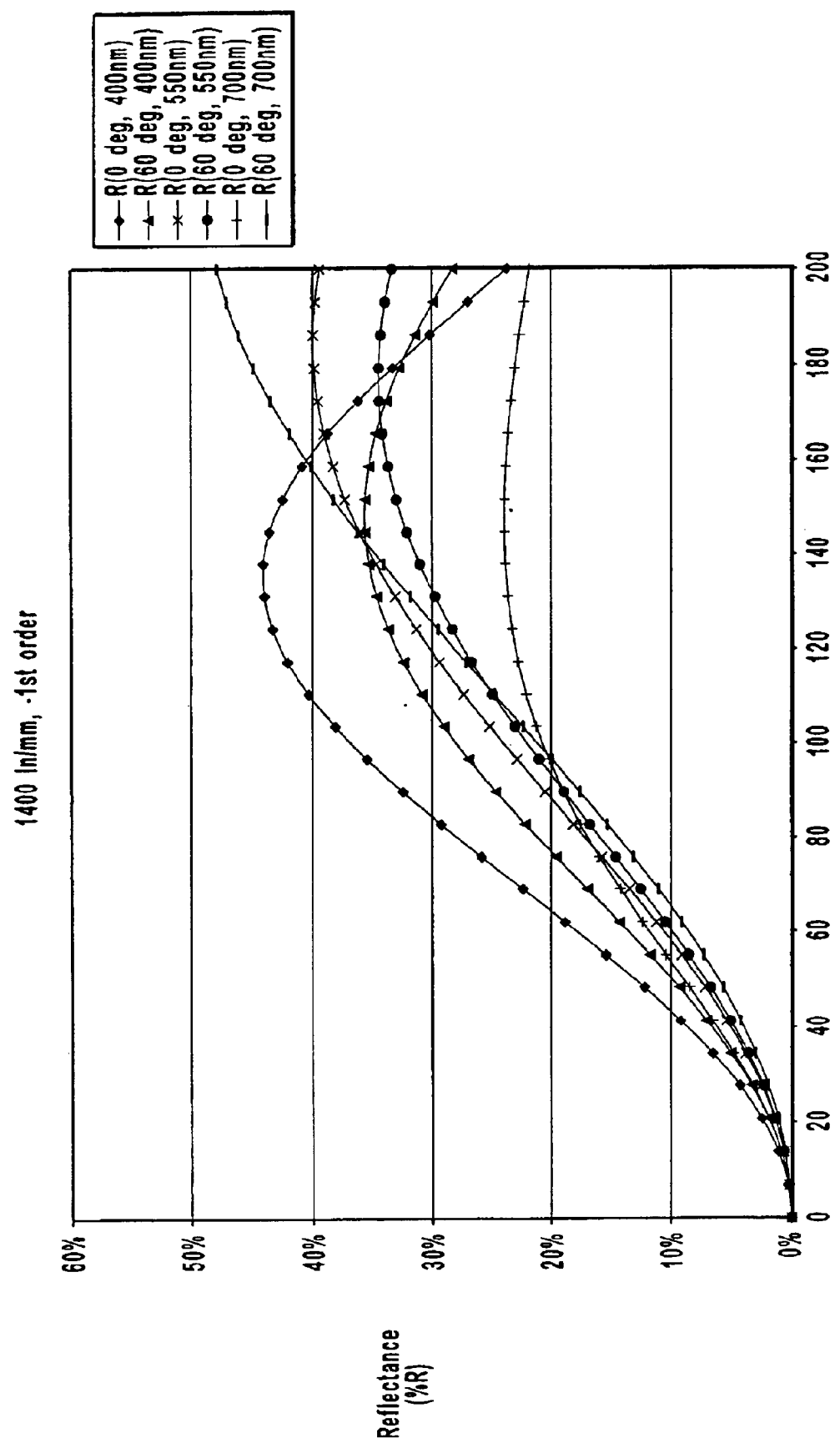

FIGS. 21 and 22 are graphs showing the theoretical efficiency (percent reflectance) of the grating at various groove depths at normal and 60° incidence for 400, 550 and 700 nm wavelength light. The results of the modeling showed that a groove depth close to about 160 nm is a good compromise to get a minimum zero order and a maximum $1^{st}$ order contribution, thereby enhancing the diffractive effects of the grating.

Using the same criteria, the optimum groove depth was determined to be about 220 nm for a 2000 ln/mm grating, and about 116 nm for a 3000 ln/mm grating.

Examples 9–10

Figure 23:
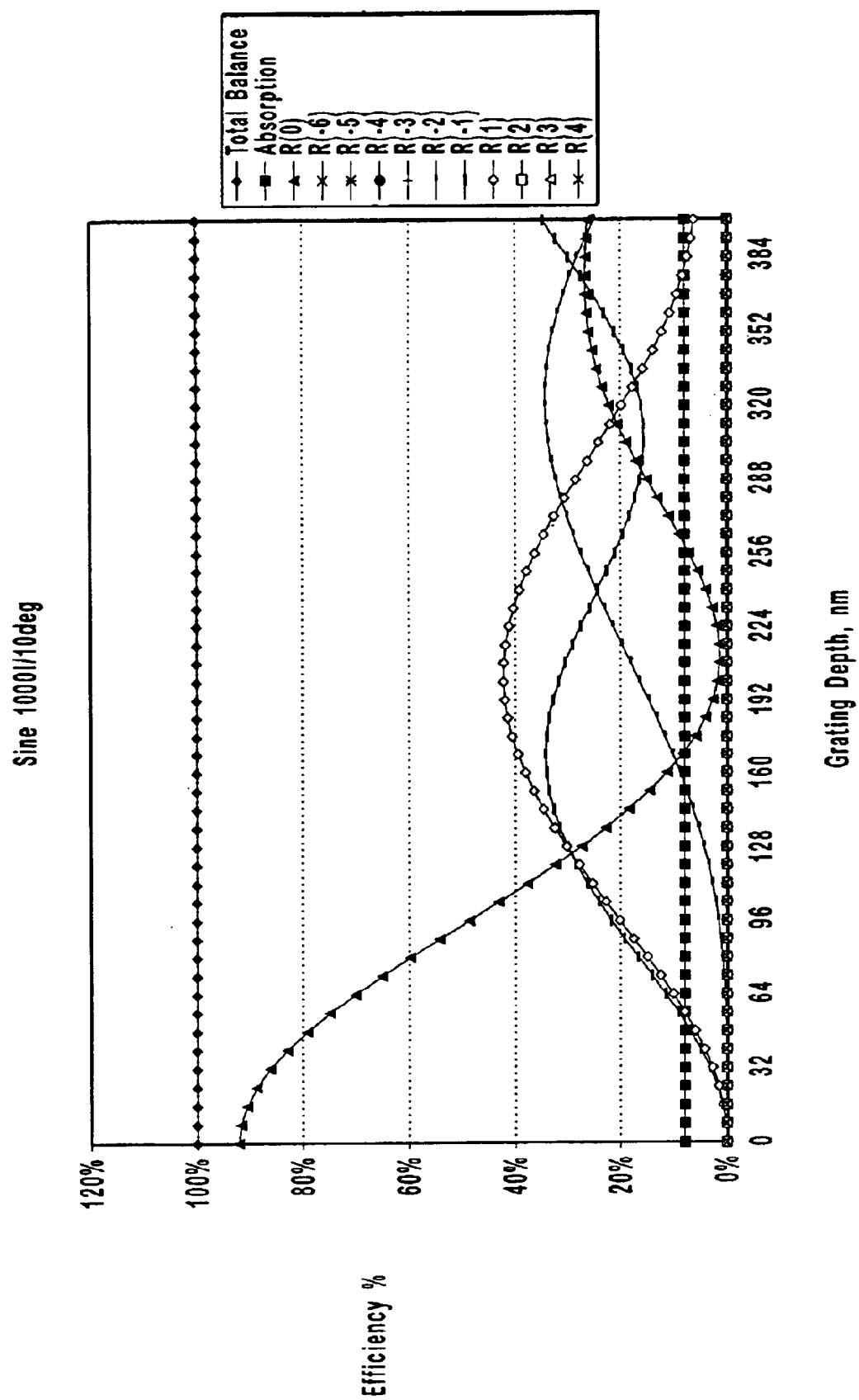
FIGS. 23 and 24 are graphs showing the theoretical efficiency of 1000 ln/mm aluminized sinusoidal and square-wave gratings at various groove depths.
Figure 24:
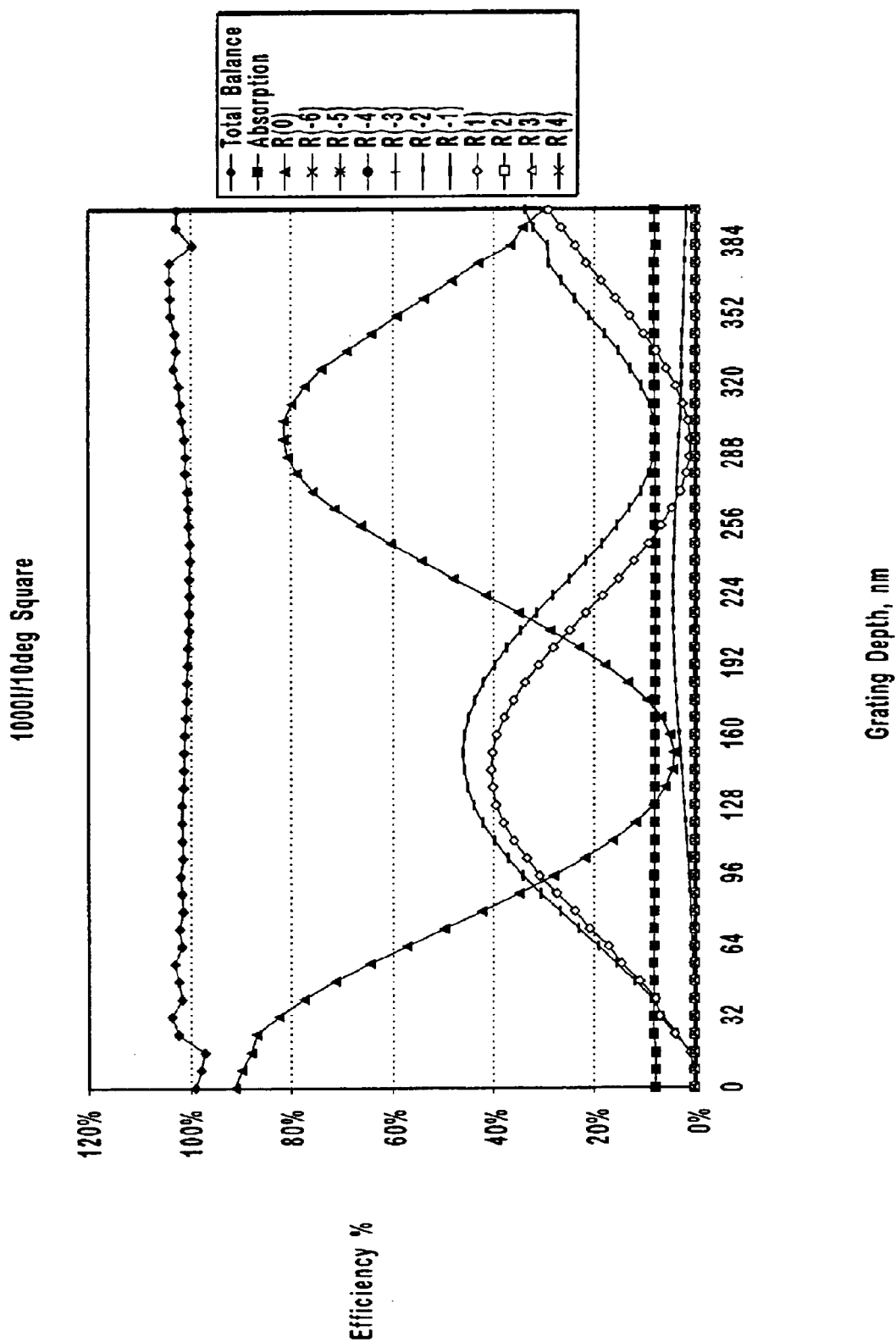

An aluminized sinusoidal diffractive grating having 1000 ln/mm (Example 9), and an aluminized square-wave diffractive grating having 1000 ln/mm (Example 10) were modeled using conventional optical software. The grating of Example 10 was symmetrical, with a ratio between the length of the top of the line and the grating period equal to 0.5. FIGS. 23 and 24 are graphs showing the theoretical efficiency of the gratings of Examples 9 and 10 at various groove depths and at quasi normal incidence for 550 nm.

The modeling showed that for square-wave gratings having 1000 ln/mm, the maximum of the orders is obtained at a groove depth of about 150 nm that corresponds with the minimum of the zero order. At the same frequency, sinusoidal gratings present a maximum of the $1^{st}$ order and a minimum of the zero order for a groove depth of about 200 nm. However, in contrast with the square-wave configuration, the successive orders in the sinusoidal gratings do not follow the same pattern. By judicious arrangements of the groove frequency, shape, depth, etc., one can achieve similar diffractive effects in a pigment application.

Example 11

Figure 26:
FIGS. 25–29 are photographs taken with a Scanning Electron Microscope of various diffractive pigment flakes made according to the invention.
Figure 27:
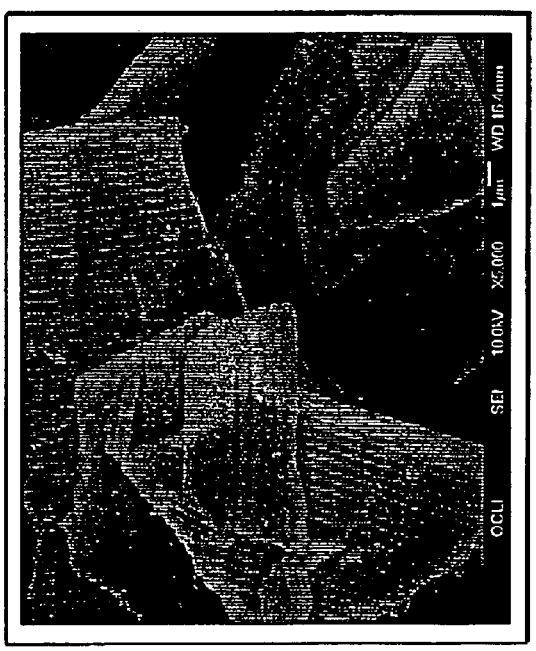
Figure 25:
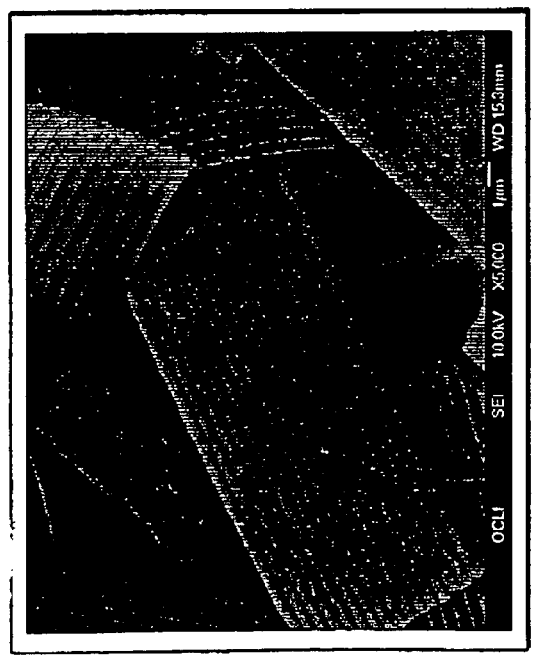

FIGS. 25–27 are photographs taken with a Scanning Electron Microscope of various ground diffractive flakes produced according to the present invention. Specifically, FIG. 25 shows flakes with a 1400 ln/mm linear grating, FIG. 26 shows flakes with a 1400 ln/mm cross grating, and FIG. 27 shows flakes with a 2000 ln/mm linear grating. The microstructure obtained in all cases was very homogeneous, indicating a good replication of the grating substrates.

Example 12

Figure 29:
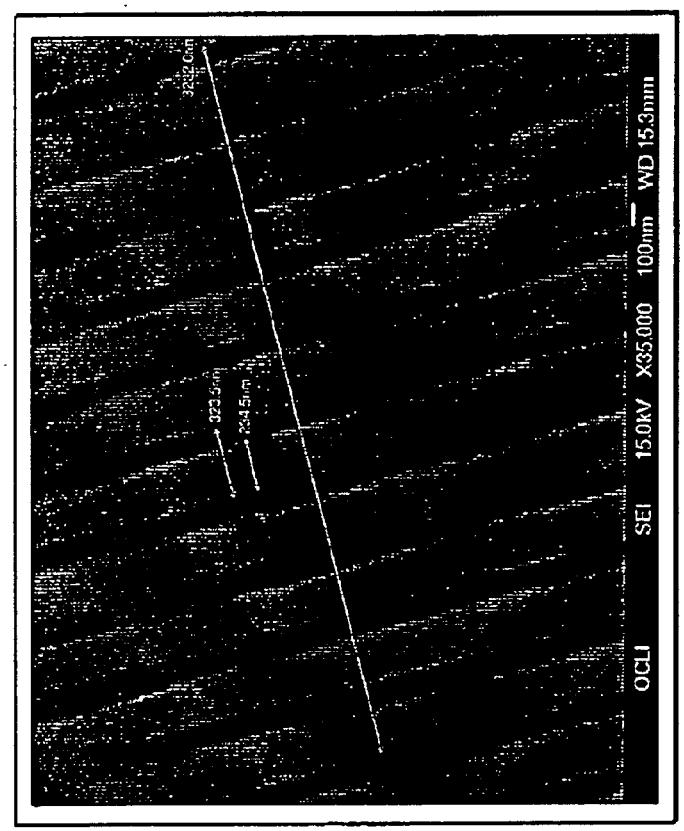
Figure 28:
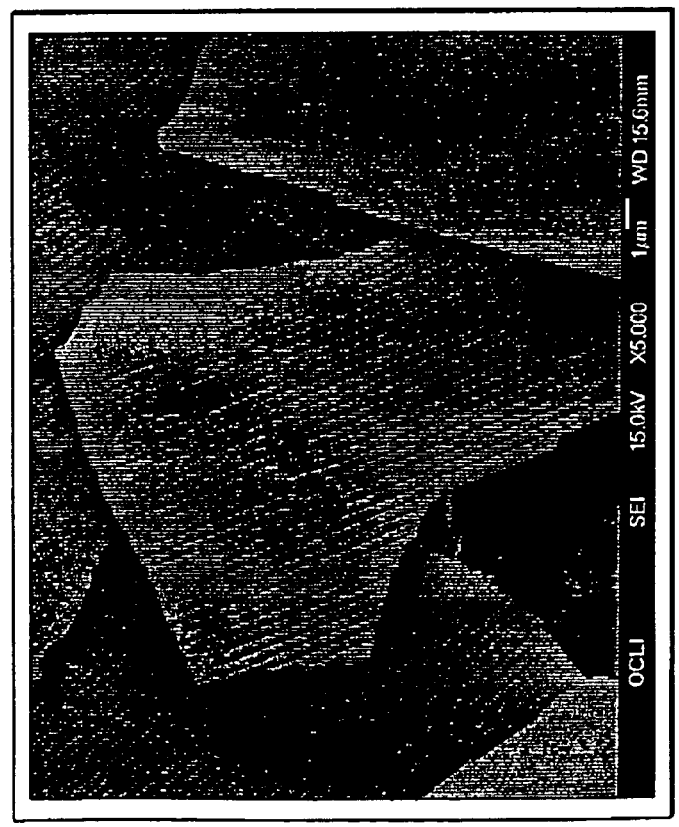

FIGS. 28–29 are photographs taken with a Scanning Electron Microscope of ground diffractive flakes having a 3000 ln/mm linear grating and made with the following coating design:

2QWOT ZnS@687 nm/160 nm Al/2QWOT ZnS@687 nm

FIGS. 28 and 29 verify that even for high grating frequencies, the grating pattern is transferable to a thin film stack used to make grated flakes. The microstructure obtained was very homogeneous, indicating a good replication of the grating substrates.

Example 13

Figure 30:
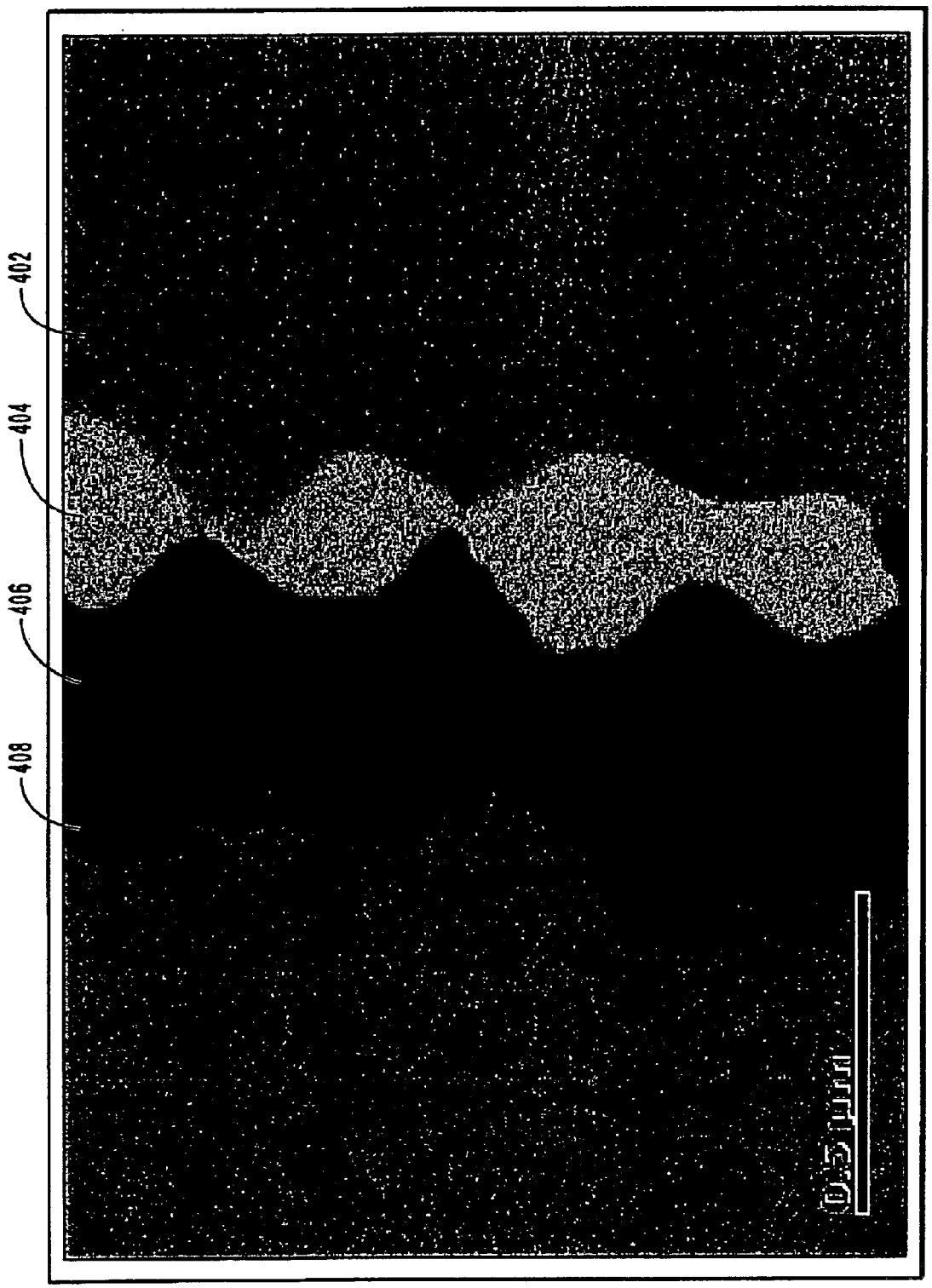
FIG. 30 is a cross-section transmission electron micrograph showing the coating microstructure of a diffractive pigment flake of the invention.

FIG. 30 is a cross-section transmission electron micrograph showing the coating microstructure of a diffractive pigment particle which has been delaminated from a grating substrate. In particular, the micrograph shows a 2000 ln/mm grating 402 used to form a multilayer coating structure including a dielectric layer 406 and a reflective layer 408. A delamination zone 404 is shown between grating 402 and dielectric layer 406. The dielectric layer 406 is a 7 QWOT layer of ZnS at 550 nm, and the reflective layer 408 is an 80 nm layer of Al. The physical thickness of the ZnS layer is about 410 nm, thus providing a thin film stack with a physical coating thickness of about 490 nm. The micrograh shows that the coating layers follow the profile of grating 402 and thus should maintain the diffractive optical effects of the uncoated grating.

Example 14

A diffractive pigment is formed by depositing the following thin film layers onto a 50 nm NaCl release layer overlying a lined diffractive grating polymer web substrate:

5 nm Cr/2QWOT MgF$_2$@600 nm/160 nm Al/2QWOT MgF$_2$@600 nm/5 nm Cr The deposited layers are exposed to warm water, dissolving the release layer, and thereby converting the thin film stack into flakes. The flakes exhibit a gold to silver color shifting background along with a diffractive optical effect when applied to an object.

Example 15

A diffractive pigment was formed by depositing the following thin film layers onto a 60 nm NaCl release layer overlying a 1400 ln/mm linear grating foil substrate:

8 nm Cr/X QWOT ZnS@Y nm/160 nm Al/X QWOT ZnS@Y nm/8 nm Cr Three pigment samples (A–C) were formed having the above optical coating design with the respective pare values (X, Y) listed in Table 2 for each sample.

TABLE 2

| Sample | X | Y |
|---|---|---|
| A | 3 | 400 |
| B | 4 | 500 |
| C | 4 | 635 |

The grating foil substrate and deposited layers were exposed to water, dissolving the NaCl layer, and thereby converting the thin film stack into flakes with a large, broad particle size, which was subsequently fragmented to form diffractive flakes. The flakes were ultrasonically ground to have an average particle size of about 20 microns. After grinding, the flakes were added to a paint vehicle and applied to Laneta cards as drawdowns. Some of the diffractive flakes in the paint vehicle were also sprayed onto objects with different shapes to show their decorative appearance.

The pigment samples A, B, and C had background colors of red, green and purple, respectively. The background color, considered as the strongest color when the sample is viewed with strict diffuse light, acts as a filter for some of the diffracted wavelet beams. As a consequence of the background colors being combined with the diffractive effects, a unique gamut of colors was produced when coated objects were observed at different angles.

Figure 31:
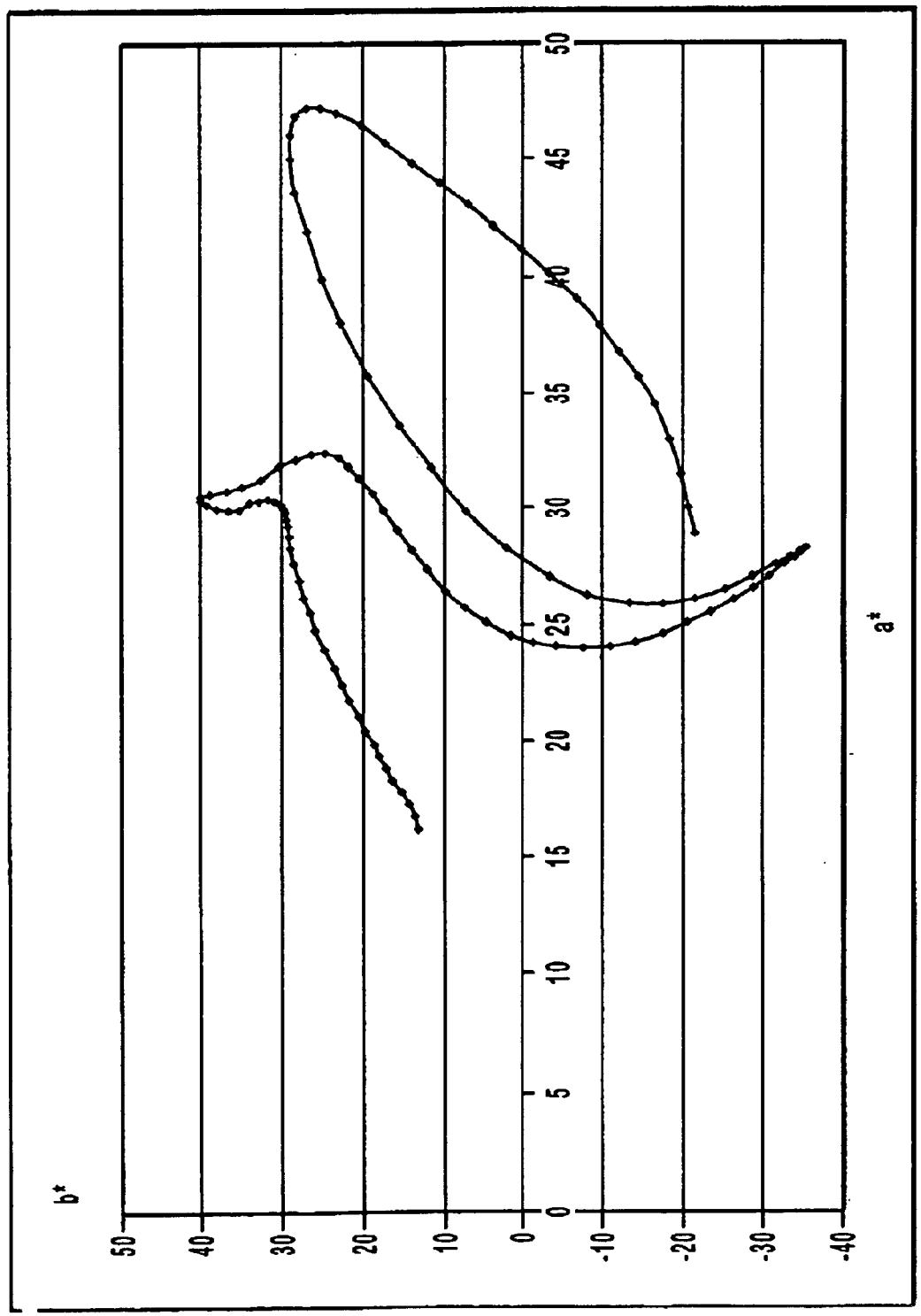
FIGS. 31–33 are a*b* diagrams which plot the color trajectory and chromaticity of various diffractive pigments of the invention.
Figure 32:
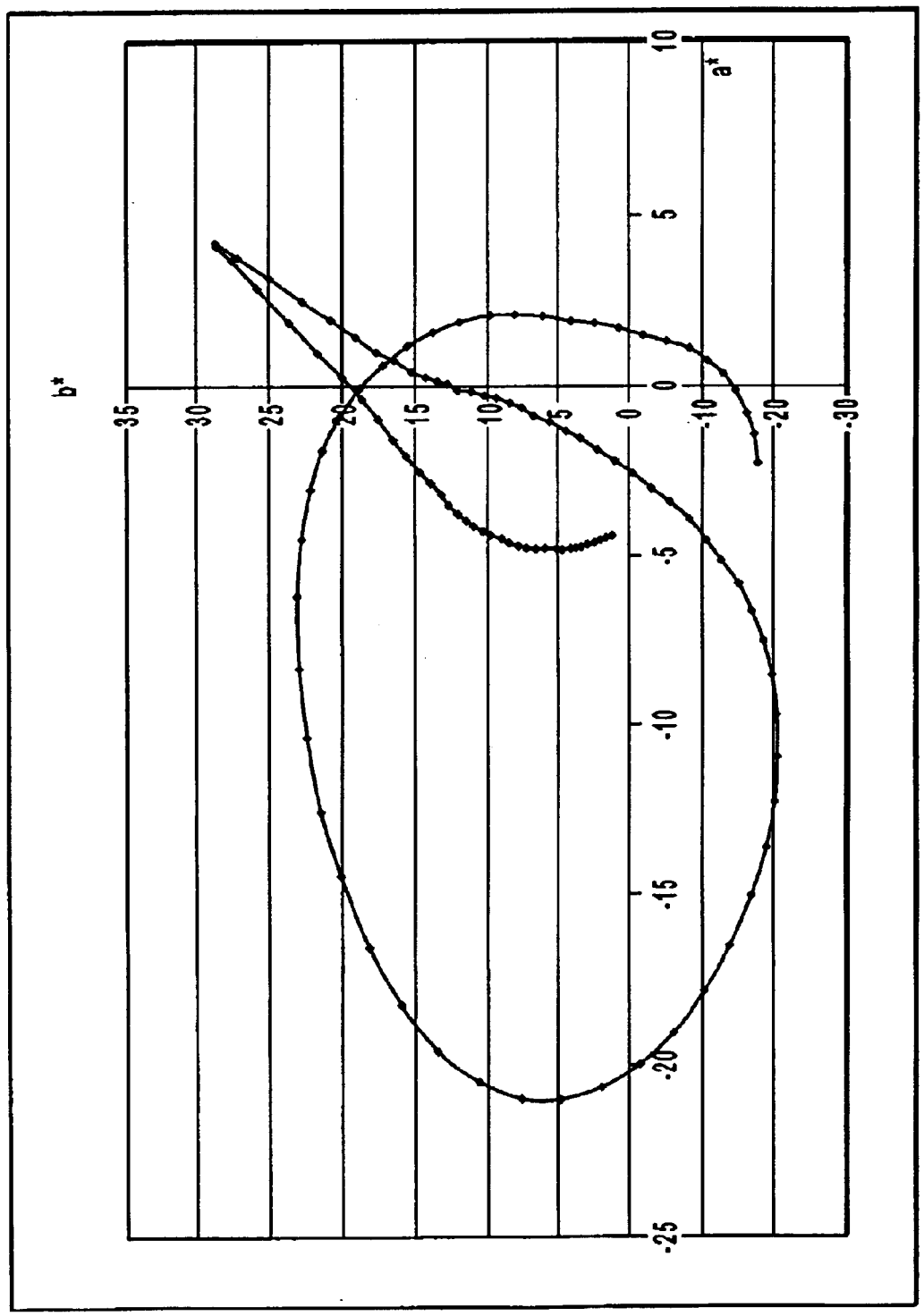
Figure 33:
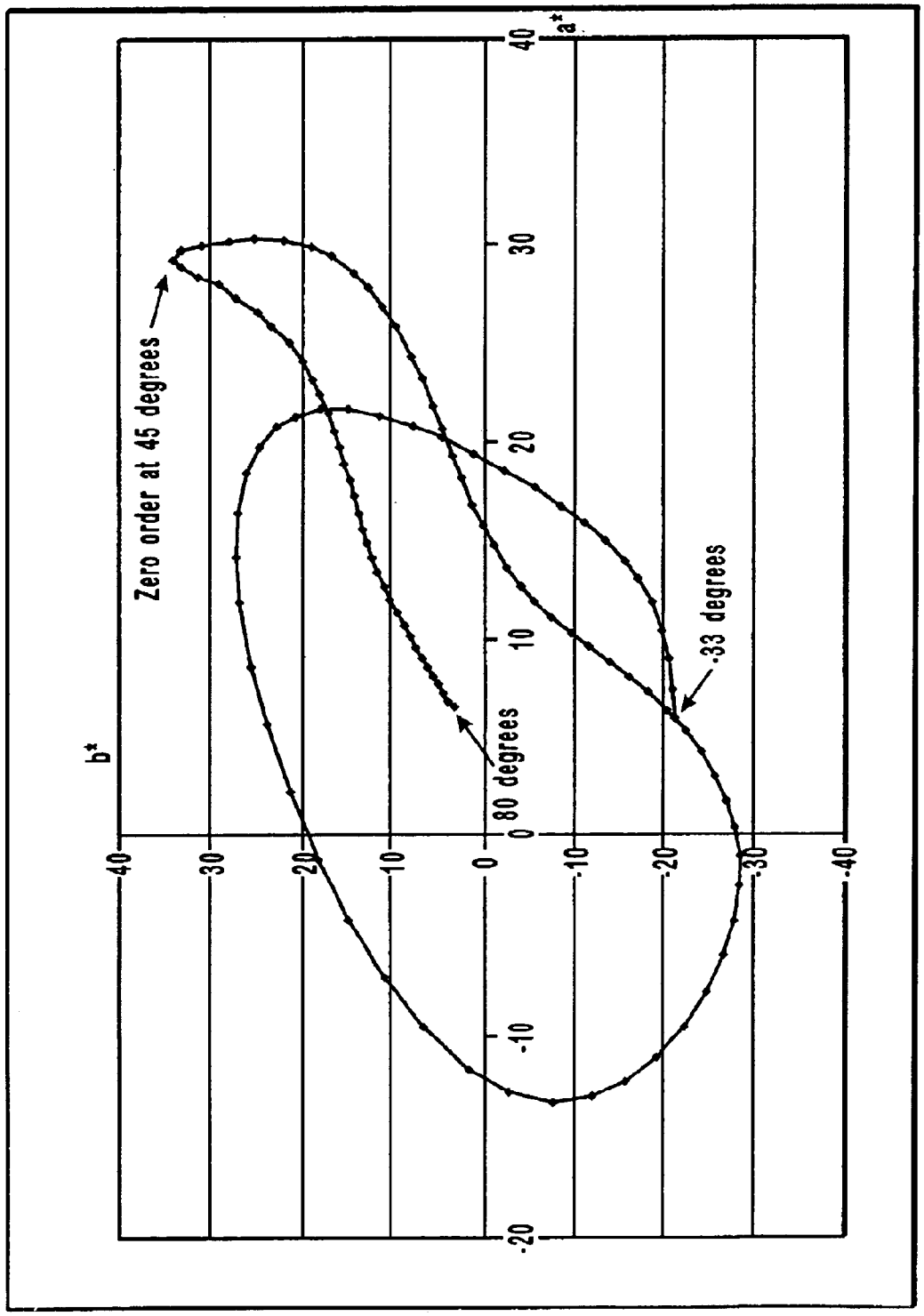

FIGS. 31–33 are a*b* diagrams which plot the color trajectory and chromaticity of pigment samples A–C, respectively. Measurements were performed with a Murakami goniospectrophotometer. The "filtering" effects from the background colors are clearly shown in the color travel depicted in the a*,b* plots of FIGS. 31–33. For example, the pigment sample A (FIG. 31) travels in the $1^{st}$ (+b,+a) and $4^{th}$ (+a,−b) quadrants of the diagram, filtering the yellow, green and blue colors. The pigment sample B (FIG. 32) basically stays in the $2^{nd}$ (+b,−a) and $3^{rd}$ (−a,−b) quadrants of the diagram, filtering most of the orange, red, and purple colors The pigment sample C (FIG. 33) shows a color traveling in all four quadrants of the diagram.

The background colors in samples A–C are produced by interference refractive effects. It can be seen from the are a*b* diagrams of FIGS. 31–33 that red and green (samples A and B) are spectral saturated colors, but that purple (sample C) is a non-spectral less saturated color obtained by mixing violet and red light beams.

Example 16

A color shifting diffractive pigment was formed by depositing the following thin film layers onto a 60 nm NaCl release layer overlying a 1400 ln/mm linear grating foil substrate:

8 nm Cr/X QWOT MgF$_2$@Y nm/160 nm Al/X QWOT MgF$_2$@Y nm/8 nm Cr

Three pigment samples (D–F) were formed having the above optical coating design with the respective pare values listed in Table 3 for each sample.

TABLE 3

| Sampler | X | Y |
|---|---|---|
| D | 4 | 531 |
| E | 4 | 665 |
| F | 3 | 497 |

The grating foil substrate and deposited layers were exposed to water, dissolving the NaCl layer, and thereby converting the thin film stack into flakes with a large, broad particle size, which was subsequently fragmented to form diffractive flakes. The flakes were ultrasonically ground to have an average particle size of about 20 microns. After grinding, the flakes were added to a paint vehicle and applied to Laneta cards as drawdowns. Some of the diffractive flakes in the paint vehicle were also sprayed onto objects with different shapes to show their decorative appearance.

The pigment samples D, E, and F had color shifting background colors of green/blue, magenta/green, and red/gold, respectively. The background colors in the pigment samples travels from the corresponding higher wavelengths (e.g., green) to the lower wavelengths (e.g., blue) as the viewing angle changes from 0° to higher angles.

Figure 34:
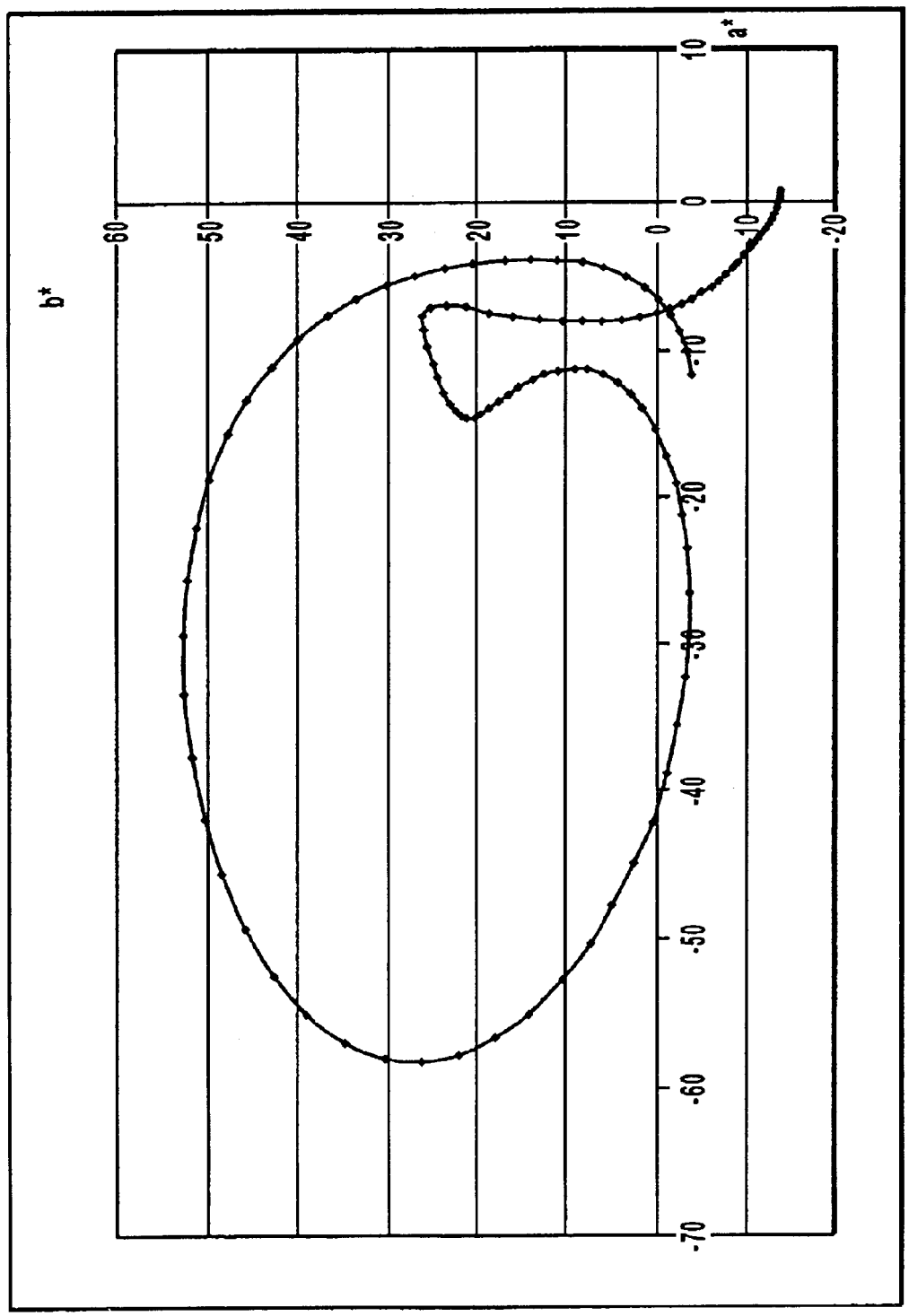
FIGS. 34–36 are a*b* diagrams which plot the color trajectory and chromaticity of various color shifting diffractive pigments of the invention.
Figure 35:
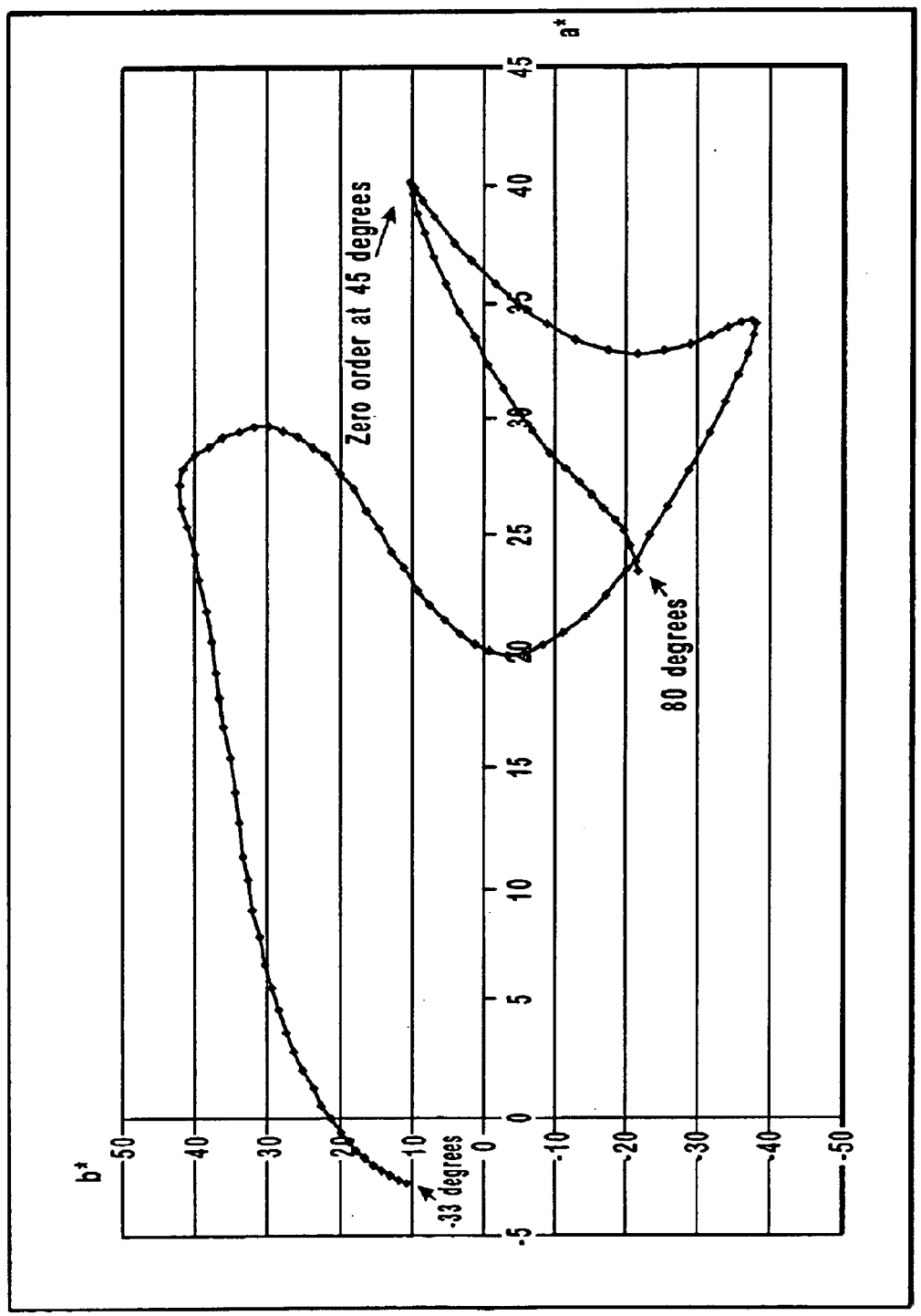
Figure 36:
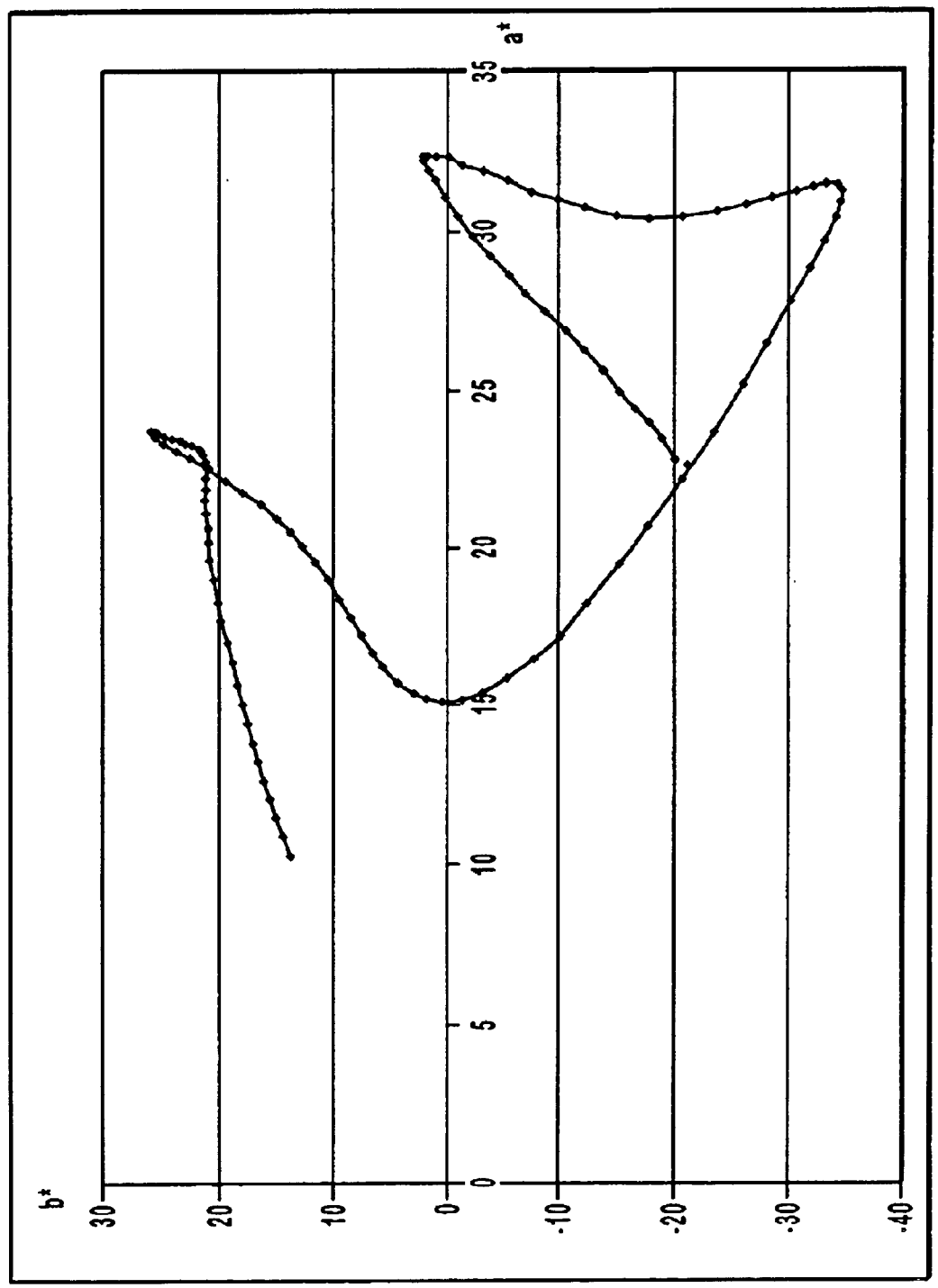

FIGS. 34–36 are a*b* diagrams which plot the color trajectory and chromaticity of pigment samples D–F, respectively. Measurements were performed with a Murakami goniospectrophotometer. The "filtering effects" are clearly shown in the color travel depicted in the a*b* diagrams of FIGS. 34–36. For example, the pigment sample D (FIG. 34) stays in the $2^{nd}$ (+b,−a) quadrant. The pigment samples E (FIG. 35) and F (FIG. 36) travel in the $1^{st}$ (+b,+a) and $4^{th}$ (+a,−b) quadrants, however their trajectories are very different.

For a particular color shifting coating design, a non-grated paint drawdown will only show a line between a value close to zero (faded color almost non-chromatic) for high angles and the point in the plot characteristic of the hue of the particular design at 45° illumination/view specular reflection. Without the diffractive effects, for a flat platelet-like pigment, the color shifting coating design produces a color shifting pigment by light interference. When diffraction is added to the color shifting interference phenomenon, the optical impression obtained by the superposition of these two different phenomena is unusual and highly attractive. As in the case of the slight shifting diffractive pigments, the background color acts as a filter for some of the diffracted wavelet beams, with the color of the filter changing with the viewing angle.

Examples 17–19

Copper-based diffractive pigments were formed by depositing thin film layers onto a release layer overlying a lined diffractive grating polymer web substrate having a frequency of 1400 ln/mm. The coating designs used in forming the copper-based diffractive pigments were as follows:

2QWOT ZnS@450 nm/Cu/2QWOT ZnS@450 nm (Ex. 17);

2QWOT ZnS@750 nm/Cu/2QWOT ZnS@750 nm (Ex. 18); and 8 nm Cr/2QWOT ZnS@750 nm/Cu/2QWOT ZnS@750 nm/8 nm Cr (Ex. 19).

The thickness of the Cu layer was between about 60 nm and about 100 nm for the coating designs of Examples 17–19. The deposited layers were exposed to warm water, dissolving the release layer, and thereby converting the thin film stack into flakes.

The pigment flakes of Example 17 exhibited a bronze background color along with a diffractive optical effect when applied to an object, while the pigment flakes of Example 18 exhibited an olive background color along with a diffractive optical effect when applied to an object. The pigment flakes of Example 18 exhibited a different background color than the pigment flakes of Example 17 because of the change in the optical thickness of ZnS. The pigment flakes of Example 19 exhibited a teal/blue background color with diffractive optical effects when applied to an object.

Figure 37:
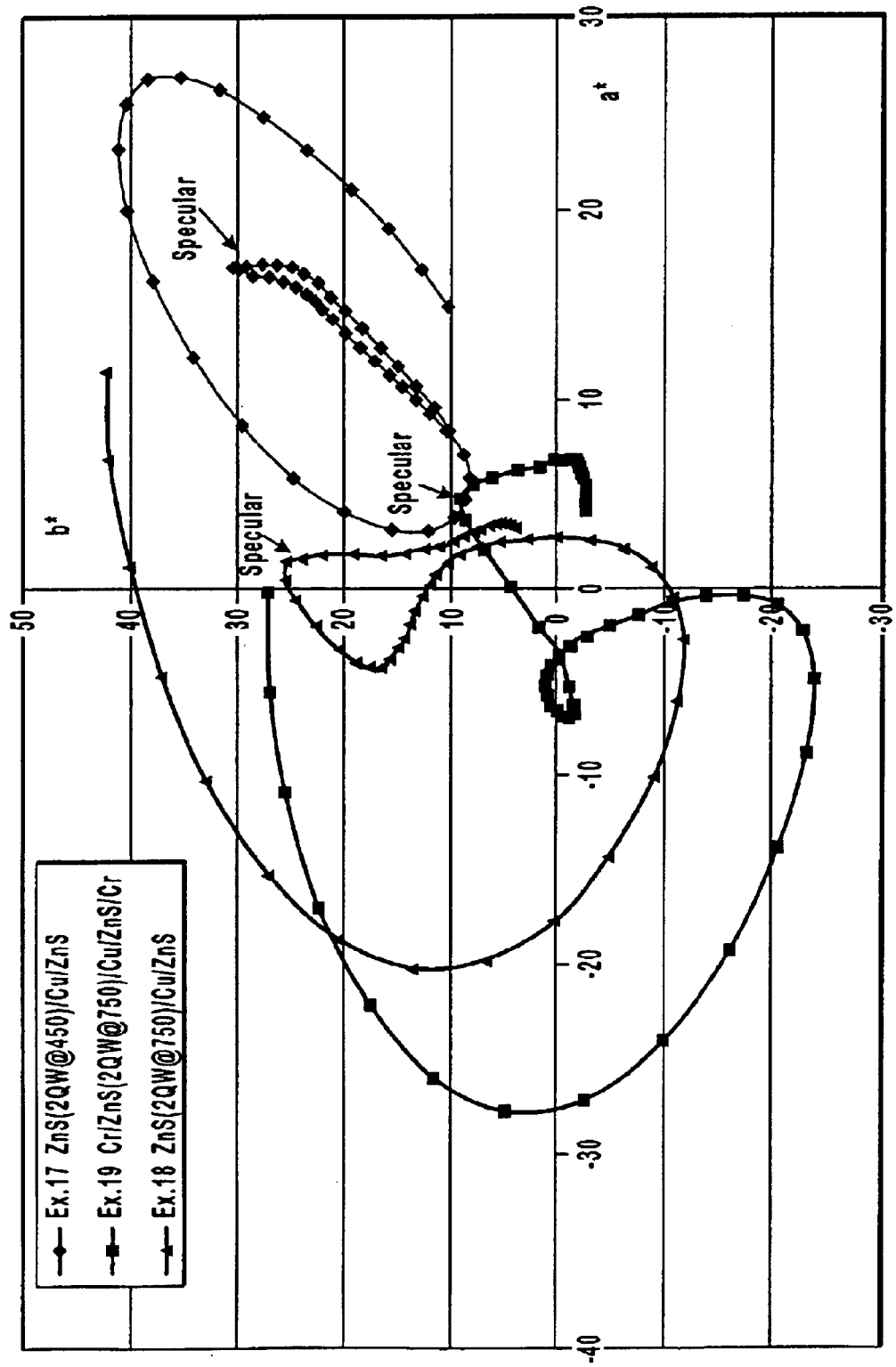
FIG. 37 is an a*b* diagram which plots the color trajectory and chromaticity of various copper-based diffractive pigments of the invention.

FIG. 37 is an a*b* diagram that plots the color trajectory and chromaticity of the pigment flakes of Examples 17–19. The a*b* diagram of FIG. 37 shows the change of background color due to the different optical thickness of the ZnS layers in Examples 17 and 18, and the change in color when a partial absorber (Cr) is added to the coating design (Example 19). It should be noted that the diffractive color traveling difference between Examples 18 and 19 is due to the Cr layer being partially reflective of some of the light. Since the Cr layer is partially transmitting, some light is going to be reflected/diffracted by this layer before it gets into the dielectric/reflector (ZnS/Cu) stack.

Examples 20–22

Chromatic diffractive pigments were formed by depositing thin film layers onto a release layer overlying a lined diffractive grating polymer web substrate having a frequency of 1400 ln/mm. The coating designs used in forming the diffractive pigments were as follows:

8 nm Cr/4QWOT ZnS@500 nm/Al/4QWOT ZnS@500 nm/8 nm Cr (Ex. 20);

8 nm Cr/4QWOT MgF$_2$@530 nm/Al/4QWOT MgF$_2$@530 nm/8 nm Cr (Ex. 21).

A non-diffractive color shifting pigment was formed for comparative purposes by depositing thin film layers onto a release layer overlying a smooth polymer web substrate having a frequency of 1400 ln/mm. The coating design used in forming the non-diffractive color shifting pigment was as follows:

8 nm Cr/4QWOT MgF$_2$@530 nm/Al/4QWOT MgF$_2$@530 nm/8 nm Cr (Ex. 22).

The pigment flakes of Example 20 exhibited a slight shifting green background color along with a diffractive optical effect, while the pigment flakes of Example 21 exhibited a color shifting green/blue background color along with a diffractive optical effect. The pigment flakes of Example 22 exhibited a color shifting green/blue background color without a diffractive optical effect.

Figure 38:
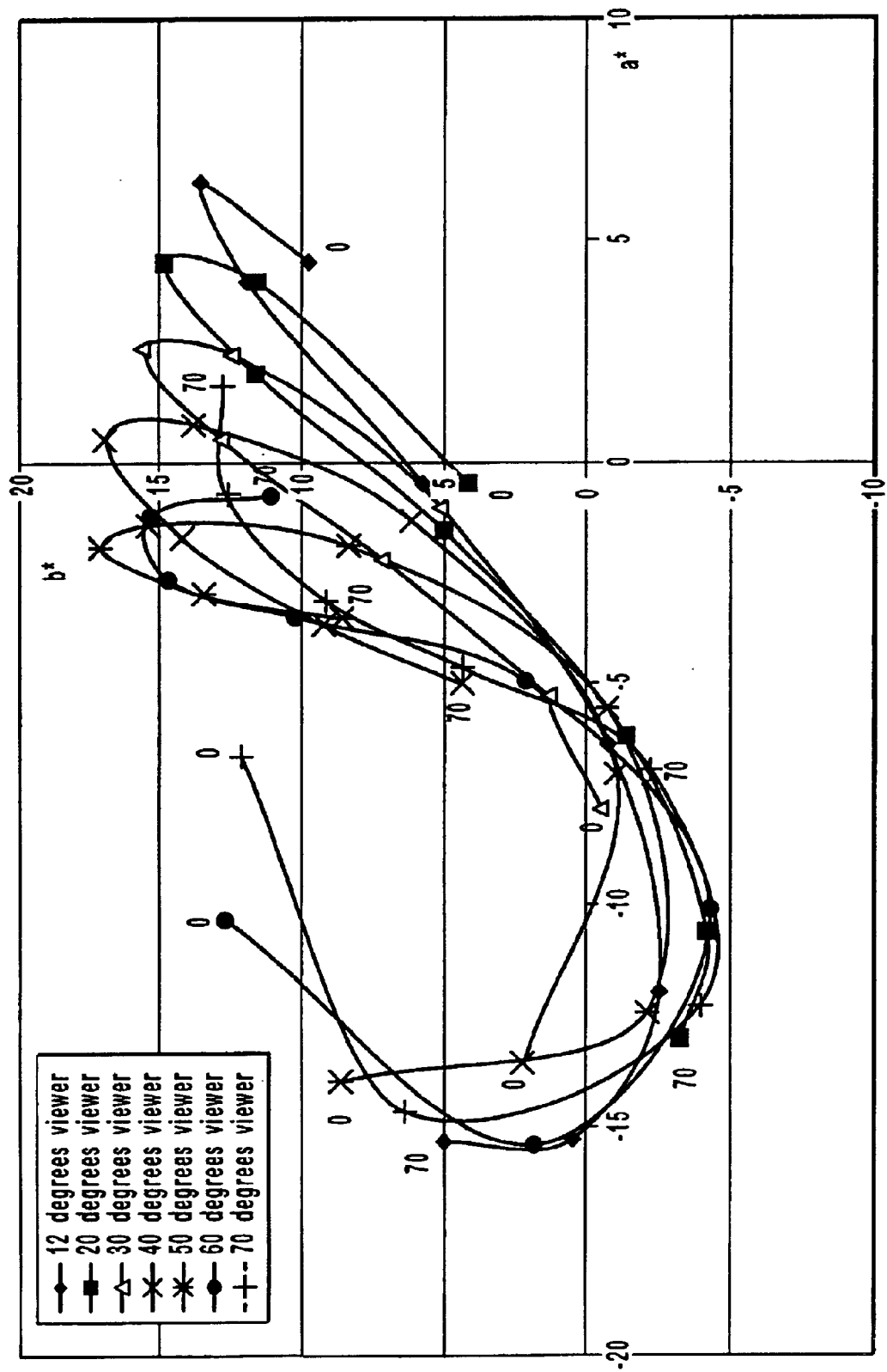
FIGS. 38–39 are a*b* diagrams which plot the color trajectory and chromaticity of various diffractive pigments of the invention.
Figure 39:
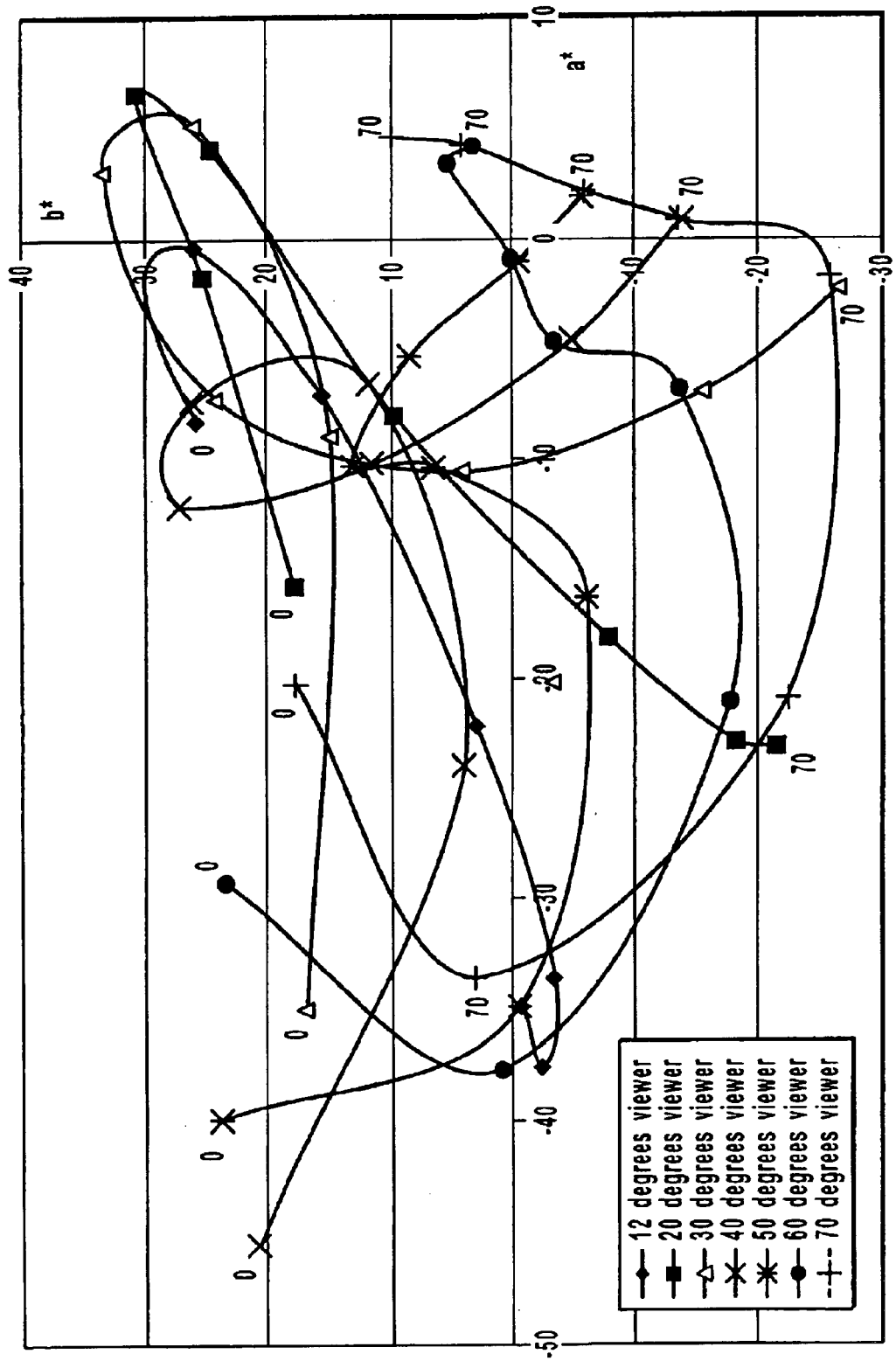
Figure 40:
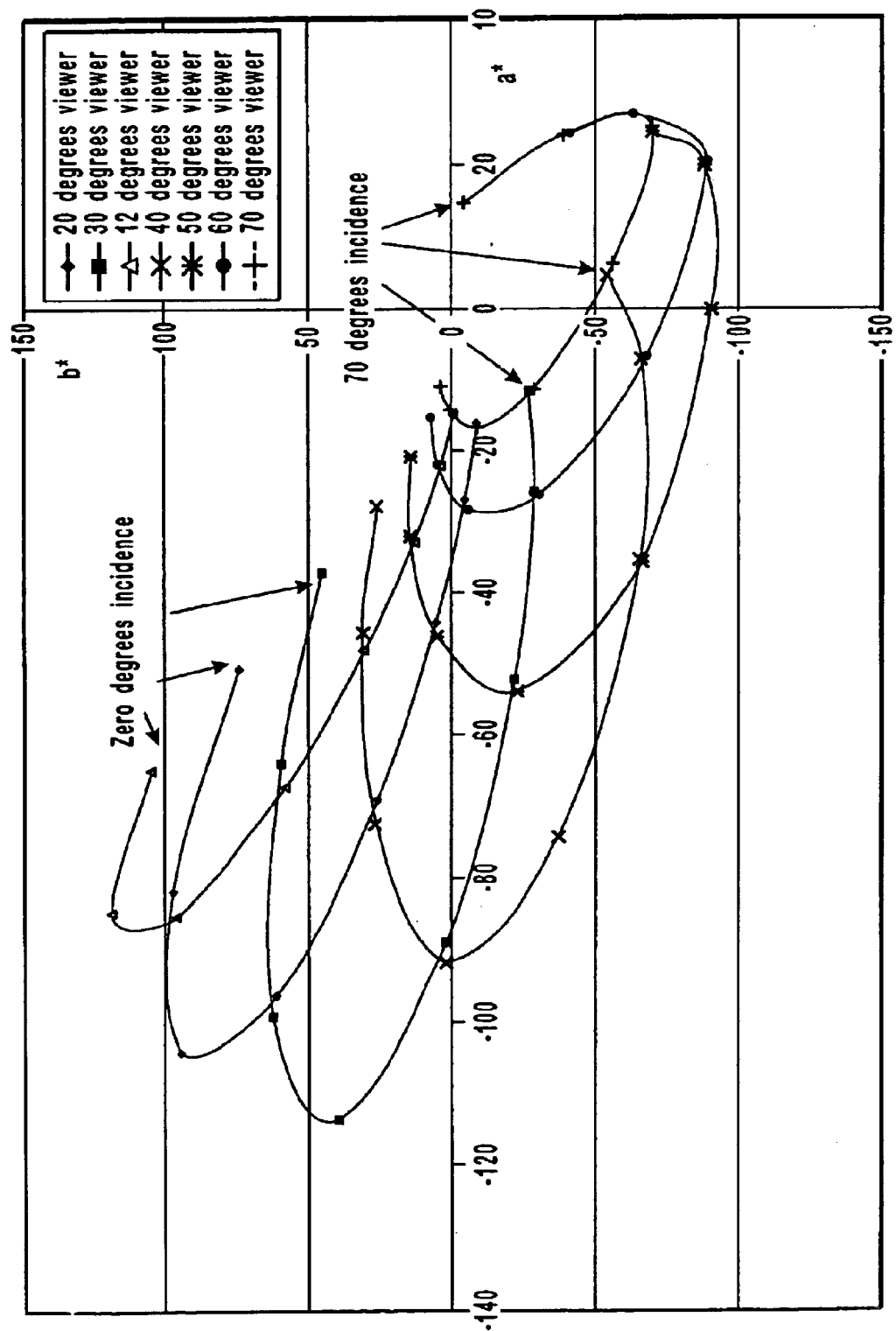
FIG. 40 is an a*b* diagram which plots the color trajectory and chromaticity of a color shifting non-diffractive pigment.

FIGS. 38–40 are a*b* diagrams which plot the color trajectory and chromaticity of the pigment flakes of Examples 20–22, respectively. Measurements were performed with a Murakami goniospectrophotometer. The a*b* diagrams of FIGS. 38–40 show the change in color (a*, b* coordinates) for a fixed sample object coated with a respective pigment flake composition of Examples 20–22, and a fixed viewer angle (12 to 70 degrees) when the incident light changes from zero to 70 degrees which respect to the normal of the sample object.

The corresponding color variations of the pigments is plotted in the a*b* diagrams of FIGS. 38–40 as a series of lines or trajectories, which can be used to aid in understanding the color variation that an observer can experience when viewing a curved object coated with the pigments. Each trajectory represents a constant value angle of viewer orientation, with a continuous line of the trajectory connecting measured color values at a series of illumination angles, wherein the actual measured values correspond to the symbol mark locations on the line. The different symbol marks in the a*b* diagrams represent the fixed viewer orientations of 12, 20, 30, 40, 50, 60 and 70 degrees for a specific trajectory. The color coordinates were calculated from the full spectral response of the pigment as the instrument's illumination source orientation was stepped in 10 degree increments from 0 to 70 degrees for each viewer orientation. The common symbol marks on a particular trajectory represent each increment corresponding to the illumination source orientation. Thus, the unique value of the illumination source angle can be determined at each symbol mark by counting from either the beginning or end of each of the trajectory terminal ends, which are labeled as either 0 or 70 in the diagram. Thus, for a given orientation of the viewer with respect to a planar surface, sweeping an illumination source from the normal orientation to a 70 degree angle of incidence results in an observed color corresponding to the trajectory.

In order to appreciate the perception by an observer of a curved object coated with a pigment, a single trajectory is insufficient as both the viewer and illumination angle change. The color space in the a*b* diagrams that is traversed with the incremental changes in viewer and illumination conditions correspond to a given surface curvature. This shows one of the benefits of the inventive pigments and its use in a paint, which is to highlight the curvature of objects over a range of lighting conditions. The color space may be plotted or derived at any point on a first trajectory, where movement on the trajectory represents a change in inclination of the illumination source with respect to the surface normal. Adjacent trajectories correspond to changes in viewer orientation such as occurs when a fixed observer views the curvature of an object.

The trajectories shown in the a*b* diagram of FIG. 38 are offset toward the area of color space centered about the color coordinates characteristic of the green background color of the non-shifting diffractive pigment of Example 20. These trajectories also form loops that splay outward, with the apex of each loop proximate to the specular reflection point. The separation between these trajectories is predictive of a higher color contrast, particularly in the region corresponding to the specular reflection. The non-shifting pigment of Example 20 has a pleasing color in diffuse lighting, but also provides a higher level of contrast for curved regions when a strong source of illumination, such as bright sunlight, is present.

For the non-diffractive color shifting green/blue pigment (Example 22), the trajectories shown in the a*b* diagram of FIG. 40 form oval-like shapes having an apex at the specular condition, and progress in a regular counter-clockwise fashion with the opposing apex anchored about the origin. The regular procession of the trajectories is predictive of a high color contrast through a broader range of illumination and viewing conditions.

For the diffractive color shifting green/blue pigment (Example 21), the trajectories shown in the a*b* diagram of FIG. 39 do not form regular or common shapes, nor is there a pattern as to their orientation or movement. The irregular paths of these trajectories covers a wider area of color space with minimum overlap, which will provide a higher color contrast as well as distinctive colors along a curved surface. Thus, the various regions along a curved surface coated with the diffractive color shifting green/blue pigment will exhibit different sets of colors.

Where diffractive and interference effects combine, the coloration ranges will generally not be symmetric about a point, but rather will be unique for each position of viewer and illumination. By combining color shifting effects with diffractive color, the curvature and depth of an object are highlighted in unique color schemes that vary in both diffuse and highly collimated lighting conditions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A diffractive pigment flake, comprising:
    a central reflector layer having a first major surface, an opposing second major surface, and at least one side surface;
    a first dielectric layer overlying the first major surface of the reflector layer; and
    a second dielectric layer overlying the second major surface of the reflector layer;
    wherein the first and second dielectric layers comprise a dielectric material having a refractive index of greater than about 1.3, and the pigment flake has a diffraction grating pattern throughout the layers thereof with at least about 1,400 grating lines per mm and a grating depth of at least about 100 nm.

2. The pigment flake of claim 1, wherein the reflector layer comprises a reflective material with inherent color and selected from the group consisting of copper, gold, silver-copper alloys, brass, bronze, titanium nitride, and compounds, combinations or alloys thereof.

3. The pigment flake of claim 1, wherein the reflector layer has a physical thickness of about 10 nm to about 200 nm.

4. The pigment flake of claim 1, wherein the dielectric material is selected from the group consisting of zinc sulfide, zinc oxide, zirconium oxide, titanium dioxide, diamond-like carbon, indium oxide, indium-tin-oxide, tantalum pentoxide, cerium oxide, yttrium oxide, europium oxide, iron oxides, hafnium nitride, hafnium carbide, hafilium oxide, lanthanum oxide, magnesium oxide, neodymium oxide, praseodymium oxide, samarium oxide, antimony trioxide, silicon, silicon monoxide, selenium trioxide, tin oxide, tungsten trioxide, zirconium titanium oxide, niobium titanium oxide, and combinations thereof.

5. The pigment flake of claim 1, wherein the dielectric material is selected from the group consisting of magnesium fluoride, silicon dioxide, aluminum oxide, aluminum fluoride, cerium fluoride, lanthanum fluoride, neodymium fluoride, samarium fluoride, barium fluoride, calcium fluoride, lithium fluoride, and combinations thereof.

6. The pigment flake of claim 1, wherein the first and second dielectric layers are respectively on each of the first and second major surfaces but not on the at least one side surface of the reflector layer.

7. The pigment flake of claim 1, wherein the first and second dielectric layers each have a physical thickness of about 10 microns or less.

8. The pigment flake of claim 1, wherein the diffraction grating pattern has from about 1400 to about 3500 grating lines per mm, and a grating depth from about 100 nm to about 300 nm.

9. The pigment flake of claim 1, wherein the diffraction grating pattern has from about 1400 to about 2000 grating lines per mm, and a grating depth from about 140 nm to about 220 nm.

10. The pigment flake of claim 1, wherein the first and second dielectric layers are part of a contiguous dielectric layer substantially surrounding the reflector layer.

11. The pigment flake of claim 1, wherein the pigment flake has a physical thickness of about 500 nm to about 6000 nm.

12. A diffractive composition, comprising:
    a pigment medium; and
    a plurality of diffractive pigment flakes dispersed in the pigment medium, the pigment flakes having a multi-layer structure comprising:
        a central reflector layer having a first major surface, and an opposing second major surface;
        a first dielectric layer overlying the first major surface of the reflector layer; and
        a second dielectric layer overlying the second major surface of the reflector layer;
    wherein the first and second dielectric layers comprise a dielectric material having a refractive index of greater than about 1.3, and the pigment flakes have a diffraction grating pattern throughout the layers thereof with at least about 1,400 grating lines per mm and a grating depth of at least about 100 nm.

13. The composition of claim 12, wherein the pigment medium comprises a material selected from the group consisting of acrylic melamine, urethanes, polyesters, vinyl resins, acrylates, methyl methacrylate, ABS resins, epoxies, styrenes, ink and paint formulations based on alkyd resins, and mixtures thereof.

14. The composition of claim 12, wherein the composition comprises an ink.

15. The composition of claim 12, wherein the diffractive pigment flakes have a preselected size and loading in the pigment medium suitable for use in a printing process selected from the group consisting of intaglio, lithography, silk screen, gravure, doctor blade, and wet coating.

16. The composition of claim 12, wherein the composition comprises a paint.

17. The composition of claim 16, wherein the paint is an automotive paint.

18. The composition of claim 12, wherein the pigment medium is a cosmetic formulation.

19. The composition of claim 12, wherein the pigment medium is a plastic material capable of being molded or extruded.

20. The composition of claim 12, wherein the first and second dielectric layers comprise zinc sulfide or magnesium fluoride, and the reflector layer comprises copper.

21. The composition of claim 12, wherein the diffraction grating pattern has from about 1400 to about 3500 grating lines per mm, and a grating depth from about 100 nm to about 300 nm.

22. The composition of claim 12, further comprising a plurality of non-diffractive pigment flakes dispersed in the pigment medium.

23. A diffractive pigment flake, comprising:
a reflector layer having a first major surface, an opposing second major surface, and at least one side surface;
a first dielectric layer overlying the first major surface of the reflector layer; and
a first absorber layer overlying the first dielectric layer;
wherein the pigment flake has a diffractive structure throughout the layers thereof, and the first dielectric layer has an optical thickness at a selected design wavelength such that the pigment flake exhibits at least a first background color at a first angle of incident light or viewing.

24. The pigment flake of claim 23, wherein the diffractive structure has a pitch and amplitude selected to decrease the intensity of a zero order diffracted light beam in order to increase the intensity and color contrast of at least one higher order diffracted light beam.

25. The pigment flake of claim 23, wherein the diffractive structure is capable of producing an angular separation of first and second order diffracted light beams when incident light is normal to the flake such that there is no angular superposition of wavelengths from about 400 nm to about 800 nm within the first and second order diffracted light beams.

26. The pigment flake of claim 23, wherein the diffractive structure is characterized at normal incidence by an angular separation between zero order and first order diffracted light beams of at least about 30 degrees.

27. The pigment flake of claim 23, wherein the diffractive structure is a diffraction grating pattern or a holographic image pattern.

28. The pigment flake of claim 27, wherein the diffraction grating pattern has greater than about 1100 grating lines per mm.

29. The pigment flake of claim 27, wherein the diffraction grating pattern has at least about 1400 grating lines per mm and a grating depth of at least about 100 nm.

30. The pigment flake of claim 27, wherein the diffraction grating pattern has from about 1400 to about 3500 grating lines per mm, and a grating depth from about 100 nm to about 300 nm.

31. The pigment flake of claim 27, wherein the diffraction grating pattern has from about 1400 to about 2000 grating lines per mm, and a grating depth from about 140 nm to about 220 nm.

32. The pigment flake of claim 23, further comprising a second dielectric layer overlying the second major surface of the reflector layer, and a second absorber layer overlying the second dielectric layer.

33. The pigment flake of claim 32, further comprising a third dielectric layer overlying the first absorber layer, and a fourth dielectric layer overlying the second absorber layer.

34. The pigment flake of claim 32, wherein the first and second dielectric layers comprise a dielectric material having a refractive index of greater than about 1.65.

35. The pigment flake of claim 34, wherein the dielectric material is selected from the group consisting of zinc sulfide, zinc oxide, zirconium oxide, titanium dioxide, diamond-like carbon, indium oxide, indium-tin-oxide, tantalum pentoxide, cerium oxide, yttrium oxide, europium oxide, iron oxides, hafnium nitride, hafnium carbide, hafnium oxide, lanthanum oxide, magnesium oxide, neodymium oxide, praseodymium oxide, samarium oxide, antimony trioxide, silicon, silicon monoxide, selenium trioxide, tin oxide, tungsten trioxide, zirconium titanium oxide, niobium titanium oxide, and combinations thereof.

36. The pigment flake of claim 32, wherein the first and second dielectric layers comprise a dielectric material having a refractive index of about 1.65 or less.

37. The pigment flake of claim 36, wherein the dielectric material is selected from the group consisting of magnesium fluoride, silicon dioxide, aluminum oxide, aluminum fluoride, cerium fluoride, lanthanum fluoride, neodymium fluoride, samarium fluoride, barium fluoride, calcium fluoride, lithium fluoride, and combinations thereof.

38. The pigment flake of claim 32, wherein the first and second dielectric layers have substantially the same optical thickness.

39. The pigment flake of claim 32, wherein the first and second dielectric layers have a different optical thickness.

40. The pigment flake of claim 32, wherein the first and second dielectric layers are composed of the same material.

41. The pigment flake of claim 32, wherein the first and second dielectric layers are respectively on each of the first and second major surfaces but not on the at least one side surface of the reflector layer.

42. The pigment flake of claim 32, wherein the first and second dielectric layers are part of a contiguous dielectric layer substantially surrounding the reflector layer.

43. The pigment flake of claim 41, wherein the first and second absorber layers are part of a contiguous absorber layer substantially surrounding the dielectric layers.

44. The pigment flake of claim 42, wherein the first and second absorber layers are part of a contiguous absorber layer substantially surrounding the contiguous dielectric layer.

45. The pigment flake of claim 33, wherein the third and fourth dielectric layers are part of a contiguous dielectric layer substantially surrounding the underlying layers.

46. The pigment flake of claim 32, wherein the first and second absorber layers comprise an absorbing material selected from the group consisting of chromium, nickel, aluminum, silver, copper, palladium, platinum, titanium, vanadium, cobalt, iron, tin, tungsten, molybdenum, rhodium, niobium, carbon, graphite, silicon, germanium, and compounds, alloys, or combinations thereof.

47. The pigment flake of claim 32, wherein the first and second absorber layers comprise an absorbing material selected from the group consisting of metal oxides, metal sulfides, metal carbides, metal nitrides, metal phosphides, cermets, and combinations thereof.

48. The pigment flake of claim 32, wherein the first and second absorber layers comprise an absorbing material selected from the group consisting of titanium nitride, titanium oxynitride, titanium carbide, titanium nitride carbide, titanium oxynitride carbide, titanium silicide, titanium diboride, titanium mixed with carbon, titanium mixed with tungsten, titanium mixed with silicon, titanium mixed with niobium, and combinations thereof.

49. The pigment flake of claim 32, wherein the first and second absorber layers have a physical thickness of about 3 nm to about 50 nm.

50. The pigment flake of claim 32, wherein the first and second absorber layers have substantially the same physical thickness.

51. The pigment flake of claim 32, wherein the first and second absorber layers are composed of the same material.

52. The pigment flake of claim 23, wherein the pigment flake has a second background color different from the first background color at a second angle of incident light or viewing.

53. The pigment flake of claim 23, wherein the pigment flake has a width of less than about 50 microns.

54. The pigment flake of claim 23, wherein the pigment flake has a physical thickness of less than about 2 microns.

55. A diffractive pigment composition, comprising:
a pigment medium; and
a plurality of diffractive pigment flakes dispersed in the pigment medium, the pigment flakes having a multi-layer structure substantially the same as the pigment flake of claim 23;
wherein the composition produces an optical diffractive effect over at least one background color when applied to an object.

56. A diffractive pigment flake, comprising:
a central reflector layer having a first major surface, an opposing second major surface, and at least one side surface;
a first dielectric layer overlying the first major surface of the reflector layer;
a second dielectric layer overlying the second major surface of the reflector layer;
a first absorber layer overlying the first dielectric layer; and
a second absorber layer overlying the second dielectric layer;
wherein the pigment flake has a diffractive structure throughout the layers thereof, and the first and second dielectric layers comprise a dielectric material having a refractive index of greater than about 1.65.

57. The pigment flake of claim 56, wherein the diffractive structure is a diffraction grating pattern or a holographic image pattern.

58. The pigment flake of claim 57, wherein the diffraction grating pattern has greater than about 1100 grating lines per mm.

59. The pigment flake of claim 57, wherein the diffraction grating pattern has at least about 1400 grating lines per mm and a grating depth of at least about 100 nm.

60. The pigment flake of claim 56, wherein the central reflector layer comprises:
a central support layer having a first major surface, an opposing second major surface, and at least one side surface;
a first reflective layer overlying the first major surface of the support layer; and
a second reflective layer overlying the second major surface of the support layer.

61. The pigment flake of claim 60, wherein the first and second reflective layers are on each of the first and second major surfaces but not on the at least one side surface of the support layer.

62. The pigment flake of claim 60, wherein the first and second reflective layers are part of a contiguous reflector layer substantially surrounding the support layer.

63. The pigment flake of claim 62, wherein the first and second dielectric layers are part of a contiguous dielectric layer substantially surrounding the contiguous reflector layer.

64. The pigment flake of claim 63, wherein the first and second absorber layers are part of a contiguous absorber layer substantially surrounding the contiguous dielectric layer.

65. A diffractive pigment composition, comprising:
a pigment medium; and
a plurality of diffractive pigment flakes dispersed in the pigment medium, the pigment flakes having a multi-layer structure substantially the same as the pigment flake of claim 56;
wherein the composition produces an optical diffractive effect over at least one background color when applied to an object.

66. A color shifting diffractive pigment flake, comprising:
a central reflector layer having a first major surface, an opposing second major surface, and at least one side surface;
a first dielectric layer overlying the first major surface of the reflector layer;
a second dielectric layer overlying the second major surface of the reflector layer;
a first absorber layer overlying the first dielectric layer; and
a second absorber layer overlying the second dielectric layer;
wherein the pigment flake has a diffractive structure throughout the layers thereof, and the first and second dielectric layers comprise a dielectric material having a refractive index of about 1.65 or less.

67. The pigment flake of claim 66, wherein the diffractive structure is a diffraction grating pattern or a holographic image pattern.

68. The pigment flake of claim 67, wherein the diffraction grating pattern has greater than about 1100 grating lines per mm.

69. The pigment flake of claim 67, wherein the diffraction grating pattern has at least about 1400 grating lines per mm and a grating depth of at least about 100 nm.

70. The pigment flake of claim 66, wherein the central reflector layer comprises:
a central support layer having a first major surface, an opposing second major surface, and at least one side surface;
a first reflective layer overlying the first major surface of the support layer; and
a second reflective layer overlying the second major surface of the support layer.

71. The pigment flake of claim 70, wherein the first and second reflective layers are on each of the first and second major surfaces but not on the at least one side surface of the support layer.

72. The pigment flake of claim 70, wherein the first and second reflective layers are part of a contiguous reflector layer substantially surrounding the support layer.

73. The pigment flake of claim 72, wherein the first and second dielectric layers are part of a contiguous dielectric layer substantially surrounding the contiguous reflector layer.

74. The pigment flake of claim 73, wherein the first and second absorber layers are part of a contiguous absorber layer substantially surrounding the contiguous dielectric layer.

75. A diffractive pigment composition, comprising:
a pigment medium; and
a plurality of diffractive pigment flakes dispersed in the pigment medium, the pigment flakes having a multi-layer structure substantially the same as the pigment flake of claim 66;
wherein the composition produces an optical diffractive effect over a color shifting background color when applied to an object.

76. A diffractive pigment flake, comprising:
a central dielectric layer having a first major surface, an opposing second major surface, and at least one side surface;

a first absorber layer overlying the first major surface of the dielectric layer; and a second absorber layer overlying the second major surface of the dielectric layer;

wherein the pigment flake has a diffractive structure thereon, and the dielectric layer has an optical thickness at a selected design wavelength such that the pigment flake exhibits a first background color at a first angle of incident light or viewing and a second background color different from the first background color at a second angle of incident light or viewing.

77. The pigment flake of claim 76, wherein the diffractive structure comprises a diffraction grating pattern with at least about 1,400 grating lines per mm and a grating depth of at least about 100 nm.

78. The pigment flake of claim 76, wherein the first and second absorber layers are on each of the first and second major surfaces but not on the at least one side surface of the dielectric layer.

79. The pigment flake of claim 76, wherein the first and second absorber layers are part of a contiguous absorber layer substantially surrounding the dielectric layer.

80. A diffractive pigment composition, comprising:
a pigment medium; and
a plurality of diffractive pigment flakes dispersed in the pigment medium, the pigment flakes having a multilayer structure substantially the same as the pigment flake of claim 76;
wherein the composition produces an optical diffractive effect over a color shifting background color when applied to an object.

81. A coated article comprising:
an object having one or more surfaces;
a diffractive coating layer overlying at least a portion of the one or more surfaces, the coating layer comprising a diffractive composition comprising:
a pigment medium; and
a plurality of pigment flakes having diffractive structures thereon and dispersed in the pigment medium, the pigment flakes having a multilayer structure comprising:
a reflector layer having a first major surface, and an opposing second major surface;
a first dielectric layer overlying the first major surface of the reflector layer;
a second dielectric layer overlying the second major surface of the reflector layer;
a first absorber layer overlying the first dielectric layer; and
a second absorber layer overlying the second dielectric layer;
wherein the first and second dielectric layers have an optical thickness at a selected design wavelength such that the pigment flakes exhibit at least a first background color at a first angle of incident light or viewing.

82. The coated article of claim 81, wherein the pigment flakes have a second background color different from the first background color at a second angle of incident light or viewing.

83. The coated article of claim 81, wherein the diffractive coating layer comprises an ink or paint.

84. The coated article of claim 81, further comprising a base coating layer under the diffractive coating layer.

85. The coated article of claim 81, further comprising a transparent top coating layer overlying the diffractive coating layer.

86. The coated article of claim 81, wherein the coated article is a motor vehicle.

87. The coated article of claim 81, wherein the coated article is a security document.

88. The coated article of claim 81, further comprising a non-diffractive coating layer partially overlying the diffractive coating layer.

89. The coated article of claim 81, further comprising a non-diffractive coating layer underlying the diffractive coating layer.

90. The coated article of claim 81, further comprising a plurality of non-diffractive pigment flakes dispersed in the pigment medium.

91. A diffractive foil, comprising:
a substrate having a surface with a diffractive structure thereon;
a reflector layer overlying the surface of the substrate;
a dielectric layer overlying the reflector layer; and
an absorber layer overlying the dielectric layer;
wherein the dielectric layer has an optical thickness at a selected design wavelength such that the foil exhibits at least a first background color at a first angle of incident light or viewing, the foil producing an optical diffractive effect over the background color, and each of the reflector, dielectric, and absorber layers have the diffractive structure replicated therein.

92. The foil of claim 91, wherein the foil has a second background color different from the first background color at a second angle of incident light or viewing.

93. The foil of claim 91, wherein the diffractive structure is a diffraction grating pattern or a holographic image pattern.

94. The foil of claim 93, wherein the diffraction grating pattern has greater than about 1100 grating lines per mm.

95. The foil of claim 93, wherein the diffraction grating pattern has at least about 1100 grating lines per mm and a grating depth of at least about 100 nm.

96. The foil of claim 93, wherein the diffraction grating pattern has from about 1400 to about 3500 grating lines per mm, and a grating depth from about 100 nm to about 300 nm.

97. A diffractive foil, comprising:
a reflector layer;
a dielectric layer overlying the reflector layer; and
an absorber layer overlying the dielectric layer;
wherein the foil has a diffractive structure thereon, and the dielectric layer has an optical thickness at a selected design wavelength such that the foil exhibits at least a first background color at a first angle of incident light or viewing, the foil producing an optical diffractive effect over the background color.

98. The foil of claim 97, wherein the foil has a second background color different from the first background color at a second angle of incident light or viewing.

99. The foil of claim 97, further comprising a web carrier with either the reflector layer or the absorber layer deposited over the web carrier.

100. The foil of claim 99, wherein the web carrier further comprises a release layer thereon disposed between the web carrier and the reflector layer, or the web carrier and the absorber layer.

101. The foil of claim 97, further comprising an adhesive layer for laminating the foil to a substrate.

102. The foil of claim 101, wherein the adhesive layer is selected from the group consisting of a hot stampable adhesive, a pressure sensitive adhesive, a permanent adhesive, a transparent adhesive, and a UV curable adhesive.

103. The foil of claim 101, wherein the adhesive layer is on the reflector layer or the absorber layer.

104. A diffractive foil, comprising:

a substrate having a surface with a diffractive structure thereon;

a reflector layer overlying the surface of the substrate; and a dielectric layer overlying the reflector layer;

wherein the foil exhibits a background color and an optical diffractive effect over the background color, and each of the reflector and dielectric layers have the diffractive structure replicated therein.

105. The foil of claim 104, wherein the dielectric layer comprises magnesium fluoride, and the reflector layer comprises copper.

* * * * *